US012120653B2

(12) United States Patent
Lee et al.

(10) Patent No.: US 12,120,653 B2
(45) Date of Patent: Oct. 15, 2024

(54) DEVICE COMMUNICATION USING A REDUCED CHANNEL BANDWIDTH

(71) Applicant: INTERDIGITAL PATENT HOLDINGS, INC., Wilmington, DE (US)

(72) Inventors: Moon-il Lee, Melville, NY (US); Marian Rudolf, Montreal (CA); Peter S. Wang, E. Setauket, NY (US); Shahrokh Nayeb Nazar, San Diego, CA (US); Janet A. Stern-Berkowitz, Little Neck, NY (US); Pouriya Sadeghi, San Diego, CA (US); Allan Y. Tsai, Boonton, NJ (US); Sung-Hyuk Shin, Northvale, NJ (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 0 days.

(21) Appl. No.: 18/100,649

(22) Filed: Jan. 24, 2023

(65) Prior Publication Data

US 2023/0171753 A1    Jun. 1, 2023

Related U.S. Application Data

(63) Continuation of application No. 17/128,934, filed on Dec. 21, 2020, now Pat. No. 11,582,750, which is a
(Continued)

(51) Int. Cl.
*H04W 72/51* (2023.01)
*H04L 1/00* (2006.01)
(Continued)

(52) U.S. Cl.
CPC ....... *H04W 72/0453* (2013.01); *H04L 1/0026* (2013.01); *H04L 1/1858* (2013.01);
(Continued)

(58) Field of Classification Search
CPC ... H04W 72/51; H04W 1/0031; H04W 72/23; H04W 72/21; H04W 72/04
See application file for complete search history.

(56) References Cited

U.S. PATENT DOCUMENTS 8,315,273 B2   11/2012   Damnjanovic et al.
8,553,645 B2   10/2013   Kuchibhotla et al.
(Continued)

FOREIGN PATENT DOCUMENTS

CN   101026799 A   8/2007
CN   101984719 A   3/2011
(Continued)

OTHER PUBLICATIONS

3rd Generation Partnership Project (3GPP), R2-113414, "Text proposal for TR 37.868 on Access Barring Scaling for MTC", Deutsche Telekom, MediaTek, 3GPP TSG-RAN WG2 Meeting #74, Barcelona, Spain, May 9- 13, 2011, 3 pages.
(Continued)

*Primary Examiner* — Anez C Ebrahim
(74) *Attorney, Agent, or Firm* — CONDO ROCCIA KOPTIW LLP

(57) ABSTRACT

Systems and/or methods for supporting communications at a reduced bandwidth with a full bandwidth network such as a long-term evolution (LTE) network may be disclosed. For example, inband assignments such as downlink assignments and/or uplink grants may be provided and/or received and transmissions may be monitored and/or decoded based on the inband assignment. Additionally, information (e.g. a definition or configuration) associated with an ePDCCH
(Continued)

may be provided and/or received and ePDCCH resources may be monitored and/or decoded based on such information. An indication for support of a reduced bandwidth by the full bandwidth network may also be provided and/or received and control channels in the reduced or narrow bandwidth may be monitored and/or decoded based on the indication. A PRACH preamble and/or a multi-type subframe definition may also be provided and/or used for support of such a reduced bandwidth.

18 Claims, 44 Drawing Sheets

Related U.S. Application Data continuation of application No. 16/117,782, filed on Aug. 30, 2018, now abandoned, which is a continuation of application No. 13/632,037, filed on Sep. 30, 2012, now Pat. No. 10,111,224.

(60) Provisional application No. 61/682,042, filed on Aug. 10, 2012, provisional application No. 61/644,835, filed on May 9, 2012, provisional application No. 61/591,632, filed on Jan. 27, 2012, provisional application No. 61/555,876, filed on Nov. 4, 2011, provisional application No. 61/542,114, filed on Sep. 30, 2011.

(51) Int. Cl.
*H04L 1/1829* (2023.01)
*H04W 72/0453* (2023.01)
*H04W 74/0833* (2024.01)
*H04W 72/23* (2023.01)

(52) U.S. Cl.
CPC ....... *H04W 74/0833* (2013.01); *H04L 1/0031* (2013.01); *H04W 72/23* (2023.01); *H04W 72/51* (2023.01)

(56) References Cited

U.S. PATENT DOCUMENTS

| | | |
|---|---|---|
| 8,577,342 B2 | 11/2013 | Muniere et al. |
| 8,837,358 B2 | 9/2014 | Lunttila et al. |
| 8,837,362 B2 | 9/2014 | Vartiainen et al. |
| 8,929,306 B2 | 1/2015 | Kim et al. |
| 8,995,395 B2 | 3/2015 | Frenne et al. |
| 9,204,373 B2 | 12/2015 | Arora et al. |
| 9,253,782 B2 | 2/2016 | Xu et al. |
| 9,445,425 B2 | 9/2016 | Chapman et al. |
| 10,420,066 B2 | 9/2019 | Sadeghi et al. |
| 2001/0023442 A1 | 9/2001 | Masters |
| 2004/0005870 A1 | 1/2004 | Yla-Jaaski et al. |
| 2004/0047343 A1* | 3/2004 | Muniere ............... H04W 72/21 370/328 |
| 2005/0286495 A1 | 12/2005 | Menon et al. |
| 2006/0020684 A1 | 1/2006 | Mukherjee et al. |
| 2006/0146861 A1 | 7/2006 | Maeda |
| 2008/0091284 A1 | 4/2008 | Sugiyama et al. |
| 2008/0095088 A1 | 4/2008 | Ryu et al. |
| 2008/0130519 A1 | 6/2008 | Bahl et al. |
| 2008/0259912 A1 | 10/2008 | Wang et al. |
| 2008/0287129 A1 | 11/2008 | Somasundaram et al. |
| 2009/0029710 A1 | 1/2009 | Ochiai et al. |
| 2009/0052376 A1 | 2/2009 | Cave et al. |
| 2009/0170426 A1 | 7/2009 | Jung et al. |
| 2009/0196261 A1 | 8/2009 | Sambhwani et al. |
| 2009/0259910 A1 | 10/2009 | Lee et al. |
| 2009/0318170 A1 | 12/2009 | Lee et al. |
| 2010/0014468 A1 | 1/2010 | Lee et al. |
| 2010/0202382 A1 | 8/2010 | Park et al. |
| 2010/0246518 A1 | 9/2010 | Gheorghiu et al. |
| 2010/0260081 A1 | 10/2010 | Damnjanovic et al. |
| 2010/0311349 A1 | 12/2010 | Koo et al. |
| 2011/0014922 A1 | 1/2011 | Jen |
| 2011/0026450 A1 | 2/2011 | Kuchibhotla et al. |
| 2011/0176530 A1 | 7/2011 | Vikberg et al. |
| 2011/0199905 A1 | 8/2011 | Pinheiro et al. |
| 2011/0235558 A1 | 9/2011 | Diachina et al. |
| 2011/0299492 A1 | 12/2011 | Lee et al. |
| 2012/0044910 A1 | 2/2012 | Maeda et al. |
| 2012/0099515 A1 | 4/2012 | Chen et al. |
| 2012/0172063 A1 | 7/2012 | Lee et al. |
| 2012/0208545 A1 | 8/2012 | Yang et al. |
| 2012/0252472 A1 | 10/2012 | Nakahara |
| 2012/0307774 A1 | 12/2012 | Zhao et al. |
| 2012/0327894 A1 | 12/2012 | Axmon et al. |
| 2012/0327895 A1 | 12/2012 | Wallen et al. |
| 2013/0034059 A1 | 2/2013 | Lee et al. |
| 2013/0039299 A1 | 2/2013 | Papasakellariou et al. |
| 2013/0044664 A1 | 2/2013 | Nory et al. |
| 2013/0083753 A1 | 4/2013 | Lee et al. |
| 2013/0170438 A1 | 7/2013 | Nishida et al. |
| 2013/0215848 A1 | 8/2013 | Kato et al. |
| 2013/0223395 A1 | 8/2013 | Warken et al. |
| 2013/0301608 A1 | 11/2013 | Frenne et al. |
| 2014/0010183 A1 | 1/2014 | McNamara et al. |
| 2014/0071848 A1 | 3/2014 | Park et al. |
| 2014/0086173 A1 | 3/2014 | Sadeghi et al. |
| 2014/0357272 A1 | 12/2014 | Lindoff et al. |
| 2016/0174260 A1* | 6/2016 | Nandagopalan ...... H04W 16/28 370/338 |
| 2020/0344685 A1* | 10/2020 | Yi .......................... H04W 72/21 |

FOREIGN PATENT DOCUMENTS

| | | |
|---|---|---|
| CN | 102036301 A | 4/2011 |
| CN | 102202412 A | 9/2011 |
| EP | 2071882 A2 | 6/2009 |
| EP | 2278830 A1 | 1/2011 |
| EP | 2369883 A1 | 9/2011 |
| JP | 2011-511509 A | 4/2011 |
| JP | 2012-523773 A | 10/2012 |
| JP | 2014-504835 A | 2/2014 |
| JP | 2014-526159 A | 10/2014 |
| JP | 2015-523767 A | 8/2015 |
| TW | 201218837 A | 5/2012 |
| WO | 2009/072956 A1 | 6/2009 |
| WO | 2010/016726 A2 | 2/2010 |
| WO | 2010/125769 A1 | 11/2010 |
| WO | 2011/097767 A1 | 8/2011 |
| WO | 2011/100596 A2 | 8/2011 |
| WO | 2011/120030 A1 | 9/2011 |
| WO | 2012/051303 A1 | 4/2012 |
| WO | 2012/104635 A1 | 8/2012 |

OTHER PUBLICATIONS

3rd Generation Partnership Project (3GPP), TS 36.331 V8.15.0, "Technical Specification Group Radio Access Network, Evolved Universal Terrestrial Radio Access (E-UTRA), Radio Resource Control (RRC), Protocol Specification (Release 8)", Sep. 2011, pp. 1-213.
3rd Generation Partnership Project (3GPP), TS 36.413 V10.3.0, "Technical Specification Group Radio Access Network, Evolved Universal Terrestrial Radio Access Network (E-UTRAN), S1 Application Protocol (S1AP) (Release 10)", Sep. 2011, pp. 1-254.
3rd Generation Partnership Project (3GPP), TS 36.423 V11.0.0, "Technical Specification Group Radio Access Network, Evolved Universal Terrestrial Radio Access Network (E-UTRAN), X2 Application Protocol (X2AP) (Release 11)", Mar. 2012, pp. 1-134.
3rd Generation Partnership Project, R1-060047, "Random Access Transmission in E-UTRA Uplink", NTT DoCoMo, NEC, Sharp, 3GPP TSG-RAN WG1 LTE Ad Hoc Meeting, Helsinki, Finland, Jan. 23-25, 2006, pp. 1-8.
3rd Generation Partnership Project, R1-060161, "Inclusion of Additional Data on RACH", Panasonic, 3GPP TSG-RAN WG1 LTE Ad hoc Meeting, Helsinki, Finland, Jan. 23-25, 2006, pp. 1-5.

(56) References Cited

OTHER PUBLICATIONS

3rd Generation Partnership Project, R1-112669, "On support of low-cost MTC terminals with reduced Tx/Rx bandwidths", 3GPP TSG-RAN WG1 Meeting #66, Fujitsu, Athens, Greece, Aug. 22-26, 2011, 2 pages.
3rd Generation Partnership Project, R1-114267, "Review of Approaches for Bandwidth Reduction for Low Complexity MTC LTE UEs", IPWireless Inc., 3GPP TSG RAN WG1 Meeting #67, San Francisco, USA, Nov. 14-18, 2011, 6 pages.
3rd Generation Partnership Project, R1-120485, "Other Design Aspects of the New Carrier Type", Alcatel-Lucent, Alcatel-Lucent Shanghai Bell, 3GPP TSG RAN WG1 Meeting #68, Dresden, Germany, Feb. 6-10, 2012, pp. 1-2.
3rd Generation Partnership Project, R1-122518, "PSS/SSS Collisions with DM-RS", Huawei, HiSilicon, 3GPP TSG RAN WG1 Meeting #69, Prague, Czech Republic, May 21-25, 2012, 5 pages.
3rd Generation Partnership Project, R1-124856, "Requirements and Necessary Enhancements for Rel-12 NCT", NEC Group, 3GPP TSG RAN WG1 Meeting #71, New Orleans, USA, Nov. 12-16, 2012, pp. 1-6.
3rd Generation Partnership Project, R1-130658, "eMBMS Support in New Carrier Type", Orange, AT&T, Dish Network, Qualcomm Incorporated, 3GPP TSG-RAN WG1 #72, St. Julian's, Malta, Jan. 28-Feb. 1, 2013, 1 page.
3rd Generation Partnership Project, R2-085181, "Corrections to Random Access Procedure", Huawei, 3GPP TSG-RAN WG2 Meeting #63bis, Prague, Czech Republic, Sep. 29-Oct. 3, 6 pages.
3rd Generation Partnership Project, R2-094320, "Paging in Carrier Aggregation", CATT, 3GPP TSG RAN WG2 Meeting #67, Shenzhen, China, Aug. 24-28, pp. 1-3.
3rd Generation Partnership Project, R2-095486, "Considerations on Paging in Carrier Aggregation", 3GPP TSG RAN WG2 Meeting #67bis, Miyazaki, Japan, Oct. 12-16, 2009, pp. 1-2.
3rd Generation Partnership Project, R2-101407, "Discussion on RACH design for MTC", Alcatel-Lucent Shanghai Bell, Alcatel-Lucent, 3GPP TSG RAN WG2 #69, San Francisco, USA, Feb. 22-26, 2010, pp. 1-2.
3rd Generation Partnership Project, R2-102894, "Considerations on RAN Overload Control", 3GPP TSG-RAN WG2 Meeting #70, Huawei, Montreal, Canada, May 10-14, 2010, 7 pages.
3rd Generation Partnership Project, R2-104015, "Random access design for MTC", 3GPP TSG RAN WG2 #70bis, Samsung, Stockholm, Sweden, Jun. 28-Jul. 2, 2010, 3 pages.
3rd Generation Partnership Project, R2-112974, "Proposal for a Study sItem in Support of Low Complexity LTE Devices for MTC", IPWireless, Inc., 3GPP TSG RAN WG2 Meeting #74, Barcelona, Spain, May 9-13, 2011, 5 pages.
3rd Generation Partnership Project, R3-111399, "Discussion on UE Specific DRX for Connected Mode UE", Qualcomm Incorporated, 3GPP TSG-RAN WG3 #72, Barcelona, Spain, May 9-13, 2011, pp. 1-2.
3rd Generation Partnership Project, RP-111112, "Proposed SID: Provision of Low-Cost MTC UEs based on LTE", Vodafone, TSG RAN Meeting #53, Fukuoka, Japan, Sep. 13-16, 2011, 6 pages.
3rd Generation Partnership Project, RP-121415, "New WI proposal: New Carrier Type for LTE", Ericsson, ST-Ericsson, 3GPP TSG-RAN Meeting#57, Chicago, USA, Sep. 4-7, 2012, 6 pages.
3rd Generation Partnership Project (3GPP), TS 24.301 V10.4.0, "Technical Specification Group Core Network and Terminals, Non-Access-Stratum (NAS) Protocol for Evolved Packet System (EPS), Stage 3 (Release 10)", Sep. 2011, pp. 1-321.
3rd Generation Partnership Project (3GPP) TS 36.133 V12.0.0, "Technical Specification Group Radio Access Network, Evolved Universal Terrestrial Radio Access (E-UTRA), Requirements for Support of Radio Resource Management (Release 12)", Jul. 2013, pp. 1-746.

3rd Generation Partnership Project (3GPP), TS 36.211 V11.4.0, "Technical Specification Group Radio Access Network, Evolved Universal Terrestrial Radio Access (E-UTRA), Physical Channels and Modulation (Release 11)", Sep. 2013, pp. 1-120.
3rd Generation Partnership Project (3GPP), TS 36.212 V11.3.0, "Technical Specification Group Radio Access Network, Evolved Universal Terrestrial Radio Access (E-UTRA), Multiplexing and Channel Coding (Release 11)", Jun. 2013, pp. 1-84.
3rd Generation Partnership Project (3GPP), TS 36.213 V11.4.0, "Technical Specification Group Radio Access Network, Evolved Universal Terrestrial Radio Access (E-UTRA), Physical Layer Procedures (Release 11)", Sep. 2013, pp. 1-182.
3rd Generation Partnership Project (3GPP), TS 36.300 V11.3.0, "Technical Specification Group Radio Access Network, Evolved Universal Terrestrial Radio Access (E-UTRA) and Evolved Universal Terrestrial Radio Access Network (E-UTRAN), Overall Description, Stage 2 (Release 11)", Sep. 2009, pp. 1-205.
3rd Generation Partnership Project (3GPP), TS 36.304 V11.3.0, "Technical Specification Group Radio Access Network, Evolved Universal Terrestrial Radio Access (E-UTRA), User Equipment (UE) Procedures in Idle Mode (Release 11)", Mar. 2013, pp. 1-34.
3rd Generation Partnership Project (3GPP), TS 36.321 V10.3.0, "Technical Specification Group Radio Access network, Evolved Universal Terrestrial Radio Access (E-UTRA), Medium Access Control (MAC) Protocol Specification (Release 10)", Sep. 2011, pp. 1-54.
3rd Generation Partnership Project (3GPP), TS 36.321 V8.10.0, "Technical Specification Group Radio Access Network, Evolved Universal Terrestrial Radio Access (E-UTRA), Medium Access Control (MAC) Protocol Specification (Release 8)", Sep. 2011, pp. 1-47.
3rd Generation Partnership Project (3GPP), TS 36.321 V9.4.0, "Technical Specification Group Radio Access Network, Evolved Universal Terrestrial Radio Access (E-UTRA), Medium Access Control (MAC) Protocol Specification (Release 9)", Sep. 2011, pp. 1-48.
Chen et al., "Machine-to-Machine Communication in LTE-A", IEEE, Research & Innovation Center, Alcatel-Lucent Shanghai Bell, Sep. 6, 2010, 4 pages.
Harman, Greg, "LTE Paging Process", NT&C Radio, GSDC Australia, Version PA1, Ericsson, Oct. 30, 2008, pp. 1-43.
3rd Generation Partnership Project (3GPP), R1-113675, "Further Details on Design Principles for Additional Carrier Types", Ericsson, ST-Ericsson, 3GPP TSG RAN WG1 Meeting #67, San Francisco, USA, Nov. 14-18, 2011, 4 pages.
3rd Generation Partnership Project (3GPP), R1-120289, "Discussion on Synchronization on Additional Carrier Types", ZTE, 3GPP TSG-RAN WG1 Meeting #68, Dresden, Germany, Feb. 6-10, 2012, 4 pages.
3rd Generation Partnership Project (3GPP), R1-121017, "Further Details on Design Principle for a CRS-Free Additional Carrier Type", Ericsson, ST-Ericsson, 3GPP TSG RAN WG1 Meeting #68bis, Jeju, Korea, Mar. 26-30, 2012, 3 pages.
3rd Generation Partnership Project (3GPP), R1-060322, "Random Access Channel Structure for E-UTRA Uplink", NTT DoCoMo, Fujitsu, Mitsubishi Electric, NEC, Panasonic, Sharp, Toshiba Corporation, 3GPP TSG-RAN WG1 Meeting #44, Denver, USA, Feb. 13-17, 2006, pp. 1-9.
3$^{rd}$ Generation Partnership Project (3GPP), R1-060792, "Random access burst evaluation in E-UTRA uplink", Panasonic, TSG-RAN WG1 Meeting#44bis, Athens, Greece, Mar. 27-31, 2006, 7 pages.
3$^{rd}$ Generation Partnership Project (3GPP), TR 37.868 V0.8.1, "3rd Generation Partnership Project (3GPP); Technical Specification Group Radio Access Network; Study on RAN Improvements for Machine-type Communications; (Release 10)", Aug. 2011, 26 pages.

* cited by examiner

| CFI | CFI codeword $\langle b_0, b_1, \ldots, b_{31} \rangle$ |
|---|---|
| 1 | $\langle 0,1,1,0,1,1,0,1,1,0,1,1,0,1,1,0,1,1,0,1,1,0,1,1,0,1,1,0,1,1,0,1 \rangle$ |
| 2 | $\langle 1,0,1,1,0,1,1,0,1,1,0,1,1,0,1,1,0,1,1,0,1,1,0,1,1,0,1,1,0,1,1,0 \rangle$ |
| 3 | $\langle 1,1,0,1,1,0,1,1,0,1,1,0,1,1,0,1,1,0,1,1,0,1,1,0,1,1,0,1,1,0,1,1 \rangle$ |
| 4 (Reserved) | $\langle 0,0,0,0,0,0,0,0,0,0,0,0,0,0,0,0,0,0,0,0,0,0,0,0,0,0,0,0,0,0,0,0 \rangle$ |

FIG. 6

| Subframe | Number of OFDM symbols for PDCCH when $N_{RB}^{DL} > 10$ | Number of OFDM symbols for PDCCH when $N_{RB}^{DL} \leq 10$ |
|---|---|---|
| Subframe 1 and 6 for frame structure type 2 | 1, 2 | 2 |
| MBSFN subframes on a carrier supporting PDSCH, configured with 1 or 2 cell-specific antenna ports | 1, 2 | 2 |
| MBSFN subframes on a carrier supporting PDSCH, configured with 4 cell-specific antenna ports | 2 | 2 |
| Subframes on a carrier not supporting PDSCH | 0 | 0 |
| Non-MBSFN subframes (except subframe 6 for frame structure type 2) configured with positioning reference signals | 1, 2, 3 | 2, 3 |
| All other cases | 1, 2, 3 | 2, 3, 4 |

FIG. 7

| Sequence index $n_{PHICH}^{seq}$ | Orthogonal sequence | |
|---|---|---|
| | Normal cyclic prefix $N_{SF}^{PHICH} = 4$ | Extended cyclic prefix $N_{SF}^{PHICH} = 2$ |
| 0 | $[+1\ +1\ +1\ +1]$ | $[+1\ +1]$ |
| 1 | $[+1\ -1\ +1\ -1]$ | $[+1\ -1]$ |
| 2 | $[+1\ +1\ -1\ -1]$ | $[+j\ +j]$ |
| 3 | $[+1\ -1\ -1\ +1]$ | $[+j\ -j]$ |
| 4 | $[+j\ +j\ +j\ +j]$ | - |
| 5 | $[+j\ -j\ +j\ -j]$ | - |
| 6 | $[+j\ +j\ -j\ -j]$ | - |
| 7 | $[+j\ -j\ -j\ +j]$ | - |

FIG. 10

| PDCCH format | Number of CCEs | Number of resource-element groups | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

FIG. 11

| CSI reference signal Configuration | Number of CSI reference signals configured | |
|---|---|---|
| | 4 | |
| | $(k', l')$ | $n_s \bmod 2$ |
| 0 | (9,5) | 0 |
| 1 | (11,2) | 1 |
| 2 | (9,2) | 1 |
| 3 | (7,2) | 1 |
| 4 | (9,5) | 1 |
| 5 | (8,5) | 0 |
| 6 | (10,2) | 1 |
| 7 | (8,2) | 1 |
| 8 | (6,2) | 1 |
| 9 | (8,5) | 1 |

FIG. 22

| CFI | CFI code word $<b_0, b_1, ..., b_{31}>$ |
|---|---|
| 1 | $<1,0,1,1,0,1,1,0,1,1,0,1,1,0,1,1,0,1,1,0,1,1,0,1,1,0,1,1,0,1,1,0,1,1,0,1,1,0,1,1>$ |
| 2 | $<1,1,0,1,1,0,1,1,0,1,1,0,1,1,0,1>$ |
| 3 | $<0,1,1,0,1,1,0,1,1,0,1,1,0,1,1,0>$ |
| 4 (Reserved) | $<0,0,0,0,0,0,0,0,0,0,0,0,0,0,0,0>$ |

FIG. 26

| CFI | CFI code word $<b_0, b_1, ..., b_{31}>$ |
|---|---|
| 1 | $<1,0,1,1,0,1,1,0>$ |
| 2 | $<1,1,0,1,1,0,1,1>$ |
| 3 | $<0,1,1,0,1,1,0,1>$ |
| 4 (Reserved) | $<0,0,0,0,0,0,0,0>$ |

FIG. 27

| HI | HI code word $<b_0, b_1>$ |
|---|---|
| 0 | $<0,0>$ |
| 1 | $<1,1>$ |

| System Bandwidth $N_{RB}^{DL}$ | RBG Size ($P$) |
|---|---|
| =10 | 1 |
| 11 – 26 | 2 |
| 27 – 63 | 3 |
| 64 – 110 | 4 |

FIG. 30A

| MTC Bandwidth $N_{RB}^{DL\_MTC}$ | RBG Size ($P'$) |
|---|---|
| =10 | 1 |
| 11 – 26 | 2 |
| 27 – 63 | 3 |

FIG. 30B

| Reporting Priority | Reporting type | Reporting contents | Max. Info. Bits (bits/BP) |
|---|---|---|---|
| 1st priority | 2a | wideband first PMI | 4 |
| | 3 | RI | 3 |
| | 4 | Wideband CQI | 4 |
| | 6 | RI / PTI | 4 |
| 2nd priority | 2 | wideband CQI/PMI | 11 |
| | 2b | Wideband CQI / second PMI | 11 |
| | 2c | Wideband CQI / first PMI / second PMI | 11 |
| | 5 | RI / first PMI | 5 |
| 3rd priority | 1 | Sub-band CQI | 7+L |
| | 1a | Sub-band CQI / second PMI | 9+L·((7+L)÷2) |

FIG. 31

| UE Category | Maximum number of DL-SCH transport block bits received within a TTI | Maximum number of bits of a DL-SCH transport block received within a TTI | Total number of soft channel bits | Maximum number of supported layers for spatial multiplexing in DL |
|---|---|---|---|---|
| Category 0 | 4392 | 4392 | 109800 | 1 |
| Category 1 | 10296 | 10296 | 250368 | 1 |
| Category 2 | 51024 | 51024 | 1237248 | 2 |
| Category 3 | 102048 | 75376 | 1237248 | 2 |
| Category 4 | 150752 | 75376 | 1827072 | 2 |
| Category 5 | 299552 | 149776 | 3667200 | 4 |
| Category 6 | 301504 | 149776 (4 layers) 75376 (2 layers) | 3654144 | 2 or 4 |
| Category 7 | 301504 | 149776 (4 layers) 75376 (2 layers) | 3654144 | 2 or 4 |
| Category 8 | 2998560 | 299856 | 35982720 | 8 |

FIG. 32

| Configuration number | Subframe number | | | | | | | | | |
|---|---|---|---|---|---|---|---|---|---|---|
| | 0 | 1 | 2 | 3 | 4 | 5 | 6 | 7 | 8 | 9 |
| 0 | C | C | D | D | D | C | C | D | D | D |
| 1 | C | D | D | D | D | C | D | D | D | D |
| 2 | C | C | C | C | C | C | D | D | D | D |
| 3 | C | C | D | D | D | D | D | D | D | D |

| Configuration number | Subframe number | | | | | | | | | |
|---|---|---|---|---|---|---|---|---|---|---|
| | 0 | 1 | 2 | 3 | 4 | 5 | 6 | 7 | 8 | 9 |
| 0 | C | N | D | N | N | C | N | D | N | N |
| 1 | C | N | N | D | N | C | N | N | D | N |
| 2 | C | N | D | N | D | C | C | D | N | D |
| 3 | N | C | N | D | N | N | C | N | N | N |
| 4 | N | C | N | N | D | N | C | N | D | N |
| 5 | N | C | N | N | N | N | C | N | N | D |
| 6 | Reserved | | | | | | | | | |
| 7 | Reserved | | | | | | | | | |

FIG. 35

| MCS index $I_{MCS}$ | Modulation order $Q_m$ | TBS index $I_{TBS}$ | $N_{PRB}$ | | | | | |
|---|---|---|---|---|---|---|---|---|
| | | | 1 | 2 | 3 | 4 | 5 | 6 |
| 0 | 2 | 0 | 16 | 32 | 56 | 88 | 120 | 152 |
| 1 | 2 | 1 | 24 | 56 | 88 | 144 | 176 | 208 |
| 2 | 2 | 2 | 32 | 72 | 144 | 176 | 208 | 256 |
| 3 | 2 | 3 | 40 | 104 | 176 | 208 | 256 | 328 |
| 4 | 2 | 4 | 56 | 120 | 208 | 256 | 328 | 408 |
| 5 | 2 | 5 | 72 | 144 | 224 | 328 | 424 | 504 |
| 6 | 2 | 6 | 328 | 176 | 256 | 392 | 504 | 600 |
| 7 | 2 | 7 | 104 | 224 | 328 | 472 | 584 | 712 |
| 8 | 2 | 8 | 120 | 256 | 392 | 536 | 680 | 808 |
| 9 | 2 | 9 | 136 | 296 | 456 | 616 | 776 | 936 |
| 10 | 4 | 9 | 136 | 296 | 456 | 616 | 776 | 936 |
| 11 | 4 | 10 | 144 | 328 | 504 | 680 | 872 | 1032 |
| 12 | 4 | 11 | 176 | 376 | 584 | 776 | 1000 | 1192 |
| 13 | 4 | 12 | 208 | 440 | 680 | 904 | 1128 | 1352 |
| 14 | 4 | 13 | 224 | 488 | 744 | 1000 | 1256 | 1544 |
| 15 | 4 | 14 | 256 | 552 | 840 | 1128 | 1416 | 1736 |
| 16 | 4 | 15 | 280 | 600 | 904 | 1224 | 1544 | 1800 |
| 17 | 6 | 15 | 280 | 600 | 904 | 1224 | 1544 | 1800 |
| 18 | 6 | 16 | 328 | 632 | 968 | 1288 | 1608 | 1928 |
| 19 | 6 | 17 | 336 | 696 | 1064 | 1416 | 1800 | 2152 |
| 20 | 6 | 18 | 376 | 776 | 1160 | 1544 | 1992 | 2344 |
| 21 | 6 | 19 | 408 | 840 | 1288 | 1736 | 2152 | 2600 |
| 22 | 6 | 20 | 440 | 904 | 1384 | 1864 | 2344 | 2792 |
| 23 | 6 | 21 | 488 | 1000 | 1480 | 1992 | 2472 | 2984 |
| 24 | 6 | 22 | 520 | 1064 | 1608 | 2152 | 2664 | 3240 |
| 25 | 6 | 23 | 552 | 1128 | 1736 | 2280 | 2856 | 3496 |
| 26 | 6 | 24 | 584 | 1192 | 1800 | 2408 | 2984 | 3624 |
| 27 | 6 | 25 | 616 | 1256 | 1864 | 2536 | 3112 | 3752 |
| 28 | 6 | 26 | 712 | 1480 | 2216 | 2984 | 3752 | 4392 |
| 29 | 2 | Reserved | - | - | - | - | - | - |
| 30 | 4 | Reserved | - | - | - | - | - | - |
| 31 | 6 | Reserved | - | - | - | - | - | - |

FIG. 36

| MCS index $I_{MCS}$ | Modulation order $Q_m$ | TBS index $I_{TBS}$ | $N_{PRB}$ | | | | | |
|---|---|---|---|---|---|---|---|---|
| | | | 1 | 2 | 3 | 4 | 5 | 6 |
| 0 | 2 | 0 | 16 | 16 | 16 | 16 | 16 | 16 |
| 1 | 2 | 1 | 24 | 24 | 24 | 24 | 24 | 24 |
| 2 | 2 | 2 | 32 | 32 | 32 | 32 | 32 | 32 |
| 3 | 2 | 3 | 40 | 40 | 40 | 40 | 40 | 40 |
| 4 | 2 | 4 | 56 | 56 | 56 | 56 | 56 | 56 |
| 5 | 2 | 5 | 72 | 72 | 72 | 72 | 72 | 72 |
| 6 | 2 | 6 | 328 | 104 | 88 | 88 | 120 | 152 |
| 7 | 2 | 7 | 104 | 120 | 144 | 144 | 176 | 208 |
| 8 | 2 | 8 | 120 | 144 | 176 | 176 | 208 | 256 |
| 9 | 2 | 9 | 136 | 176 | 208 | 208 | 256 | 328 |
| 10 | 4 | 9 | 136 | 224 | 224 | 256 | 328 | 408 |
| 11 | 4 | 10 | 144 | 256 | 256 | 328 | 424 | 504 |
| 12 | 4 | 11 | 176 | 296 | 328 | 392 | 504 | 600 |
| 13 | 4 | 12 | 208 | 296 | 392 | 472 | 584 | 712 |
| 14 | 4 | 13 | 224 | 328 | 456 | 536 | 680 | 808 |
| 15 | 4 | 14 | 256 | 376 | 456 | 616 | 776 | 936 |
| 16 | 4 | 15 | 280 | 440 | 504 | 616 | 776 | 936 |
| 17 | 6 | 15 | 280 | 488 | 584 | 680 | 872 | 1032 |
| 18 | 6 | 16 | 328 | 552 | 680 | 776 | 1000 | 1192 |
| 19 | 6 | 17 | 336 | 600 | 744 | 904 | 1128 | 1352 |
| 20 | 6 | 18 | 376 | 600 | 840 | 1000 | 1256 | 1544 |
| 21 | 6 | 19 | 408 | 632 | 904 | 1128 | 1416 | 1736 |
| 22 | 6 | 20 | 440 | 696 | 904 | 1224 | 1544 | 1800 |
| 23 | 6 | 21 | 488 | 776 | 968 | 1224 | 1544 | 1800 |
| 24 | 6 | 22 | 520 | 840 | 1064 | 1288 | 1608 | 1928 |
| 25 | 6 | 23 | 552 | 904 | 1160 | 1416 | 1800 | 2152 |
| 26 | 6 | 24 | 584 | 1000 | 1288 | 1544 | 1992 | 2344 |
| 27 | 6 | 25 | 616 | 1064 | 1384 | 1736 | 2152 | 2600 |
| 28 | 6 | 26 | 712 | 1128 | 1480 | 1864 | 2344 | 2792 |
| 29 | 2 | Reserved | - | - | - | - | - | - |
| 30 | 4 | Reserved | - | - | - | - | - | - |
| 31 | 6 | Reserved | - | - | - | - | - | - |

| DCI format | Search Space | Transmission scheme of PDSCH corresponding to PDCCH |
|---|---|---|
| DCI format 1A | Common and UE-specific | If the number of PBCH antenna ports is one, Single-antenna port, port 0 is used, otherwise Transmit diversity |

FIG. 43

| DCI format | Search Space | Transmission scheme of PDSCH corresponding to PDCCH |
|---|---|---|
| DCI format 1 | UE-specific | Single-antenna port, port 7 |

FIG. 44

| DCI format | Search Space | Transmission scheme of PDSCH corresponding to PDCCH |
|---|---|---|
| DCI format 1A | Common and UE-specific | If the number of PBCH antenna ports is one, Single-antenna port, port 0 is used, otherwise Transmit diversity |
| DCI format 1 | UE-specific | Single-antenna port, port 7 |

DEVICE COMMUNICATION USING A REDUCED CHANNEL BANDWIDTH

CROSS REFERENCE TO RELATED APPLICATIONS

This application is a continuation of the U.S. patent application Ser. No. 17/128,934, filed Dec. 21, 2020, which is a continuation of the U.S. patent application Ser. No. 16/117,782, filed Aug. 30, 2018, which is a continuation of U.S. patent application Ser. No. 13/632,037, filed Sep. 30, 2012, which issued as U.S. Pat. No. 10,111,224, which claims the benefit of U.S. Provisional Patent Application No. 61/542,114 filed Sep. 30, 2011, U.S. Provisional Patent Application No. 61/555,876 filed Nov. 4, 2011, U.S. Provisional Patent Application No. 61/591,632 filed Jan. 27, 2012, U.S. Provisional Patent Application No. 61/644,835 filed May 9, 2012, and U.S. Provisional Patent Application No. 61/682,042 filed Aug. 10, 2012, the contents of which are hereby incorporated by reference herein.

BACKGROUND

As wireless communication systems such as LTE systems mature and their network deployment evolve, network operators would like to reduce the cost of the communication network and/or maintenance of the communication network. One technique to reduce the cost of the network may be to reduce the channel bandwidth and data rate used to communicate with devices on the network. For example, a portion of the channel bandwidth rather than the entire channel bandwidth may be supported by the devices in the network and/or the network itself when communication with such devices. Unfortunately, current wireless communication systems do not support providing information such as channel information including control channel information, uplink information, downlink information, and the like on a reduced channel bandwidth.

SUMMARY

Systems and/or methods may be provided for supporting reduced channel bandwidth in wireless communications between devices such as UEs (e.g. including a low LTE UE category device) and/or low cost Machine-Type Communications (MTC) devices and networks that may support a full bandwidth (e.g. a full bandwidth network). For example, in one embodiment, a device may receive inband assignments such as downlink assignments and/or uplink grants. Based on such inband assignments, the device may monitor and/or decide one or more transmissions that may be provided by the network (e.g. in the narrow or reduced channel bandwidth).

Additionally, in an example embodiment, a device may receive information (e.g. a definition or configuration) associated with an ePDCCH that may be used by the device. The device may then monitor and/or decode ePDCCH resources based on such information (e.g. in the narrow or reduced channel bandwidth).

According to an embodiment, a device may also receive an indication for support of a narrow bandwidth by the full bandwidth network. The device may then monitor and/or decide channels such as broadcast or control channels based on the indication.

In embodiments, a PRACH preamble and/or a multi-type subframe definition may also be provided and/or used for support of such a reduced bandwidth. For example, a device may provide a PRACH preamble to a network component such as a E-UTRAN or eNB such that the network component may receive the PRACH preamble, may determine whether the device may be a reduced bandwidth device or another special device, may provide a random access response for a special device when the device may be a reduced bandwidth device, may receive a scheduled transmission, and/or may provide a contention resolution. Additionally, a multi-type subframe definition may be received by a device such that the device may monitor transmission based on the multi-type subframe definition.

The Summary is provided to introduce a selection of concepts in a simplified form that are further described below in the Detailed Description. This Summary is not intended to identify key features or essential features of the claimed subject matter, not is it intended to be used to limit the scope of the claimed subject matter. Furthermore, the claimed subject matter is not limited to any limitations that solve any or all disadvantages noted in any part of this disclosure.

BRIEF DESCRIPTION OF THE DRAWINGS

A more detailed understanding of the embodiments disclosed herein may be had from the following description, given by way of example in conjunction with the accompanying drawings.

FIG. 6 illustrates a table of example embodiments of a control format indicator (CFI) codeword.

FIG. 7 illustrates a table of example embodiments of the number of OFDM symbols that may be used for a physical downlink control channel (PDCCH).

FIG. 10 illustrates a table showing an example embodiment of an orthogonal sequence according to a sequence index and spreading factor.

FIG. 11 illustrates a table showing example embodiments of PDCCH formats that may be supported.

FIG. 22 illustrates a table listing example embodiments of available zero-power CSI-RS configurations in FDD.

FIGS. 26 and 27 illustrate tables of example embodiments of a CFI codeword for 2 PCFICH REGs in a MTC bandwidth and CFI codeword for 1 PCFICH REG in a MTC bandwidth, respectively.

FIG. 30A illustrates a table of example embodiments of different system bandwidths and RGB sizes.

FIG. 30B illustrates a table of example embodiments of different MTC bandwidths and RGB sizes.

FIG. 31 illustrates a table of example embodiments of CSI reporting.

FIG. 32 illustrates a table of example embodiments of different UE categories and data rates.

FIG. 35 illustrates a table of an example embodiment of a MTC device-specific configuration of a M-PDCCH region and/or a M-PDSCH region.

FIG. 36 illustrates a table of an example embodiment of TBS and a modulation order based on a MCS index (e.g. type-1).

FIG. 37 illustrates a table of an example embodiment of TBS and a modulation order based on a MCS index (e.g. type-2).

FIG. 42 illustrates an example embodiment of a PDCCH and/or PDSCH configured by a device RNTI such as MTC-RNTI (e.g. CRS-based).

FIG. 43 illustrates an example embodiment of a PDCCH and/or PDSCH configured by a device RNTI such as MTC-RNTI (e.g. DMRS-based).

FIG. 44 illustrates an example embodiment of a PDCCH and/or PDSCH configured by a device RNTI such as MTC-RNTI (e.g. CRS/DMRS-based).

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Systems and/or methods for supporting reduced channel bandwidth in wireless communications using devices such as UEs and/or low cost Machine-Type Communications (MTC) devices may be disclosed herein. To support such reduced channel bandwidth, inband assignment of downlink (DL) and/or uplink (UL) transmission resources, PCFICH and/or PDCCH over zero-power CSI-RS in a data region, PCFICH. PHICH, and/or PDCCH transmission in a control region, multiplexing control and/or data transmission, and/or network configuration for the UE or MTC device may be provided and/or used as described herein. Additionally. DL receiver complexity reduction and/or UL enhancements for such reduced channel bandwidth, PRACH procedures for such reduced channel bandwidth, broadcasting channel (e.g. SIB or SIB-x) reception or transmission procedures or methods for such reduced channel bandwidth, paging procedures or methods for such reduced channel bandwidth, data channels for such reduced channel bandwidth, cell selection and/or reselection in such reduced channel bandwidth may be provided and/or used as described herein. In example embodiments, a DCI format for the UE and/or MTC device that may operate on or use a reduced channel bandwidth, TBS capabilities for the reduced channel bandwidth, physical downlink shared channel (PDSCH) reception that may include ePDCCH in a reduced channel bandwidth, and/or device identification capabilities such as UE and/or MTC device identification that may operate on or use reduced channel bandwidth may also be provided.

Figure 1A:
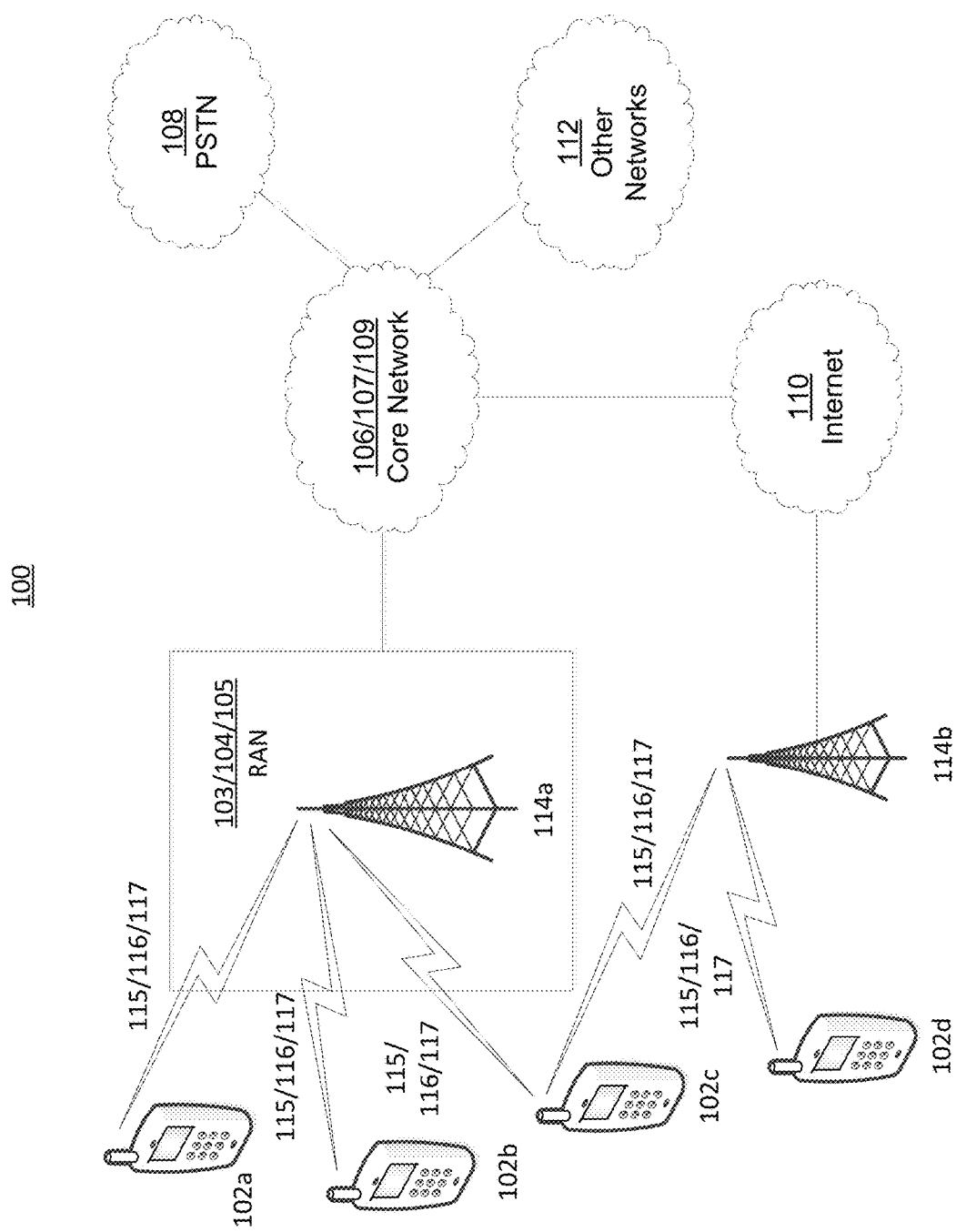
FIG. 1A depicts a diagram of an example communications system in which one or more disclosed embodiments may be implemented.

FIG. 1A depicts a diagram of an example communications system 100 in which one or more disclosed embodiments may be implemented. The communications system 100 may be a multiple access system that provides content, such as voice, data, video, messaging, broadcast, etc., to multiple wireless users. The communications system 10M may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a. 102b. 102c, and/or 102d (which generally or collectively may be referred to as WTRU 102), a radio access network (RAN) 103/104/105, a core network 106/107/10), a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, and/or 102d may be any type of device configured to operate and/or communicate in a wireless environment. By way of example, the WTRUs 102a, 102b, 102c, and/or 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, and/or 102d to facilitate access to one or more communication networks, such as the core network 106/107/109, the Internet 110, and/or the networks 112. By way of example, the base stations 114a and/or 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a and/or 114b may communicate with one or more of the WTRUs 102a, 102b, 102c, and/or 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, and/or 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, and/or 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a. 102b, and/or 102c may implement radio technologies such as IEEE 802.16 (i.e., Worldwide Interoperability for Microwave Access (WiMAX)), CDMA2000, CDMA2000 IX, CDMA2000 EV-DO. Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, and/or 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, and/or 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, and/or 102d in the communications system 100 may include multi-mode capabilities, i.e., the WTRUs 102a, 102b, 102c, and/or 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
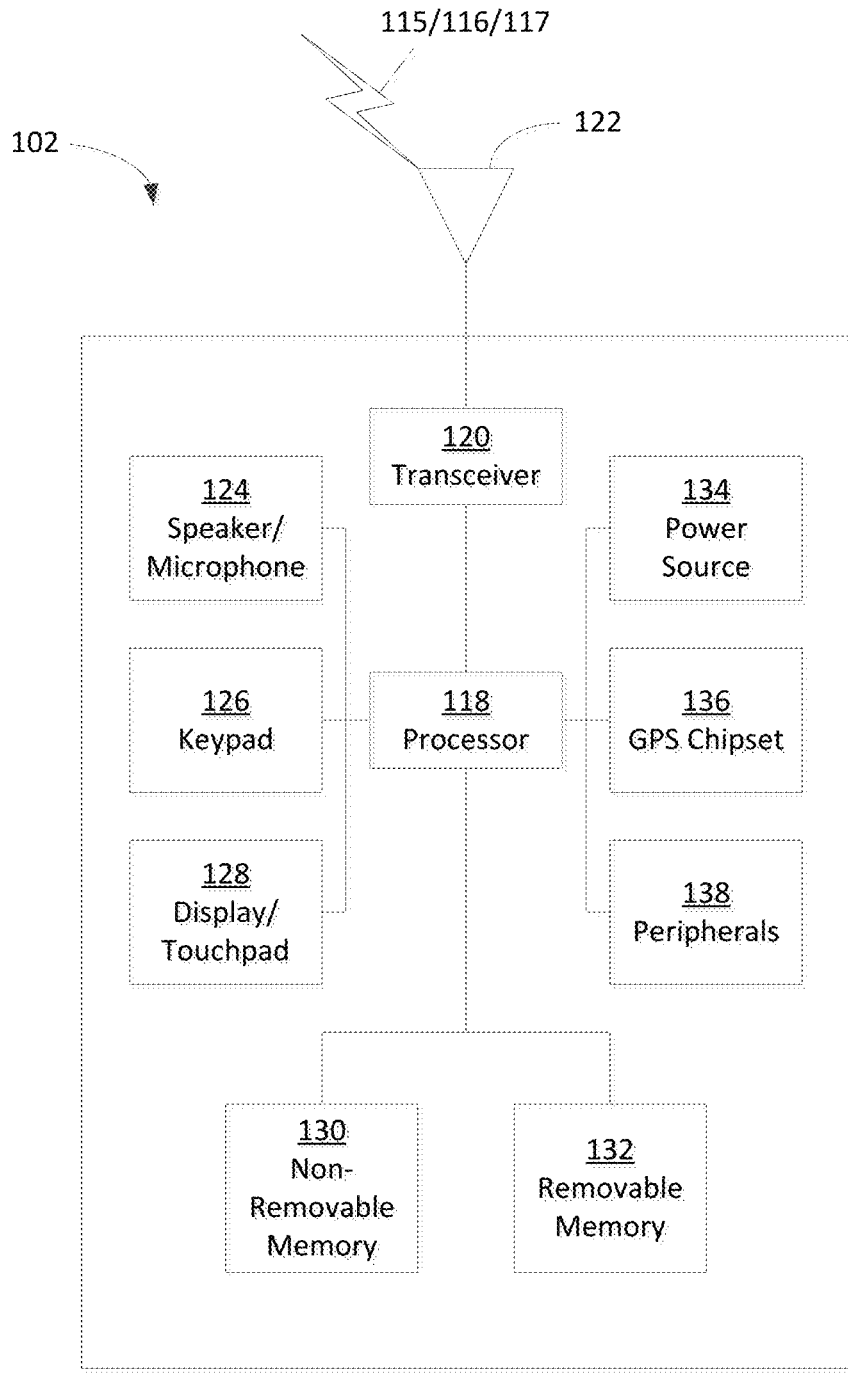
FIG. 1B depicts a system diagram of an example wireless transmit/receive unit (WTRU) that may be used within the communications system illustrated in FIG. 1A.

FIG. 1B depicts a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and prow nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it may be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetootht® module, a frequency modulated (FM) radio unit, a digital music player, a media player, a video game player module, an Internet browser, and the like.

Figure 1C:
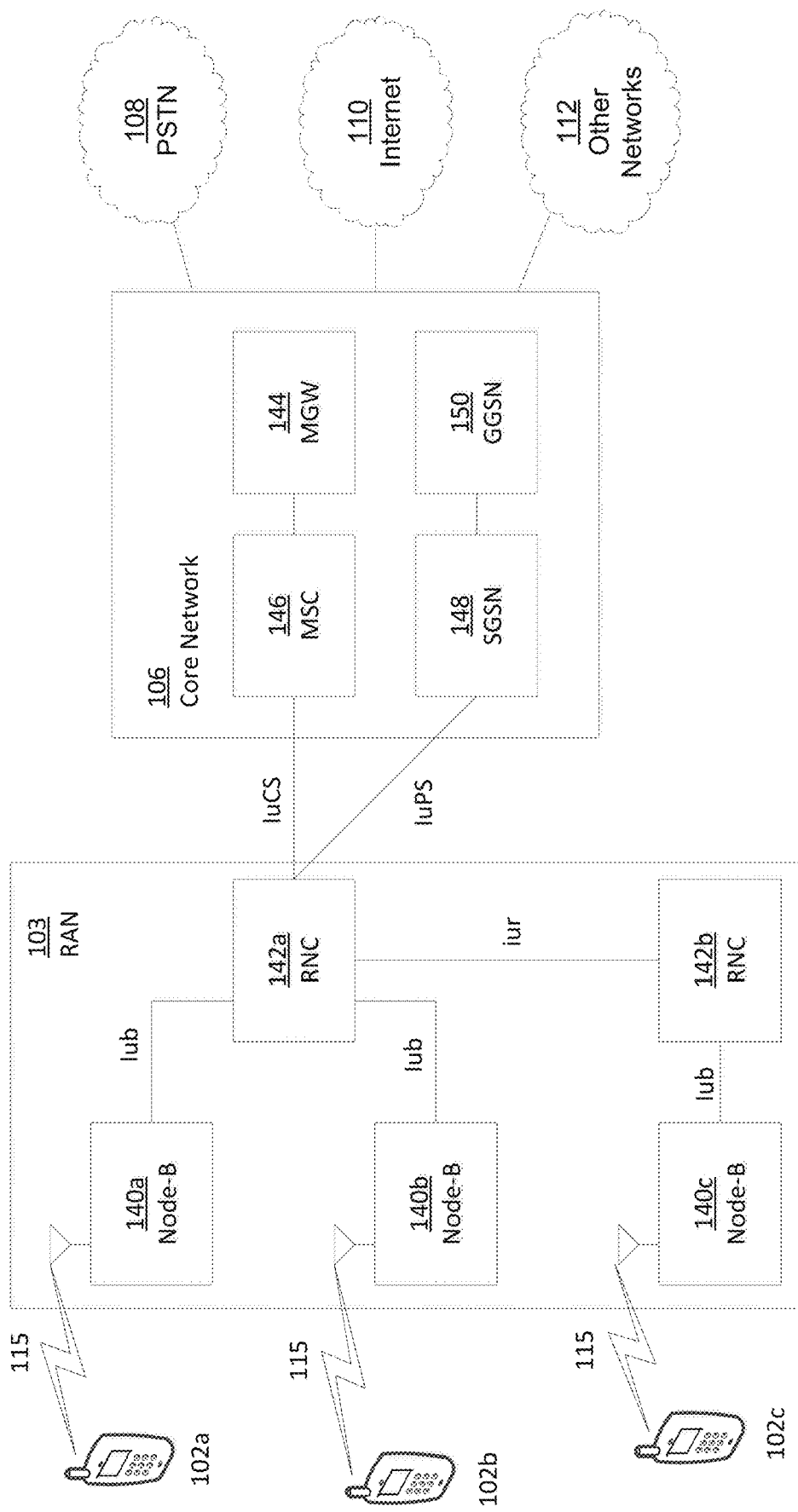
FIG. 1C depicts a system diagram of an example radio access network and an example core network that may be used within the communications system illustrated in FIG. 1A.

FIG. 1C depicts a system diagram of the RAN 103 and the core network 106 according to an embodiment. As noted above, the RAN 103 may employ a UTRA radio technology to communicate with the WTRUs 102a, 102b, and/or 102c over the air interface 115. The RAN 103 may also be in communication with the core network 106. As shown in FIG. 1C, the RAN 103 may include Node-Bs 140a, 140b, and/or 140c, which may each include one or more transceivers for communicating with the WTRUs 102a, 102b, and/or 102c over the air interface 115. The Node-Bs 140a, 140b, and/or 140c may each be associated with a particular cell (not shown) within the RAN 103. The RAN 103 may also include RNCs 142a and/or 142b. It will be appreciated that the RAN 103 may include any number of Node-Bs and RNCs while remaining consistent with an embodiment.

As shown in FIG. 1C, the Node-Bs 140a and/or 140b may be in communication with the RNC 142a. Additionally, the Node-B 140c may be in communication with the RNC 142b. The Node-Bs 140a, 140b, and/or 140c may communicate with the respective RNCs 142a, 142b via an Iub interface. The RNCs 142a, 142b may be in communication with one another via an Iub interface. Each of the RNCs 142a, 142b may be configured to control the respective Node-Bs 140a, 140b, and/or 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a. 102b, and/or 102c with access to circuit-switched networks, such as the PSTN 108, to facilitate communications between the WTRUs 102a, 102b, and/or 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a. 102b, and/or 102c with access to packet-switched networks, such as the Internet 110, to facilitate communications between and the WTRUs 102a, 102b, and/or 102c and IP-enabled devices.

As noted above, the core network 106 may also be connected to the networks 112, which may include other wired or wireless networks that are owned and/or operated by other service providers.

Figure 1D:
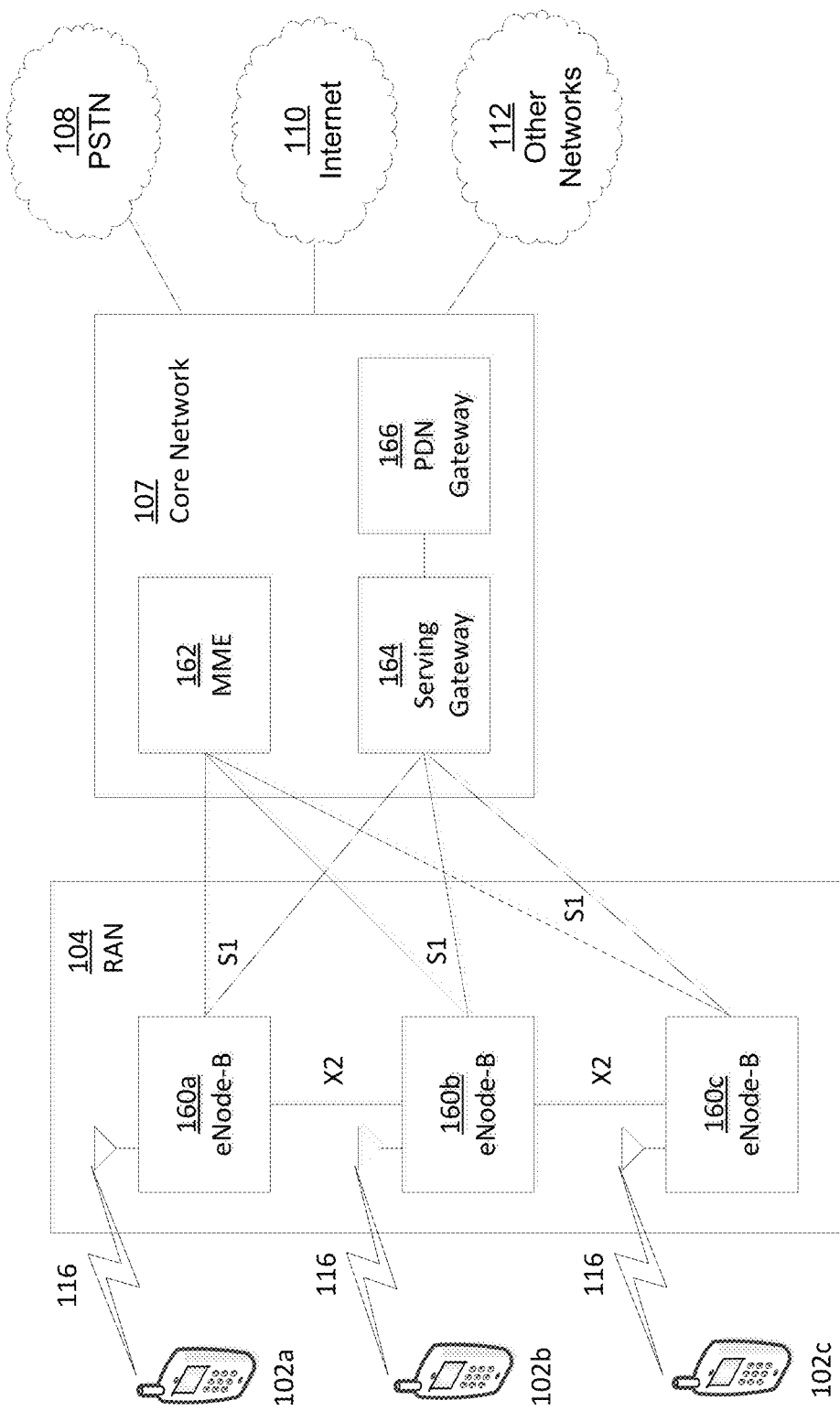
FIG. 1D depicts a system diagram of another example radio access network and an example core network that may be used within the communications system illustrated in FIG. 1A.

FIG. 1D depicts a system diagram of the RAN 104 and the core network 107 according to an embodiment. As noted above, the RAN 104 may employ an E-UTRA radio technology to communicate with the WTRUs 102a, 102b, and/or 102c over the air interface 116. The RAN 104 may also be in communication with the core network 107.

The RAN 104 may include eNode-Bs 160a, 160b, and/or 160c, though it will be appreciated that the RAN 104 may include any number of eNode-Bs while remaining consistent with an embodiment. The eNode-Bs 160a. 160b, and/or 160c may each include one or more transceivers for communicating with the WTRUs 102a, 102b, and/or 102c over the air interface 116. In one embodiment, the eNode-Bs 160a, 160b, and/or 160c may implement MIMO technology. Thus, the eNode-B 160a, for example, may use multiple antennas to transmit wireless signals to, and receive wireless signals from, the WTRU 102a.

Each of the eNode-Bs 160a, 160b, and/or 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, and/or 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and/or 160c in the RAN 104 via an SI interface and may serve as a control node. For example, the MME 162 may be responsible for authenticating users of the WTRUs 102a, 102b, and/or 102c, bearer activation/deactivation, selecting a particular serving gateway during an initial attach of the WTRUs 102a, 102b, and/or 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and/or 160c in the RAN 104 via the S1 interface. The serving gateway 164 may generally route and forward user data packets to/from the WTRUs 102a. 102b, and/or 102c. The serving gateway 164 may also perform other functions, such as anchoring user planes during inter-eNode B handovers, triggering paging when downlink data is available for the WTRUs 102a, 102b, and/or 102c, managing and storing contexts of the WTRUs 102a, 102b, and/or 102c, and the like.

The serving gateway 164 may also be connected to the PDN gateway 166, which may provide the WTRUs 102a, 102b, and/or 102c with access to packet-switched networks, such as the Internet 110, to facilitate communications between the WTRUs 102a, 102b, and/or 102c and IP-enabled devices.

The core network 107 may facilitate communications with other networks. For example, the core network 107 may provide the WTRUs 102a, 102b, and/or 102c with access to circuit-switched networks, such as the PSTN 108, to facilitate communications between the WTRUs 102a, 102*b*, and/or 102*c* and traditional land-line communications devices. For example, the core network 107 may include, or may communicate with, an IP gateway (e.g., an IP multi-media subsystem (IMS) server) that serves as an interface between the core network 107 and the PSTN 108. In addition, the core network 107 may provide the WTRUs 102*a*, 102*b*, and/or 102*c* with access to the networks 112, which may include other wired or wireless networks that are owned and/or operated by other service providers.

Figure 1E:
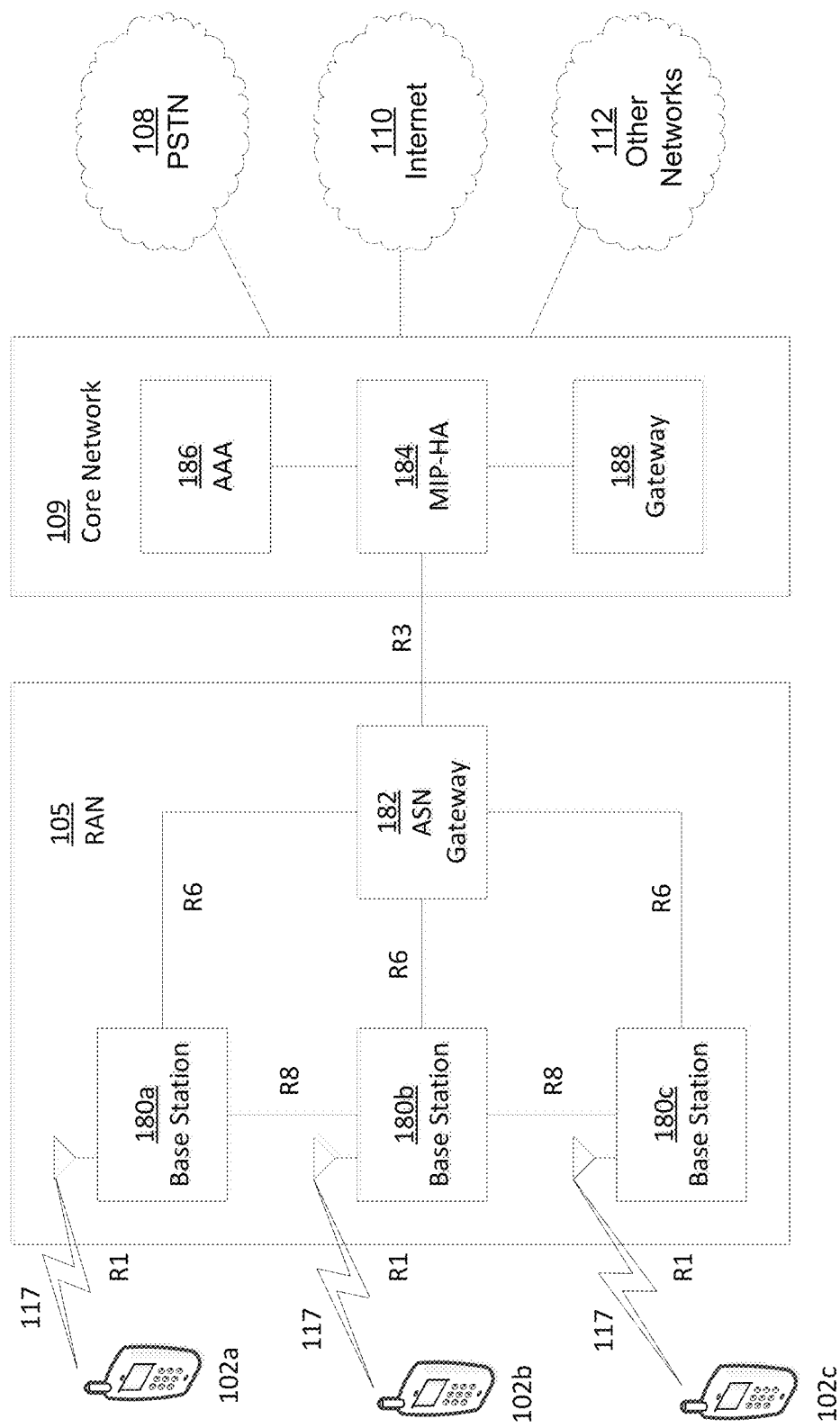
FIG. 1E depicts a system diagram of another example radio access network and an example core network that may be used within the communications system illustrated in FIG. 1A.

FIG. 1E depicts a system diagram of the RAN 105 and the core network 109 according to an embodiment. The RAN 105 may be an access service network (ASN) that employs IEEE 802.16 radio technology to communicate with the WTRUs 102*a*, 102*b*, and/or 102*c* over the air interface 117. As will be further discussed below, the communication links between the different functional entities of the WTRUs 102*a*, 102*b*, and/or 102*c*, the RAN 105, and the core network 109 may be defined as reference points.

As shown in FIG. 1E, the RAN 105 may include base stations 180*a*, 180*b*, and/or 180*c*, and an ASN gateway 182, though it will be appreciated that the RAN 105 may include any number of base stations and ASN gateways while remaining consistent with an embodiment. The base stations 180*a*, 180*b*, and/or 180*c* may each be associated with a particular cell (not shown) in the RAN 105 and may each include one or more transceivers for communicating with the WTRUs 102*a*, 102*b*, and/or 102*c* over the air interface 117. In one embodiment, the base stations 180*a*. 180*b*, and/or 180*c* may implement MIMO technology. Thus, the base station 180*a*, for example, may use multiple antennas to transmit wireless signals to, and receive wireless signals from, the WTRU 102*a*. The base stations 180*a*. 180*b*, and/or 180*c* may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102*a*, 102*b*, and/or 102*c* and the RAN 105 may be defined as an R1 reference point that implements the IEEE 802.16 specification. In addition, each of the WTRUs 102*a*, 102*b*, and/or 102*c* may establish a logical interface (not shown) with the core network 109. The logical interface between the WTRUs 102*a*, 102*b*, and/or 102*c* and the core network 109 may be defined as an R2 reference point, which may be used for authentication, authorization, IP host configuration management, and/or mobility management.

The communication link between each of the base stations 180*a*, 180*b*, and/or 180*c* may be defined as an R8 reference point that includes protocols for facilitating WTRU handovers and the transfer of data between base stations. The communication link between the base stations 180*a*, 180*b*, and/or 180*c* and the ASN gateway 182 may be defined as an R6 reference point. The R6 reference point may include protocols for facilitating mobility management based on mobility events associated with each of the WTRUs 102*a*, 102*b*, and/or 102*c*.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102*a*, 102*b*, and/or 102*c* to roam between different ASNs and/or different core networks. The MIP-HA 184 may provide the WTRUs 102*a*, 102*b*, and/or 102*c* with access to packet-switched networks, such as the Internet 110, to facilitate communications between the WTRUs 102*a*, 102*b*, and/or 102*c* and IP-enabled devices. The AAA server 186 may be responsible for user authentication and for supporting user services. The gateway 188 may facilitate interworking with other networks. For example, the gateway 188 may provide the WTRUs 102*a*, 102*b*, and/or 102*c* with access to circuit-switched networks, such as the PSTN 108, to facilitate communications between the WTRUs 102*a*, 102*b*, and/or 102*c* and traditional land-line communications devices. In addition, the gateway 188 may provide the WTRUs 102*a*, 102*b*, and/or 102*c* with access to the networks 112, which may include other wired or wireless networks that are owned and/or operated by other service providers.

Although not shown in FIG. 1E, it should, may, and/or will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102*a*, 102*b*, and/or 102*c* between the RAN 105 and the other ASNs. The communication link between the core network 109 and the other core networks may be defined as an R5 reference, which may include protocols for facilitating interworking between home core networks and visited core networks.

As described above, as wireless communication systems such as LTE systems mature and their network deployment evolve, network operators may want or wish to reduce the cost of the devices that may communicate with LTE network. One technique to reduce the cost of the device may be to reduce the channel bandwidth and data rate used to communicate with the network. For example, a portion of the channel bandwidth rather than the entire channel bandwidth may be supported by the devices in the network and/or the network itself when communication with such devices. Unfortunately, current wireless communication systems do not support providing information such as channel information including control channel information, uplink information, downlink information, and the like on a reduced channel bandwidth.

For example, an example for the application of wireless communications technology may include Machine-Type Communications (MTC). MTC may be a market that may be likely to expand in the foreseeable future as wireless technology advances. Devices such as MTC devices or other UE devices may be targeted for low-end (e.g. low cost, low data rate) applications that may be handled by the GSM/GPRS network. Unfortunately (e.g. due to the low cost of operations or reduced operation supported with such a device), the motivation for migrating such a device to a network such as an LTE network may be dampened. In an embodiment, the reluctance of migrating to such a device to a network such as an LTE network may cost network operators in terms of maintaining multiple RATs and/or may prevent operators from reaping the maximum benefit out of their spectrum (e.g. given a non-optimal spectrum efficiency of GSM/GPRS). Additionally, given the likely high number of such devices, the overall spectrum resource a network operator may use for service provision in GSM/GPRS may be increased (e.g. significant or high) and/or may be inefficiently assigned. As such (e.g. as described herein), systems and/or methods (e.g. low cost systems and/or methods) for migrating such a device to a network such as an LTE network may be provided and/or used. Such systems and/or methods may ensure that there may be a clear business benefit to MTC device vendors and operators for migrating low-end MTC devices from GSM/GPRS to LTE networks.

As described herein, a low cost device such as a UE or MTC device may generally include, but may not be limited to, certain reduction of a general WTRU capability and functionality such as lower data rate, lower power consumption and simpler implementation, and the like that may reduce the implementation complexity include lowering the radio frequency (RF) component count for such devices. For example, in such devices a reduced number of radio access technologies (RATs) or RF chains may be supported. Additionally, in such devices, reducing the maximum applicable transmission power in the uplink (UL) for such a device, the maximum supported receive (Rx) or transmit (Tx) channel bandwidth may be reduced and/or a half-duplex FDD mode may be supported.

Additionally, the introduction of low-cost devices such as MTC devices into networks may be provided while maintaining service coverage and the use of such devices should not result in a penalty in terms of achievable spectrum efficiency during operation. In example embodiments, low-cost devices such as MTC devices when introduced into a network may be inter-operable with legacy UEs or WTRUs (e.g. Release 8-10 LTE WTRUs) (e.g. such devices should be able to communicate on an existing LTE radio on a carrier). In addition, the low-cost devices such as MTC devices may still support mobility and roaming.

Figure 2:
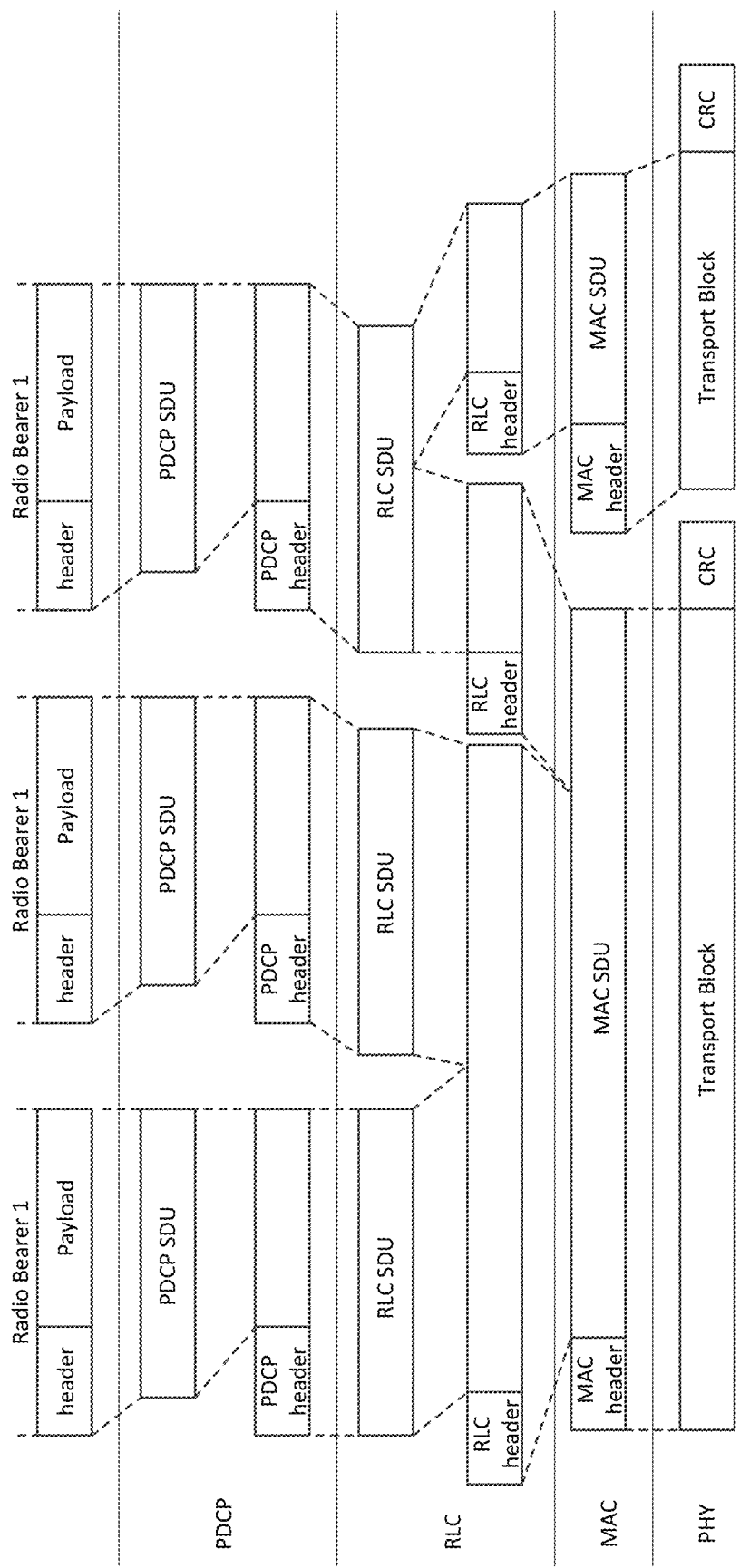
FIG. 2 illustrates an example of long term evolution (LTE) protocol processing across L1, L2 and L3.

In example embodiments, as described herein, the low-cost devices such as MTC or UE devices that may use a reduced channel bandwidth may be used in a LTE radio network and/or protocol architecture. The LTE radio network may provide radio bearers to which IP packets may be mapped protocol when processing in both the DL and/or UL directions. In such a network, the PDCP may perform IP header compression, ciphering in the Control Plane, integrity protection for transmitted data and may provide in-sequence delivery and duplicate removal during mobility. The RLC may also perform segmentation and/or concatenation, re-transmission handling, and duplicate detection and in-sequence delivery. The MAC that may be used in the network may multiplex logical channels, performs Hybrid ARQ, and does DL and UL scheduling. The Physical Layer processing may include functionalities like channel coding and/or decoding, modulation and/or demodulation, multiple antenna mapping, and the like. The LTE radio protocol architecture for the user plane PDCP, RLC, MAC and L1 that may be used may be shown in FIG. 2.

According to example embodiments, LTE data transmission in the DL and UL may be or may include DL-SCH and UL-SCH transport channels. Each transport channel may be mapped to a corresponding physical channel. In the DL or DL direction, the DL-SCH transmitted to a handset may be mapped to the HS-PDSCH and may include one or more transport blocks (e.g. two in the case of Spatial Multiplexing) per TTI (e.g. subframe). Similarly, in the UL or UL direction, the PUSCH may include a transport block per TTI (e.g. in R8) or up to two transport blocks per TTI (e.g. in R10) when Spatial Multiplexing may be used.

In addition to the physical channels that may carry data or control signaling such as RRC, there may also be physical channels without a corresponding transport channel including L1/L2 control channels. Such L1/L2 control channels may be mainly used to send DL Control Information (DCI) to handsets. In embodiments, DL control information may include information that may be used by a terminal to properly decode the PDSCH in a TTI, may assign PUSCH transmission resources to handsets, may include power-control commands, and the like.

Additionally, in such a network, DCIs may be sent to handsets using the PDCCH. For example, in a given subframe (TI), a handset may monitor the PDCCH for DCI messages. When a DCI indicating a DL assignment may be received, the handset may attempt to demodulate and decode a PDSCH in the data region of that same subframe. Similarly, when the handset decodes an UL grant on the PDCCH in subframe n, it may prepare for UL transmission of a PUSCH in subframe n+4.

According to an example embodiment, reception of DCI's in the PDCCH inside the Control Region of a subframe may be part (e.g. an integral part) of the DL and UL channel assignment procedures or methods for PDSCH and PUSCH (e.g. in LTE). DCIs, for example, that may be inside the PDCCH of a Control Region may announce which handset(s) may have a DL transmission allocated in the Data Region of that subframe and which transmission resources may be allocated. Furthermore, the DCIs that may be carrying the DL assignments or UL grants may include specifics with respect to the encoding format chosen for the PDSCH or PUSCH such as MCS, TB size (e.g. transport block size or TBS), RV, and the like.

Figure 3:
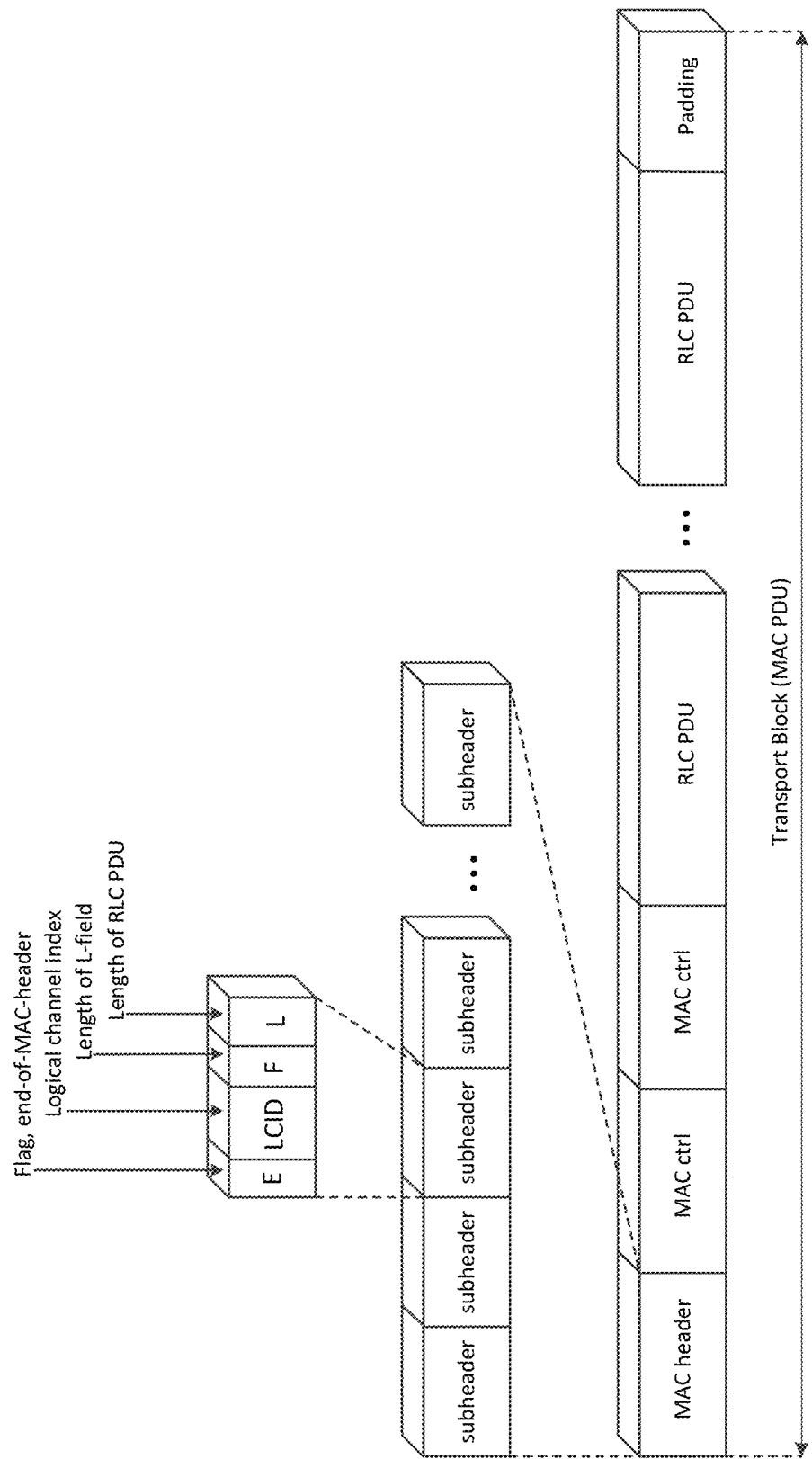
FIG. 3 illustrates an example embodiment of a medium access control (MAC) protocol header in a communication network such as an LTE network.

When a device such as a UE or handset decodes the PDSCH carrying 1 or 2 TBs, the device may also decode MAC and RLC header information that may be part of the PDSCH transmission. In an embodiment, information included within these MAC or RLC headers (e.g. in R8 to R10 LTE) may pertain to the functionalities implemented by the MAC and RLC protocol. For example, the MAC and RLC header fields (e.g. in LTE) may include counter and PDU sequence number fields to support re-assembly and in-sequence detection and/or they may include MAC sub-headers to indicate presence of logical data versus control channels or the multiplexing of MAC control elements (e.g. as shown in FIG. 3). Additionally, the DL assignment for a PDSCH in the same subframe, or the UL grant in DL subframe n that may pertain to a PUSCH transmission resource in UL subframe n+4 may be sent to the handset through the PDCCH DCIs in the form of separate physical layer signaling using the PDCCH (e.g. in LTE).

Figure 4:
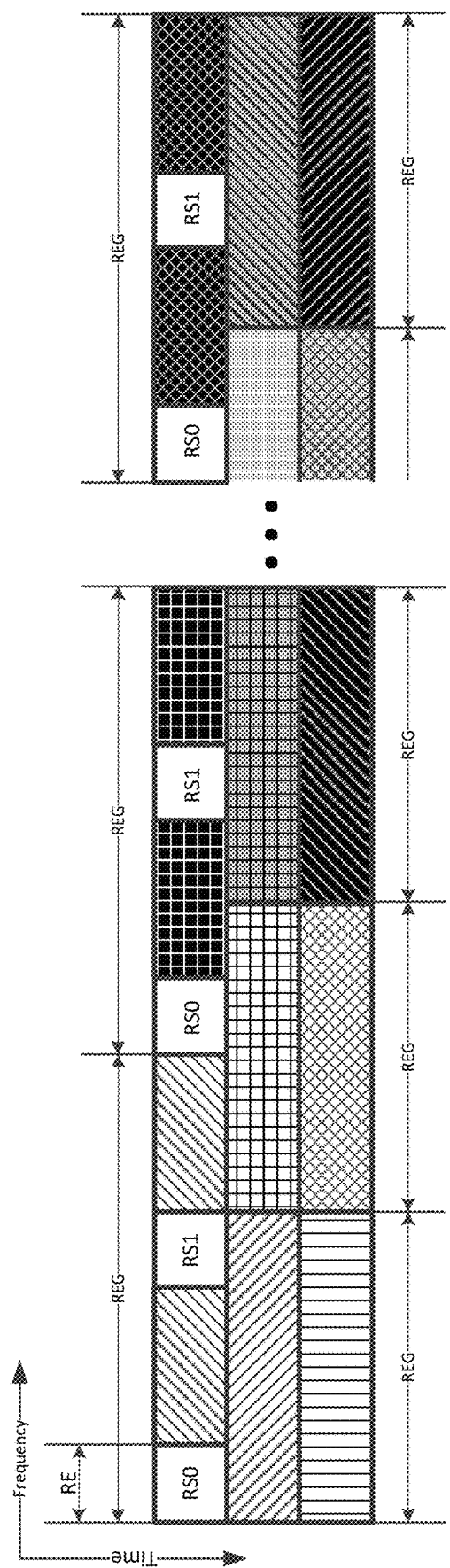
FIG. 4 illustrates an example embodiment of a REG definition in a downlink control channel region with 2Tx channel state information reference signals (CRS).
Figure 5:
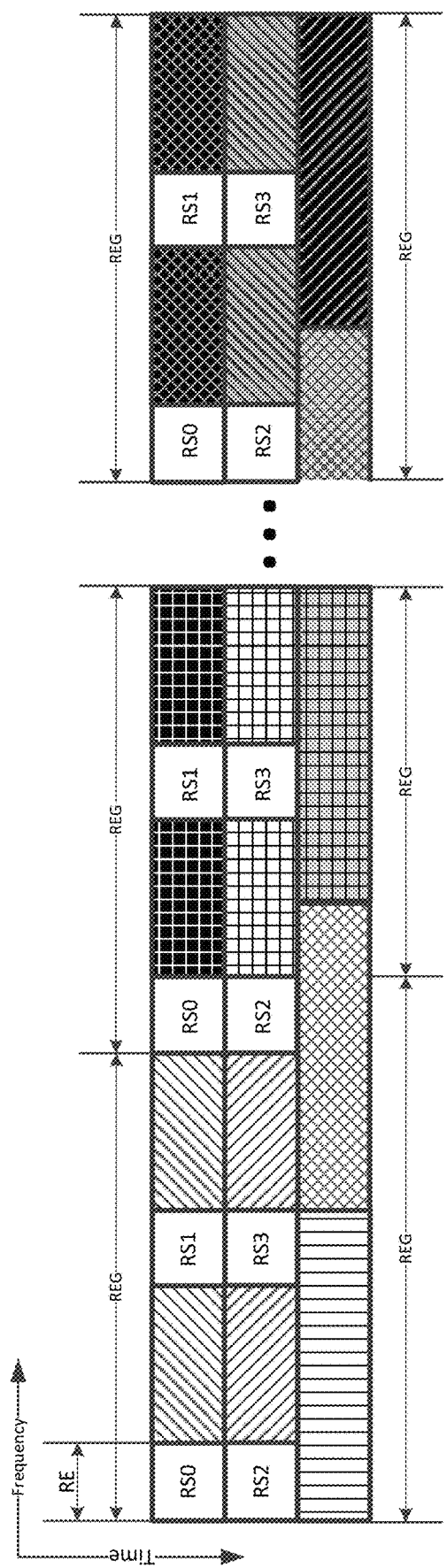
FIG. 5 illustrates an example embodiment of a REG definition in a downlink control channel region with 4Tx CRS.

In an example embodiment, downlink control channels (e.g. in LTE) may achieve uniform coverage in a cell while providing robustness in high mobility irrespective of the UE architecture or geometry. The LTE downlink control channels may occupy the first one to three OFDM symbol(s) in each subframe according to or based on the overhead of the control channels. Such a dynamic resource allocation to handle downlink control channel overhead may enable or allow efficient downlink resource utilization that may result in or provide a higher system throughput. Different types of downlink control channels may be (e.g. in general) transmitted within the downlink control channel region in each subframe including, for example, a PCFICH (Physical Control Format Indicator Channel), a PHICH (Physical Hybrid-ARQ Indicator Channel), a PDCCH (Physical Downlink Control Channel), and the like. In an example embodiment, the downlink control channel resource unit may be defined as or may include four contiguous REs in frequency domain called REG (Resource Elements Group) as shown in FIGS. 4 and 5. For example, if a CRS may be located in the same OFDM symbol, the REG may be four contiguous REs without a CRS. FIGS. 4 and 5 show the definition of REGs according to the number of CRS ports.

According to an example embodiment, a PCFICH (Physical Control Format Indicator Channel) may be provided and/or used. The PCFICH may be transmitted in the 0th OFDM symbol in each subframe and it may indicate the number of OFDM symbols that may be used for downlink control channel in the subframe. In an embodiment, the subframe-level dynamic downlink control channel resource allocation may be provided or implemented by using the PCFICH. For example, a UE may detect a CFI (Control Format Indicator) from a PCFICH and the downlink control channel region may be indicated in the subframe according the CFI value. FIG. 6 shows a CFI codeword that may be detected from the PCFICH, and FIG. 7 shows a table of an available number of OFDM symbols that may be used for the downlink control channel according to the duplex mode, subframe type, and/or system bandwidth. In one embodiment (e.g. as an exception), the PCFICH may be skipped if a subframe may be defined as non-PDSCH supportable subframe so a UE may not try to detect PCFICH in the subframe.

Figure 8:
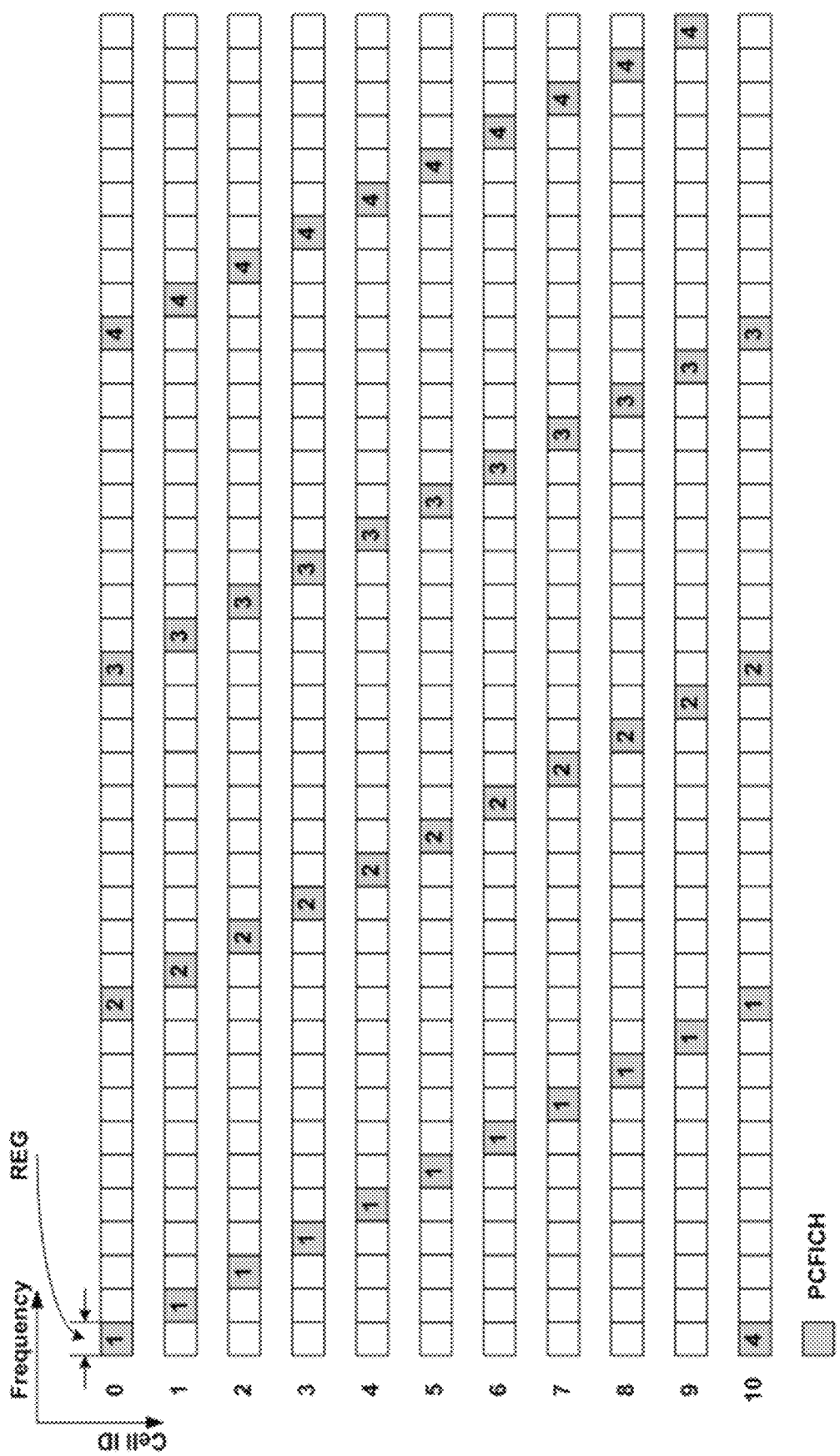
FIG. 8 illustrates an example embodiment of a Physical Control Format Indicator Channel (PCFICH) 4 REGs allocation according to PCI.

As described herein, in an example embodiment, four REGs may be used for PCFICH transmission in the 0th OFDM symbol in a subframe and the REGs may be uniformly distributed in a whole system bandwidth to exploit frequency diversity gain. Additionally, the starting point of PCFICH transmission may be different based on a physical cell-ID (PCI) as shown in FIG. 8.

Additionally, in an embodiment, a frequency shift of the PCFICH that may be tied with a cell-ID may enable or allow the performance of a PCFICH detection by, for example, avoiding PCFICH collision among multiple neighbor cells while achieving a diversity order four from its distributed allocation. At a UE receiver, downlink control channel detection may be performed. Such a downlink control channel may first decode the PCFICH to determine or figure out the number of OFDM symbol in the subframe. Given that downlink control resource may be defined by PCFICH, the PCFICH detection error may result in or provide a loss of a downlink grant, an uplink grant, and/or PHICH reception.

Figure 9:
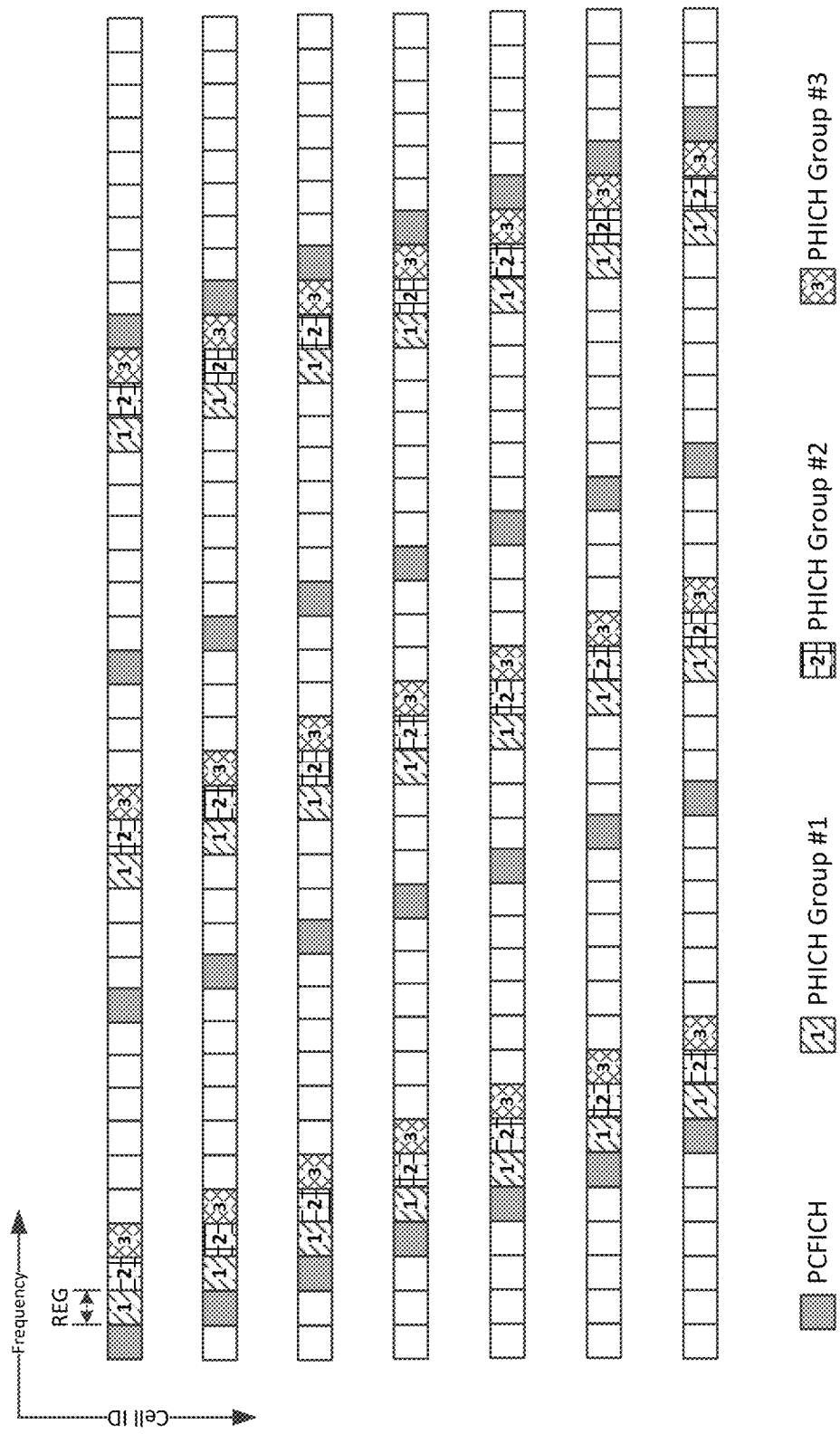
FIG. 9 illustrates an example embodiment of a PCFICH and PHICH REGs allocation according to PCI (e.g. using 40 RBs).

In embodiments, a PHICH (Physical Hybrid-ARQ Indicator Channel) may also be provided and/or used. For example, the PHICH may be used to transmit ACK or NACK corresponding to the PUSCH transmitted in an uplink subframe. A PHICH may further be transmitted in distributed manner across system bandwidth and OFDM symbols within downlink control channel. The number of OFDM symbols may be defined as a PHICH duration and may be configurable via higher layer signaling. According to an embodiment, the PHICH resource position may vary, according to PHICH duration, which may be different from the PCFICH. FIG. 9 shows the PCFICH and PHICH resource allocations. As shown in FIG. 9, multiple PHICH groups may be defined in a cell. Additionally, a PHICH group may include multiple PHICHs with orthogonal sequences and the PHICH for a UE may be defined dynamically with resource information in uplink grant such as a lowest PRB index ($I_{PRB\_RA}^{lowest\_index}$) and DM-RS cyclic shift ($n_{DMRS}$). As such, in an embodiment, two index pairs (PHICH group index: $n_{PHICH}^{group}$, PHICH sequence index: $n_{PHICH}^{seq}$) may indicate the PHICH resource for a specific UE. In the PHICH index pair ($n_{PHICH}^{group}$, $n_{PHICH}^{seq}$) each index may be defined as follows $$n_{PHICH}^{group} = (I_{PRB\_RA}^{lowest\_index} + n_{DMRS}) \bmod N_{PHICH}^{group}$$

$$n_{PHICH}^{seq} = (\lfloor I_{PRB\_RA}^{lowest\_index} / N_{PHICH}^{group} \rfloor + n_{DMRS}) \bmod 2N_{SF}^{PHICH}$$

where the $N_{PHICH}^{group}$ may denote the number of PHICH group available in the system with following definition $$N_{PHICH}^{group} = \begin{cases} \lceil N_g(N_{RB}^{DL}/8) \rceil \\ 2 \cdot \lceil N_g(N_{RB}^{DL}/8) \rceil \end{cases}$$

where Ng may be 2-bit information that may be transmitted via a PBCH (Physical Broadcasting Channel) and the information may be within $N_g \in \{1/6, 1/2, 1, 2\}$. According to an example embodiment, the orthogonal sequence that may be used herein may be based on the spreading factor and/or sequence index as shown in the table of FIG. 10.

In an example embodiment, a PDCCH (Physical Downlink Control Channel) may be provided and/or used. The PDCCH may be defined with one or multiple consecutive CCE (Control Channel Element) resources in which one CCE may include multiple REGs (e.g. nine REGs). The number of available CCE ($N_{CCE}$) may be defined with $N_{CCE} = \lfloor N_{REG}/9 \rfloor$ where $N_{REG}$ may be the number of REGs that may not be assigned to PCFICH or PHICH. The table in FIG. 11 shows example embodiments of available PDCCH formats that may be used herein by definition of number of consecutive CCEs.

Additionally, a Random Access (RA) method or procedure and/or a PRACH (Physical Random Access Control Channel) may be provided and/or used. In embodiments (e.g. in LTE), the Random Access method or procedure may be used in one or more events including one or more of the following: for a RRC Connection Request such as for an initial access or to register; for RRC Connection re-establishment such as following a radio link failure (RLF); during a handover to access a target cell; to obtain UL synchronization such as when UL synchronization may be lost and DL data may arrive or there may be UL data to send; when the UE may have UL data to send and there may be no dedicated resources (e.g. no PUCCH resources have been assigned to the UE); for positioning purposes such as when timing advance may be used for UE positioning; and the like.

Figure 12:
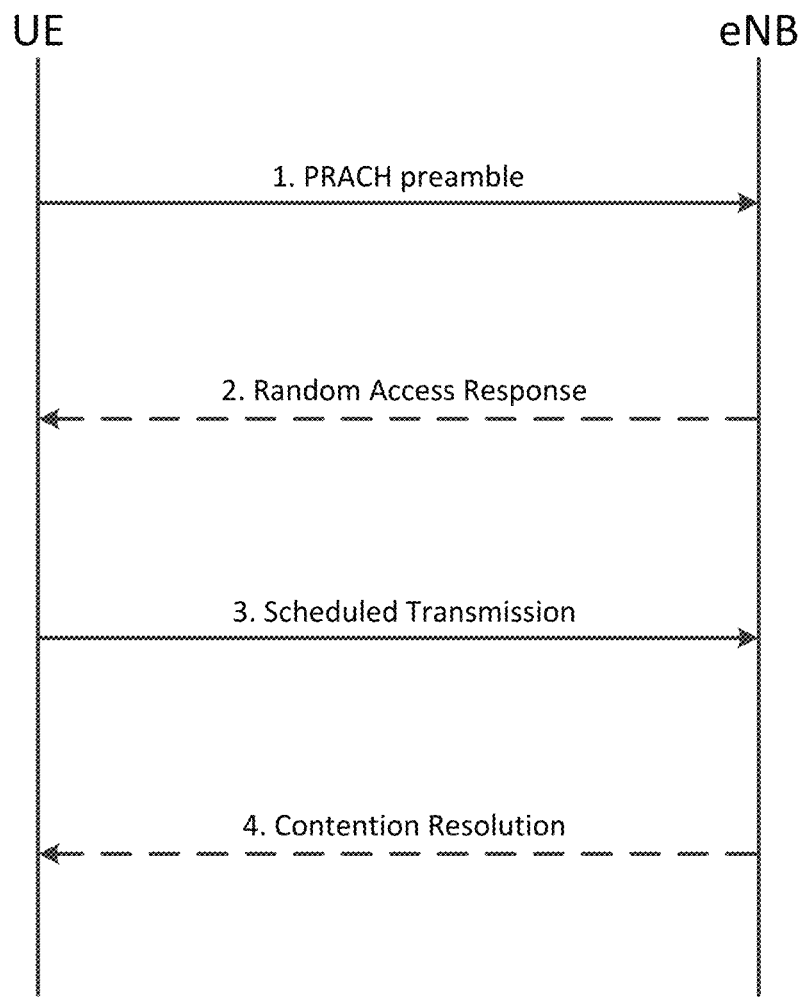
FIG. 12 illustrates an example embodiment of a contention based random access procedure or method.

According to an example embodiment, there may be two forms of a RA procedure that may be performed. One form may include a contention-based RA procedure, which may apply to a portion of the forgoing events (e.g. the first five events above). Another form may include a non-contention-based, which may apply to a handover, DL data arrival, and/or positioning. When a contention-based random access procedure may be applied, at least two devices or mobiles may select the same resources (e.g. preamble and opportunity) for random access, and, thus, the contention situation may be resolved. The non-contention based procedure may be applicable when the base station may signal a reserved random access preamble to a device or mobile, for example, at a handover, uplink synch failure, and/or for positioning. In this embodiment, information (e.g. essentially timing) may be acquired at the random access response A contention-based Random Access procedure that may be provided and/or used may be shown in FIG. 12. The contention-based procedure as illustrated in FIG. 12 may be characterized by the following. At 1, a Random Access Preamble on RACH (e.g. a PRACH preamble) may be transmitted by a UE and received by a base station or eNB. The Random Access Preamble or RACH (e.g. the PRACH) may be 6 bit to carry including a5 bit preamble ID and 1 bit to indicate the information on the size of a message (e.g. message 3).

As shown in FIG. 12, at 2, a Random Access response that may be generated by MAC on DL-SCH may be sent from the base station or eNB to the UE. According to an example embodiment, the Random Access response may be addressed to a RA-RNTI on a L1/L2 control channel. Additionally, the Random Access response may include a Preamble ID, Timing Alignment, Initial Uplink Grant and Temporary C-RNTI, and the like.

At 3, a scheduled transmission may be provided from the UE to the base station or eNB on, for example, a UL-SCH. The size of the transport blocks that may be used herein (e.g. at 3) may depend on the UL grant that may be conveyed at 2. Additionally, at 3, for initial access, the RRC Connection Request generated by the RRC layer may be conveyed. After a radio link failure (RLF), the RRC Connection Re-establishment Request generated by the RRC layer may be conveyed and/or after a handover, in the target cell, the ciphered and integrity protected RRC Handover Confirm generated by the RRC layer may be conveyed. In an embodiment (e.g. in response to other events), at least the C-RNTI of the UE may be conveyed.

As shown in FIG. 12, at 4, a contention resolution may be provided from the base station or eNB to the UE, for example, on a DL-SCH. For example, at 4, an early contention resolution may be used and/or provide where the eNB may not wait for a NAS reply before resolving a contention.

In an example embodiment, a preamble transmission procedure and/or method via layer 1 may be provided and/or used. For example, before the preamble transmission procedure, a layer 1 may receive the following information from higher layers: random access channel parameters (e.g. a PRACH configuration, frequency position, and/or preamble format); parameters for determining the root sequences and their cyclic shifts in the preamble sequence set for the cell (e.g. index to root sequence table, cyclic shift ($N_{CS}$), and/or set type (e.g. unrestricted or restricted set)), and the like.

After receiving such information, the preamble transmission procedure may be performed. For example, a layer 1 receives preamble transmission request from higher layers. A preamble index, preamble transmission power (e.g. PREAMBLE_TRANSMISSION_POWER), associated RA-RNTI, and PRACH resources may be indicated by higher layers as part of the request. Then, a preamble may be selected from the preamble sequence set using the preamble index and/or the preamble may be transmitted with transmission power PREAMBLE_TRANSMISSION_POWER on the indicated PRACH resource. In an embodiment, if no associated PDCCH with RA-RNTI may be detected, the physical random access may be is exited. If an associated PDCCH with RA-RNTI may be detected, the corresponding DL-SCH transport block may passed, provided, or transmitted to the higher layers and the physical random access procedure may be exited.

According to an example embodiment (e.g. in existing LTE systems), two groups of RACH preambles may be broadcast in the System Information Block 2 (SIB2) (e.g. using the preamble transmission procedure). The broadcast preambles may be used by each of the UEs in the cell.

Figure 13:
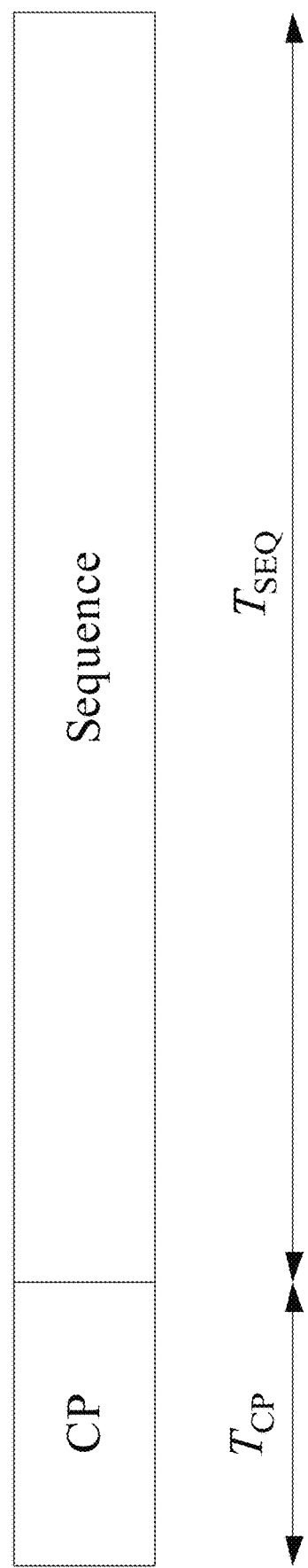
FIG. 13 illustrates an example embodiment of a random access preamble format.

A PRACH time and frequency structure may be provided and/or used. In an example embodiment, the structure may include the physical layer random access preamble shown in FIG. 12. For example, as shown in FIG. 13, the physical layer random access preamble that may be used may include a cyclic prefix of length $T_{CP}$ and a sequence part of length $T_{SEQ}$. The allocated TTIs for the RACH may be decided by the eNB according to the cell coverage requirement.

Figure 14:
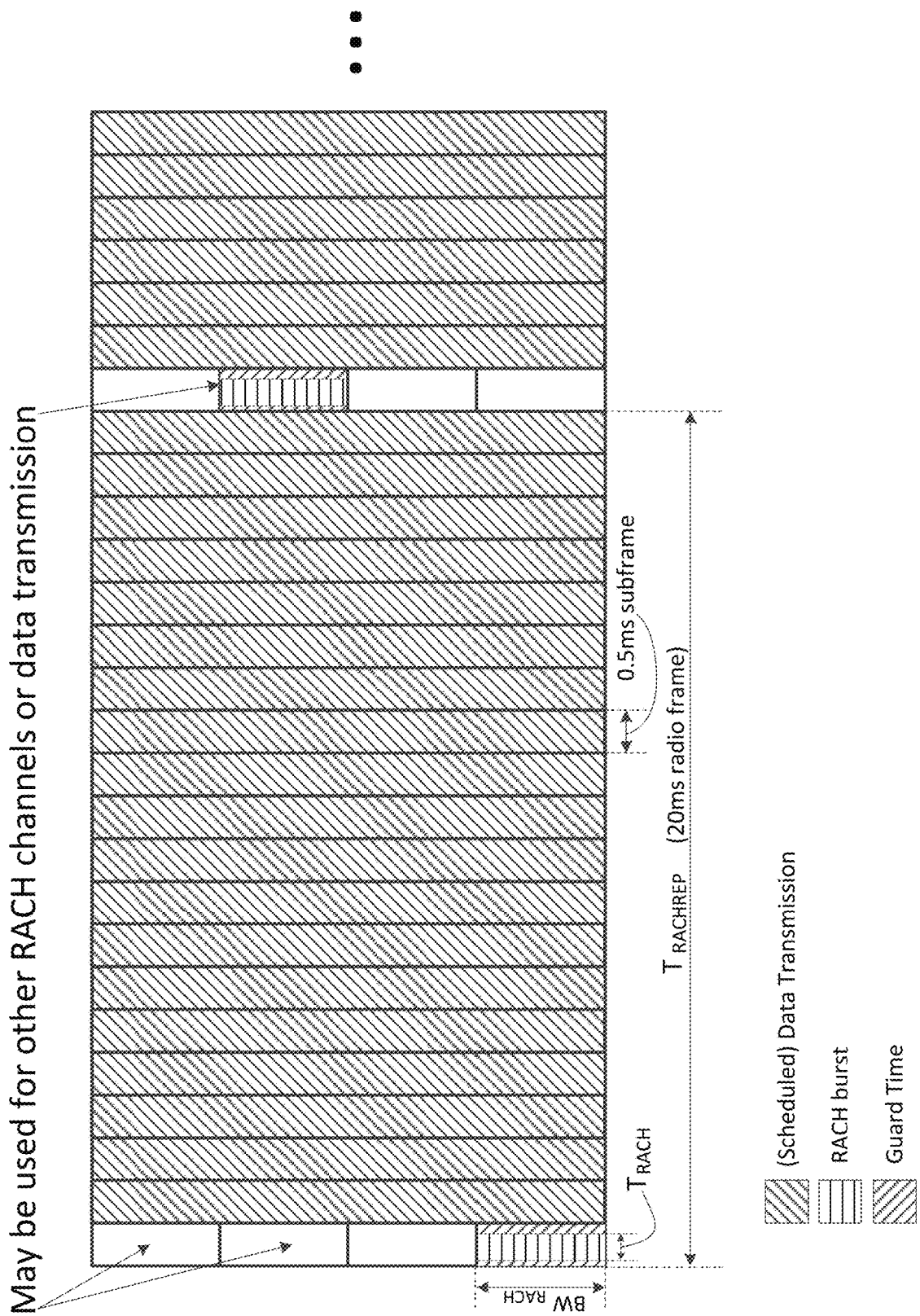
FIG. 14 illustrates an example embodiment of a PRACH transmission in time and frequency resources.

Additionally, in the frequency domain, a random access burst may occupy a bandwidth corresponding to 6 resource blocks (e.g. 6 RBs may equal 1.08 MHz) for both frame structures. PRACH transmission in time-frequency resources may be illustrated in FIG. 14.

The transmission of a random access preamble, if triggered by the MAC layer, may be restricted to certain time and frequency resources. Such resources may be enumerated in increasing order of the subframe number within the radio frame and the resource blocks in the frequency domain such that index 0 may correspond to the lowest numbered resource block and subframe within the radio frame.

In example embodiments, system information for a cell that may include operating parameters (e.g., UL and DL bandwidth), resources for random access, neighbor lists for measurements, and the like may be broadcast by the cell in information blocks. For example (e.g. in in LTE), there may be a master information block (MIB) and a number of system information blocks (SIBs). The MIB may be transmitted on a known schedule (e.g. subframe 0 of each frame) and a known set of resources, (2nd timeslot of the subframe, center 6 RBs). The MIB may provide a small amount of information including the system frame number (SFN) and the DL BW of the cell to enable UEs to read a SIB 1. The SIB 1 may have a known schedule (e.g. subframe 5 each 80 ms), but not a known set of resources that may be PDSCH resources. In a subframe in which the SIB 1 may be present or available, a PDCCH in that subframe using a SI-RNTI may provide the location of the SIB 1 resources. A UE may read the PDCCH to obtain the SIB 1 location to read the SIB 1. According to an example embodiment, the SIB 1 may provide critical information for cell selection including the cell ID and the PLMN ID, certain operating parameters such as the TDD UL/DL configuration (e.g. for TDD only), and/or scheduling information for the other SIBs. A UE in Idle Mode may read the SIBs to perform cell selection and reselection as well as to obtain the parameters that may be used for random access. A UE in a connected mode may read the SIBs, for example, to determine if changes may have occurred or the eNB may provide system information to a connected UE via dedicated signaling.

In example embodiments, a UE may periodically monitor the PDCCH for DL assignments on the PDCCH masked with a P-RNTI (Paging RNTI) both in an Idle Mode and in a Connected Mode. When such a DL assignment using the P-RNTI may be detected, the UE may demodulate the assigned PDSCH RBs and may decode the Paging Channel (PCH) carried on that PDSCH.

In the Idle Mode, the specific Paging Frame (PF) and subframe within that PF, for example, the Paging Occasion (PO) that the UE may monitor within the Paging Channel may be determined based on the UE ID and parameters (e.g. two parameters) specified by the network such as Paging Cycle length (e.g. in frames) and the Number of paging subframes per paging cycle. The UE ID, in an embodiment, may be the UE IMSI mod 4096. Such Paging Occasions may include pages specifically for the UE, or they may include system information change pages directed to each of the UEs.

From the network perspective, there may be multiple PFs per paging cycle and multiple PO's within a PF, for example, more than one sub-frame per paging cycle may carry PDCCH masked with a P-RNTI. Additionally, from the UE perspective, a UE may monitor a PO per paging cycle, and such a PO may determined by the parameters specified herein (e.g. above), provided to the UE via system information, dedicated signaling information, and the like.

In Connected Mode, the UE may receive pages related to system information change, for example, it may not receive UE-specific pages such as those that may be used for an incoming call. As such, a UE in the Connected Mode may not monitor a specific PO. Rather, it simply may try to receive pages at the same rate as a UE in the Idle Mode using the cell-specific paging cycle. Additionally, for FDD, the PO may be limited to subframes 0, 4, 5 and 9 and/or for TDD, the PO may be limited to subframes 0, 1, 5 and 6.

Figure 15:
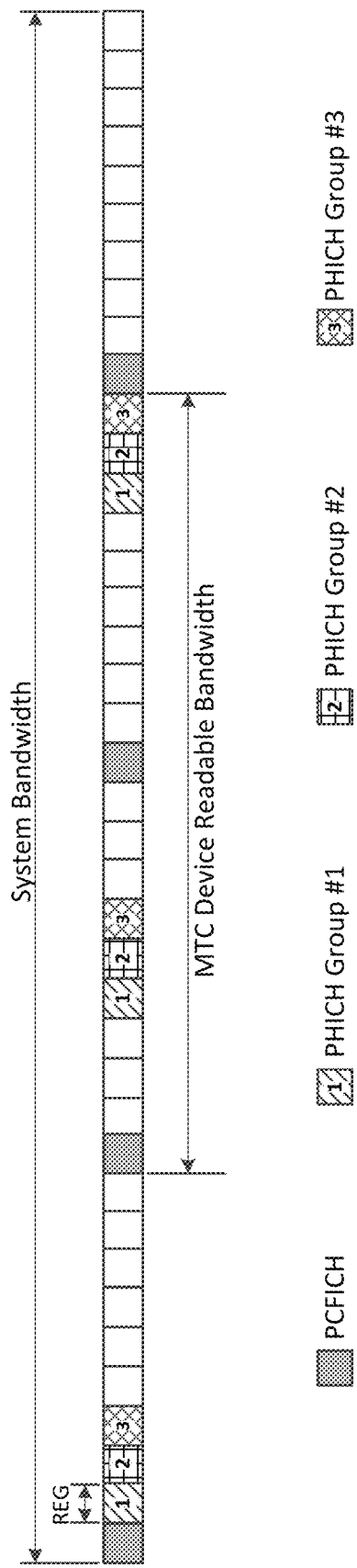
FIG. 15 illustrates an example embodiment of smaller bandwidth support for a machine type communication (MTC) device.

As described herein, a reduced bandwidth for a physical downlink control channel (PDCCH) and/or a physical downlink shared channel (PDSCH) may be provided and/or used for a network and/or a device such as a MTC device or UE that may support such a reduced bandwidth. Currently, an issue when operating a device such as an LTE device or UE and/or a MTC device that may support a smaller or reduced bandwidth on a regular channel such as a regular LTE channel may be an inability of the device to receive a DL control channel or signals from the network and/or a cell. Such an issue may occur, because the control channels such as the LTE control channels and control signals may be spread and/or distributed in transmission such that the channels and signals may use the entire or full bandwidth of the cell and by definition the smaller or reduced bandwidth device may be able to receive a portion such as the center portion of the cell bandwidth. For example, as shown in FIG. 15, a device such an MTC device may read a portion of the system bandwidth. As such, in an embodiment, if a cell such as an LTE cell may be configured as 10 MHz bandwidth and a device such as a low-complexity MTC device or UE may support 5 MHz or smaller bandwidth, the 10 MHz network, cell, and/or carrier may use 50 resource blocks (RBs), but the device that may acquire a center frequency fc of the carrier may read a portion of those 50 RBs such as the center 25 RBs of that cell instead of the entire 50 RBs. The terminologies RBs, physical resource blocks (PRBs), and PRB-pair may be used interchangeably.

By not reading the entire bandwidth and having such information (e.g. control channel information) being distributed or spread through the entire bandwidth, the device such as the low-complexity MTC device or UE may miss reading part of the information such as the control channels, and the like. For example, the device may miss a part of PCFICH channel (e.g. since each of its 4 REGs may spread apart by approximately W of the total cell bandwidth), and, thus, may not be able to accurately decode the CFI which indicates the number of OFDM symbols for the control region in that subframe and may not be able to calculate the total number of CCEs affecting the determination of the individual PDCCH locations.

Additionally, due to the same Rx bandwidth limitation, the device may such as the low-complexity MTC or UE may not be able to decode the PDCCH and common search space signals and, as such, may not be able to receive the common control signals such as SI-RNTI and P-RNTI that may be part of the detection of the occurrences of system information broadcast and paging messages. According to an example embodiment, the RNTI, or Radio Network Temporary Identifier, may identify a UE (User Equipment) when an RRC (Radio Resource Control) connection may exist and may include C-RNTI (Cell RNTI), S-RNTI (Serving RNC RNTI), U-RNTI (UTRAN RNTI), and the like.

Similarly, in an embodiment, the UE may not be able to receive the information of DL assignments or UL grants that may be carried as part of the DCIs in the PDCCH that may be transmitted across the entire system bandwidth in the first one to three time-domain OFDM symbols of the frame making up the Control Region of a network or system (e.g. the LTE network or system).

Currently, support for reduced bandwidth on a device such as a low-complexity MTC device or UE may be difficult, because such devices may be unable to demodulate the entire transmission bandwidth (BW) that a PDCCH such as a legacy LTE PDCCH may use. For example, decoding a R8 PDCCH may result in a much higher decoding complexity ("operations per second") than the PDSCH itself when the PDSCH may carry approximately an order of 10's or 100 kbps. For high-performance devices such as LTE devices or UEs, the decoding complexity for an order of Mbps PDSCHs may also be higher than for the PDCCH, which may be acceptable for such devices. However, for low-complexity MTC devices using the reduced data rates, the legacy R8 PDCCH based assignment protocol may be the determining factor in terms of decoding complexity. As such, the PDCCH design aspects of embodiments described herein for low-complexity devices may provide decoding at a reduced receive bandwidth, and also, may reducing the PDCCH decoding complexity.

Additionally, legacy devices such as R8 LTE handsets may follow the approach that they wake up each TTI (e.g. subframe), may decode the PDCCH, and may then go back idle if there may be no received DL assignment for PDSCH in that subframe. In such an embodiment, the activity of legacy R8 handsets may be regulated by a DRX protocol sitting on top of this approach, which may kick-in to reduce decoding activity as a function of timers and the number of received DL messages. To reduce Tx/Rx activity of devices that may support a reduced bandwidth such as a MTC device or UE, to wake up and decode both control and data, embodiments described herein may reduce (e.g. by a factor 10 or higher) the number of subframes that a device may decode. As such, system and/or methods described herein may enable the reduction of implementation cost through support for reduced channel bandwidths when operating devices such as low-cost MTC devices or UEs that may not provide an impact onto the network and its performance during operation.

A reduced bandwidth for PDSCH may also be provided and/or used in embodiments. For example, as described herein, a bandwidth reduction for control channels in a network or system (e.g. a LTE system) that may have a wider bandwidth may result in downlink control channel reception problems when, for example, time time-division multiplexing (TDM) based downlink control channel transmission may be used. As described herein, the reduced bandwidth may lose at least a portion of control channel information resulting in downlink control channel reception degradation. To address such a problem or issue, the reduced bandwidth may be applied for data regions (e.g. PDSCH regions) and full bandwidth reception may be used for control channel regions (e.g. PDCCH). Although such an embodiment may not provide cost reduction in the RF, there may be a cost reduction in the baseband chipset as its soft buffer size becomes smaller and channel estimation complexity for PDSCH demodulation may be reduced.

Additionally, other challenges including PDSCH resource mapping may be incurred as the system supports full bandwidth. For example, the population of a device such as low-cost MTC (LC-MTC) may be much larger than that of regular devices such as LTE device that may be operating on the network. In such an embodiment, PDSCH resource utilization may be a problem or an issue. Also, other broadcasting and multi-casting channels transmitted in the PDSCH region may be changed as described herein to ensure that the devices that support such a reduced bandwidth such as the LC-MTC devices receive broadcasting and multi-casting channels.

Current physical random access channel (PRACH) may also be affected or incur problems or issues due to bandwidth reduction. For example, although a PRACH such as a Rel-8/9/10 PRACH may support different system BWs such as 1.4, 3, 20 MHz, and the like, a UE with different BW capability from a system BW may not currently be supported (e.g. in LTE). In other words, current systems or implementations (e.g. LTE) may require that the supported BW of a UE or device may have to be equal to 20 MHz, which may be the maximum system BW.

Additionally, with the increased development of current cellular networks such as LTE networks and their advancement (e.g. LTE-A), communications such as MTC communications via such cellular networks with widespread coverage may constitute or account for quite a bit of the internet services that may be used. Unlike traditional voice and web streaming, services or communications such as MTC services or communications may often have different requirements on a communication system due to their specific features such as sensing, control or monitoring application, and the like. For example, a large number of services such as MTC services may be non-real time and may typically consume less bandwidth than traditional web browsing or video application and, thus, may be supported by less BW than current regular devices or UEs. However, current standards (e.g. LTE standards) may not address the issue of BW reduction for devices such as MTC devices or UEs (e.g. that may support a reduced bandwidth). As such, procedures, methods, and/or techniques to achieve BW reduction when conducting RACH transmission for devices that may support such a reduced BW including MTC devices and/or use may be desired and/or important.

Figure 16:
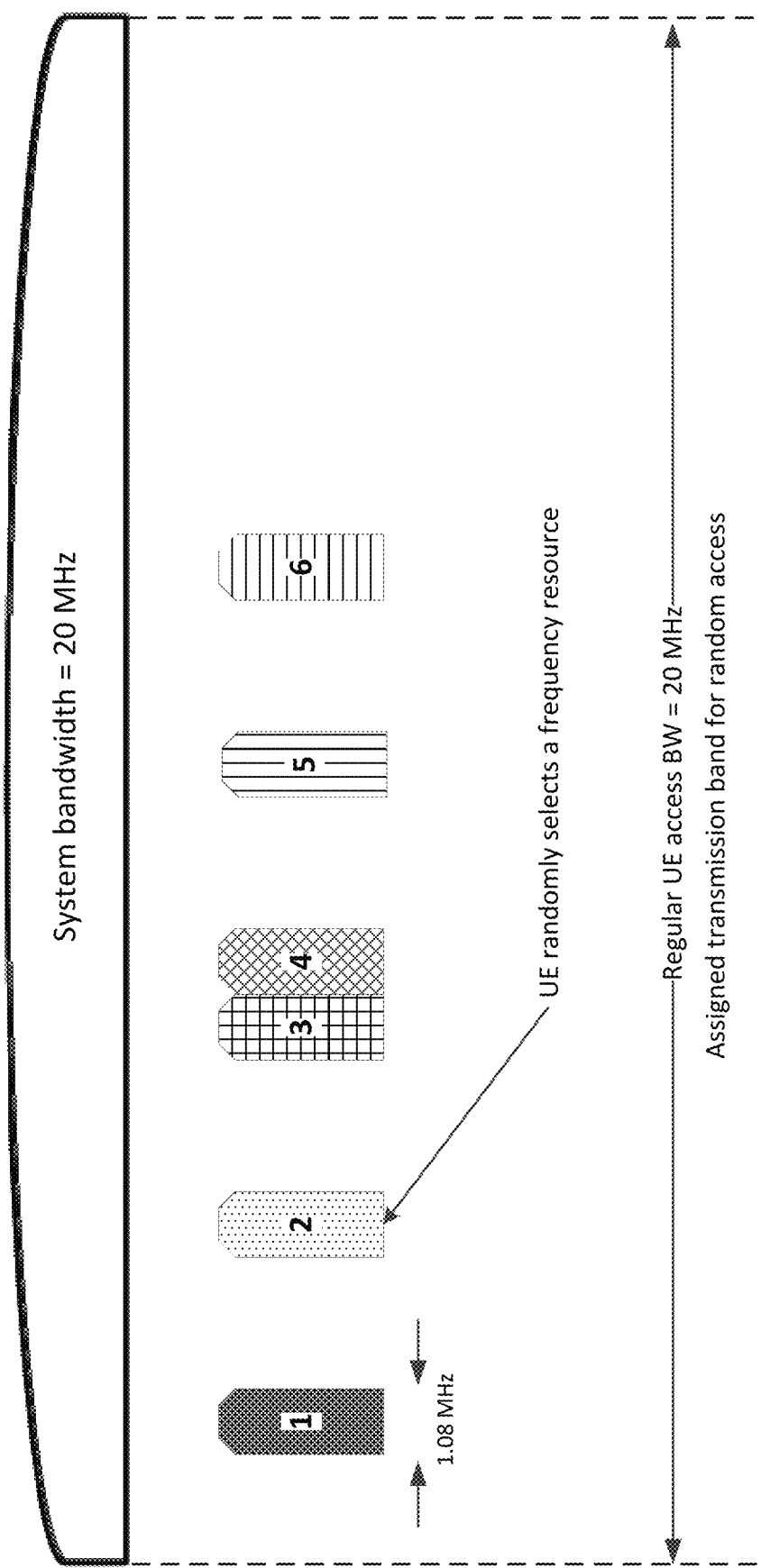
FIG. 16 illustrates an example embodiment of a frequency resources selection (e.g. a procedure or method) for a PRACH transmission of a UE (e.g. a regular UE) in TDD.

Currently (e.g. the current LTE standard), in embodiments, a PRACH frequency resource (e.g. consecutive 6RBs) within the supported system BW may be allocated in an uplink subframe in FDD (e.g. a frame structure 1) and up to 6 PRACH frequency resources in an uplink subframe may be configured in TDD (i.e., frame structure 2). These PRACH frequency resources may be configured via a system information block type 2 (SIB2) that may be transmitted with an associated PDCCH (e.g. with SI-RNTI). Regular devices or UEs may randomly select one of these time and/or frequency resources for a PRACH preamble transmission. FIG. 16 illustrates a frequency resources selection method for a PRACH transmission of a regular device or UE.

Figure 17:
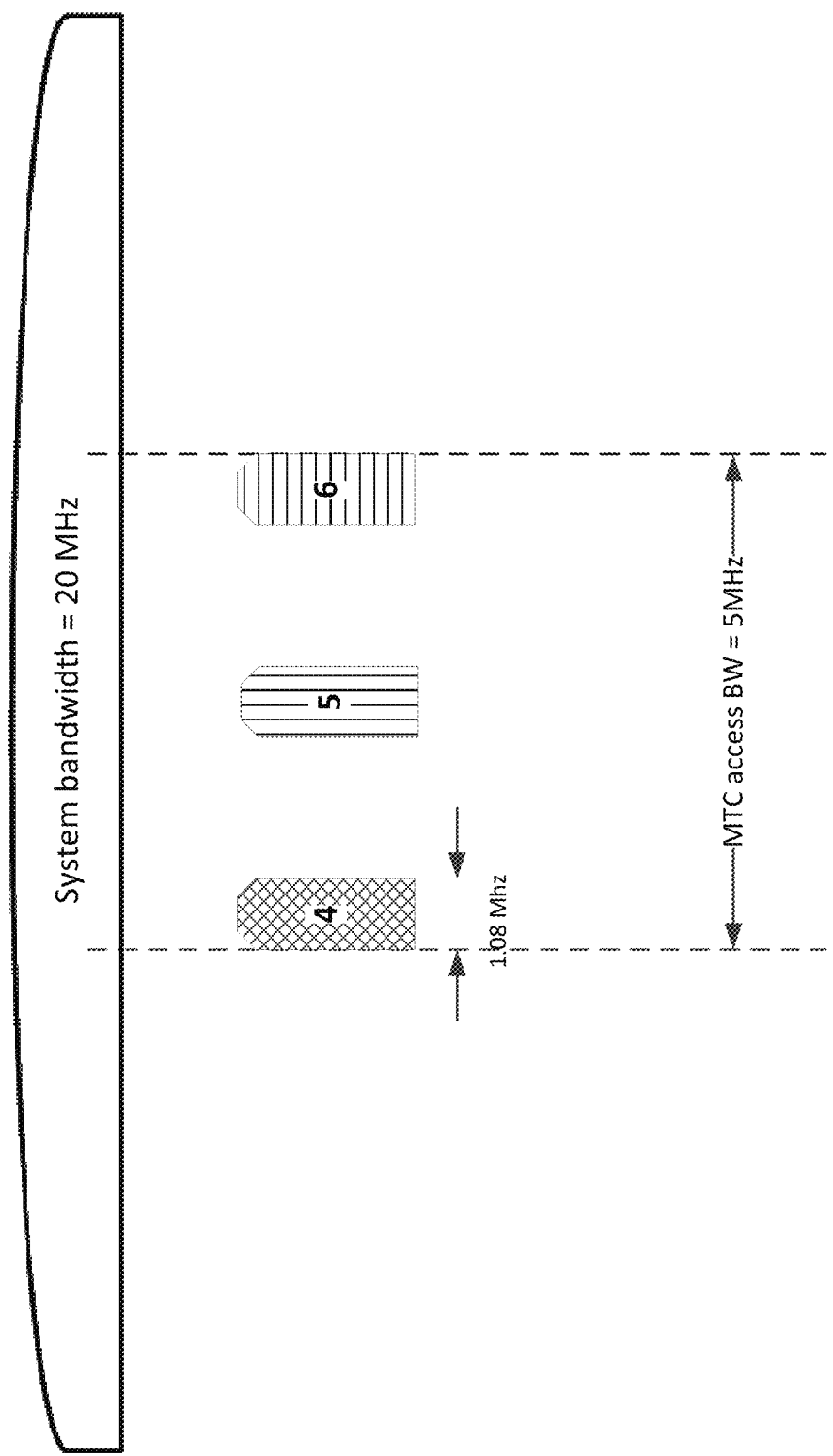
FIG. 17 illustrates an example embodiment of frequency resources allocation (e.g. a procedure or method) for a PRACH transmission of an MTC device.

Since the supported BW for devices described herein such as MTC devices or UEs may be narrower than the system (e.g. LTE or E-UTRAN BW), some configured PRACH frequency resources may not be visible and thus not available to such devices. For example, as shown in FIG. 17 shows devices such as MTC devices or UEs that may support a 5 MHz BW may have less frequency resources allocation available than the regular UE (e.g. shown in FIG. 16) when their supported BW may not equal to that of system (e.g. LTE or E-UTRAN).

Additionally, a Random Access (RA) response to the UE may be provided via MAC layer signaling that may be transmitted in PDSCH. According to an example embodiment, a location of the PDSCH may be identified by a PDCCH (e.g. with RA-RNTI for a contention-based procedure) in the common search space in the PDCCH. In one embodiment, the PDCCH may be spread over the entire bandwidth (BW) of the cell. As such, narrower bandwidth devices such as UE or MTC devices may not decode the PDCCH as described above and the RA procedure may not be completed. As such, the system and methods disclosed herein may enable devices such as UE or MTC devices operating on reduced BW to receive a RA response.

Broadcast problems and/or issues may be incurred by the use of a BW reduction and/or the devices that support the BW reduction. For example, a narrower bandwidth device such as a UE and/or MTC device may not have access to the whole system bandwidth, and, thus, as described herein, the device may not be able to detect a PDCCH grant when a part of such grant may be located outside of the narrower bandwidth. As such, the device may not be able to determine the resources assigned to broadcast SIBs and may not be able to receive the broadcast SIBs. Systems and/or methods described herein may enable such devices (e.g. narrow bandwidth devices) and networks to determine resources to broadcast SIBs and receive broadcast SIBs.

In embodiments, paging problems and/or issues may be incurred with a BW Reduction as described herein. For example, a narrower bandwidth device such as a UE or MTC device may not have access to the whole system bandwidth, and, thus as described herein, the device may not be able to detect a PDCCH grant when a part of such grant may be located outside of the narrower bandwidth. As such, the device may not be able to receive pages for reading PDCCH and/or the paging channel. In an example embodiment, systems and/or methods described herein may enable such devices (e.g. narrow bandwidth devices) and networks to receive such pages.

According to an example embodiment, the use of such narrower bandwidth or lower bandwidth devices may reduce a transceiver complexity (e.g. the use of such devices may enable a lower complexity of transceivers). For example, the throughput requirements for devices such as UEs or MTC devices that support a reduced BW may be relatively low when compared with legacy LTE UEs or other legacy devices (e.g. even with the lowest UE category). In an embodiment, an application for a device such as a MTC device (e.g. with a narrower bandwidth) may be a smart metering requiring status update. Current or legacy devices may be required to implement each transmission modes and its associated reporting modes regardless of the UE category to provide robust transmission according to the UE channel condition and system environment. If the same requirement may be applied for the UE category targeted for low cost MTC device, it may result in unnecessary transceiver implementation complexity and/or increased costs.

As described above, the typical application of a low cost MTC device may be a smart meter operated with a battery. In such an embodiment, the smart meter may use a longer lasting battery life as compared with a standard or regular device such as a UE or handset and/or laptop that may be charged frequently. Unfortunately, current device behavior that make invoke TTI-based control channel blind detection and/or a 8 HARQ process or method may result in faster batter consumption and, thus, may not work well with such lower powered devices such as MTC devices or UEs.

Additionally, UE categories may be equipped with at least two receive antennas (e.g. which may be mandatory) such that the network coverage may be defined based on the assumption of two receive RF chains. To reduce the cost of device such as a UE or MTC device, a single receive RF chain based UE category may be defined, thus resulting in coverage reduction in the downlink. Because the device such as the UE or MTC device may also work with legacy UEs (e.g. Rel-8/9/10), the coverage may be kept the same as other networks such as a previous LTE network to not increase network deployment cost while supporting low cost devices such as UEs or MTC devices in the same network.

MTC physical uplink control channel (PUCCH) transmissions may also be provided and/or used. For example, when operating a device such as a UE or MTC device that may support a smaller or reduced bandwidth on a channel such as a regular LTE channel or bandwidth, in an embodiment, a PUCCH region for such a device such as a MTC device or UE may overlap with a sounding reference signal (SRS) bandwidth for a legacy UE. In such an embodiment, there may be a possibility that a PUCCH transmission from a device such as a UE or MTC device may overlap with the legacy SRS region. As such, techniques may be provided and/or used to handle such a situation.

For example, systems and/or methods for low cost devices such as UEs and/or MTC devices to support operation at reduced channel bandwidth in a network such as LTE network may be described herein. In an embodiment, reducing the supported channel bandwidth may reduce the analog-to-digital and digital-to-analog interface complexity and power consumption, as well as the baseband component processing complexity as described herein.

Additionally, control channels in a reduced bandwidth may be provided and/or used as described herein. For example, in one embodiment, a low-complexity device such as a UE or MTC device may receive an inband DL assignment that may identify an intended receiver of a PDSCH transmission through inband signaling that may be carried in a Data Region of a subframe. The inband DL assignment that may identify the intended receiver of the PDSCH transmission may be accompanied by information describing the specifics of the transmission such as a modulation type, a coding rate. RV, a number of transport blocks, antenna encoding formats or transmission schemes, and the like.

In a further embodiment, a device (e.g. a low-cost device that may support a reduced bandwidth) such as a UE or MTC device may receive an inband UL grant for an upcoming PUSCH transmission as part of the signaling that may be carried in the Data Region of a subframe. The inband UL grant may identify the intended transmitter to which the PUSCH transmission may have been assigned. Similarly, the inband UL grant may be accompanied by information describing the specifics of the upcoming UL transmission opportunity such as the modulation type, coding rate, RV, a number of transport blocks, antenna encoding formats or transmission schemes, and the like.

As described herein, multiple devices (e.g. low-cost devices that may support a reduced bandwidth) such as UEs or MTC devices may be assigned to monitor the inband signaling carried in the Data Region of the subframe. Additionally, the DL PDSCH and UL PUSCH transmission resources may be assigned independently from each other in every scheduling instance, or TTI, amongst these multiple devices. For example, a first device such as a first MTC device may be allocated the DL PDSCH transmission through the inband signaling while a second device such as a second MTC device may be allocated the accompanying or associated UL PUSCH transmission opportunity in this inband signaling message.

In example embodiments, the inband signaling that may be carried on the monitored parts of the Data Region by the MTC devices refers to multiplexing the signaling information with a DL data unit or control data unit as part of the PDSCH transmission resources in an FDM and/or TDM fashion onto available RE's or modulation symbols (and by extension, onto symbols and RB's). It can also refer to carrying the inband signaling multiplexed with the DL data unit(s) or control data unit(s) as part of (or separately inserted) RLC or MAC or L1 header information when transport blocks are made available for transmission by the eNB.

Additionally, in an embodiment, a device such as a UE or MTC device, for example, after acquiring a cell such as an LTE cell or synchronizing to the cell such as the LTE cell, acquiring system information, and/or registering to the network, may be subsequently assigned to monitor specific bandwidth parts of the overall system bandwidth for occurrences of DL allocations and/or UL grants. Similarly, as described herein, methods or procedures to allocate or de-allocate a set of monitored resources to MTC devices to monitor for occurrences for DL inband signaling may be provided and/or used.

The following illustrative methods or procedures and examples may describe the above methods in more detail. While the figures illustrate aspects of some of the embodiments using an example of an LTE channel at nominal BW of 10 MHz, and an MTC device supporting up to 5 MHz reduced BW, these methods and systems described herein extend to the general case where a device such as a UE or MTC device that may support less than the nominal BW of the cell is in communication with a network such as the LTE network.

Additionally, embodiments may enable a device such as UE or MTC devices to not use a legacy LTE PDCCH signal sent over the entire system bandwidth. For example, DL assignments and/or UL grants may be monitored and carried inband on a DL channel in the Data Region of a subframe such as a LTE subframe (e.g. the PDSCH) or the time and/or frequency region corresponding to DL data transmissions. As such, the device such as the UE or MTC device may support a reduced reception bandwidth, for example, 5 MHz, and the like while being able to operate on a channel such as an LTE channel of, for example, 10 MHz, or the that may simultaneously operate using high data-rates or legacy devices such as UEs or LTE devices at full system bandwidth in a fully backwards-compatible manner.

Figure 18:
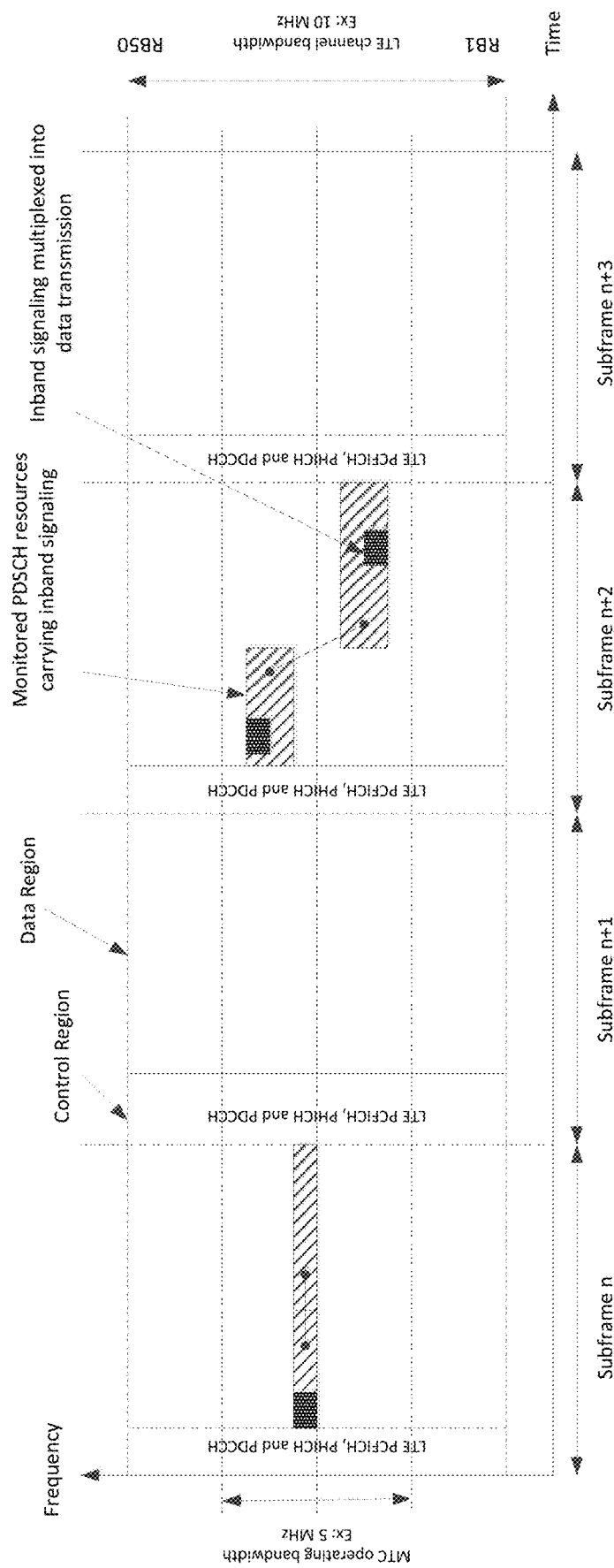
FIG. 18 illustrates an example embodiment of inband signaling that may assign DL transmissions to a MTC device such as a low-complexity MTC device.

For example, in one embodiment, a device such as a UE or an MTC device may monitor one or more RBs on a designated portion of the Data Region in a subframe such as an LTE subframe for occurrences of inband signaling identifying the intended receiver of the DL data transmission by the eNB as shown in FIG. 18. The device such as a UE or MTC device may monitor designated OFDM symbols and/or frequency portions of the transmitted DL signal. The transmitted DL signal may include or may encode an inband DL assignment (e.g. shown in the dotted shading in FIG. 18). In one embodiment, the DL assignment may be given in a form of an identifier that may associate a given DL data transmission (e.g. shown in the diagonal shading of FIG. 18) in that subframe on the PDSCH resources with an intended receiver.

For example, the device such as the UE or MTC device that may be designed and/or implemented to support up to 5 MHz bandwidth may be assigned by the network such as the LTE network to monitor the PDSCH region corresponding to a 5*180 kHz=900 kHz wide PDSCH portion in RBs 23-27 on the 10 MHz carrier in designated subframes and to decode the DL transmission and check for occurrences of the designated identifier part of that DL transmission. Both frequency contiguous resources as well as distributed resource mapping may be used.

The device such as the UE or MTC device may monitor a designated time and/or frequency resource for occurrences of its identifier. For example, the device such as the UE or MTC device may monitor N PRBs in each 2nd subframe such as shown in FIG. 18. When the device such as the UE or MTC device may decode its assigned identifier (e.g. in dotted shading of FIG. 18), as part of the DL signal transmission, it may proceed to decode the corresponding data unit or units (e.g. the diagonal shading of FIG. 18) in that subframe. If the decoded identifier may not correspond to its assigned identifier (and/or the data transmission may be intended for another receiver), the device such as the UE or MTC device may discard the demodulated signal and may wait for the next expected occurrence of a DL transmission.

Additionally, an identifier may be signaled as part of the DL assignment explicitly, for example, through a bit field included into the DL signal transmission, the identifier may be implicitly encoded, for example, via masking the identifier into the computed CRC of a TB or code block part of the DL signal transmission, and/or the identifier may be encoded through applying a scrambling sequence applied to the DL transmissions or portions thereof as a function of the identifier value. In an alternative embodiment, the identifier may be known by the device such as the UE or MTC device through a pre-arranged transmission schedule (e.g. DL transmissions may correspond to a set of configured or computed number of TTIs for a device such as a UE or MTC device). Several example realizations to encode the identifier as part of the DL transmission on monitored resources by the MTC devices may be shown in FIG. 19.

Figure 19:
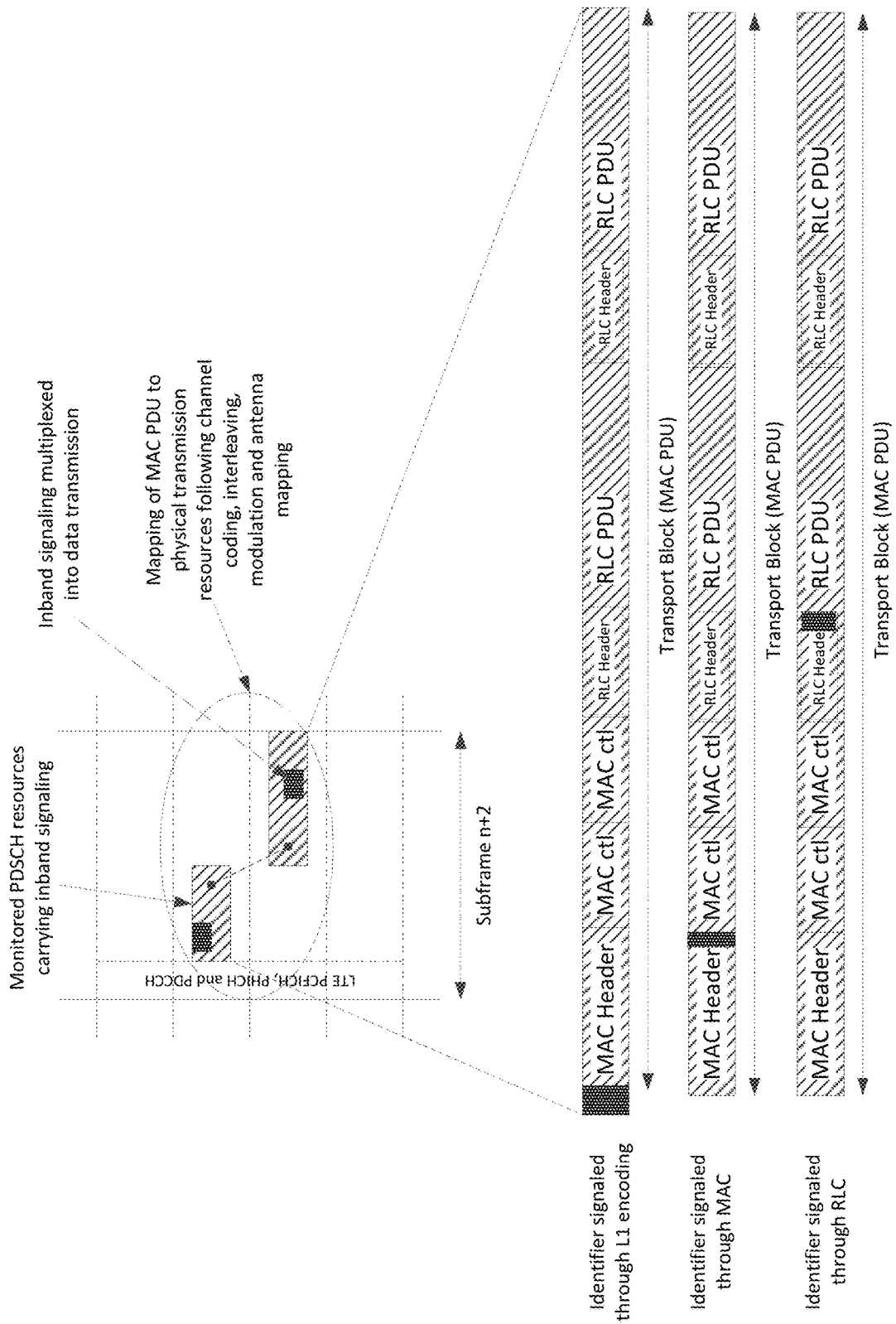
FIG. 19 depicts an example embodiment of encoding a MTC device receiver identity as part of inband signaling.

In an embodiment, when an inband DL assignment (e.g. parts of or a RLC or MAC or L1 header, identifier, modulation format information as described above) may be mapped to the transmitted DL signal, the mapping of such header information may exploit the unequal error protection property of higher order modulation alphabets and/or the closeness to pilot symbols or tones to increase its detection reliability. For example, selected parts of or entire header information, including DL assignment, identifiers, system signals for robust performance, and the like may be first mapped onto transmission resources to the advantageous symbol and/or bit positions in the resources allocated to that DL data transmission. Subsequently, the remaining portion of the DL data transmission, for example, the bits corresponding to the data units, may be mapped (e.g. in order) to the remaining positions of the time-frequency resources. The network may configure the device such as the UE or MTC device to monitor for one or more identifiers. Alternatively, the DL data transmission (e.g. as shown in FIGS. 18 and 19, for example, in the diagonal shading) may include more than one data unit multiplexed as part of the transmission and intended for more than one designated receiver.

For example, the identifier used by the network to allocate DL resources to the device such as the UE or MTC devices may be an assigned N bit value (e.g. N=5). As such, in an embodiment, up to 32 data streams (e.g. where one device may be allocated more than one of these data stream), or intended receivers may be distinguished as part of an ongoing DL transmission. The 5 bit identifier may be signaled as part of a L1 header, a MAC, an RLC header field, and the like that may be multiplexed with the data and mapped to the transmission resources for that PDSCH (e.g. shown in FIGS. 18 and 19 in subframe n+2). In an alternative embodiment, the identifier may be part of a separate physical signal mapped to the transmission resources that may be assigned to be monitored by the device such as the UE or MTC device in the allocated time and/or frequency resources (e.g. shown in FIG. 18 in subframe n).

Moreover, the network may assign a specifically designated schedule for monitoring of the DL transmissions to a device such as an MTC device. For example, a device such as a UE or MTC device may monitor one designated subframe per radio frame or one subframe occurring each 4 radio frames for the occurrence of its designated identifier in a DL data transmission. The DL transmission may be accompanied by information describing the specific encoding, for example, the transmission format. Information about the transmission format may include the modulation type, coding rate, RV, a number of transport blocks, antenna encoding formats or transmission schemes, and the like. The identifier and/or specific information pertaining to the transmission format may be sent using a first known or configured transmission format.

The device such as the UE or MTC device may obtain the specific transmission format chosen by the eNB for the DL data unit transmission by decoding transmission format information as part of the DL signal transmission using one or more fixed transmission formats for the transmission format information.

Additionally, the data units carried as part of the DL signal transmission that may be monitored by the device such as the UE or MTC device may carry regular data traffic such as unicast HTTP, FTP and the like or it may control data such as system information messages or parts thereof, paging signals, and the like.

In an example embodiment, a device such as an MTC device or UE may monitor one or more RBs on a designated portion of the Data Region in a subframe such as an LTE subframe for occurrences of inband signaling identifying the intended transmitter for an upcoming or scheduled UL data transmission. The associated UL subframe may be given by association such as a fixed rule "UL grant decoded in subframe n corresponds to the PUSCH transmission in subframe n+k", or it may be explicitly signaled as part of the DL signal transmission and associated transmission format.

Similarly, the UL transmission may be accompanied by information describing the specific encoding such as the transmission format. Information about the transmission format may include the modulation type, coding rate, RV, a number of transport blocks, antenna encoding formats or transmission schemes, and the like. The above-described embodiments that may encode and carry the inband DL assignments or header information may be used for the UL grants including bit swapping, mapping to high reliability positions, and the like.

Figure 20:
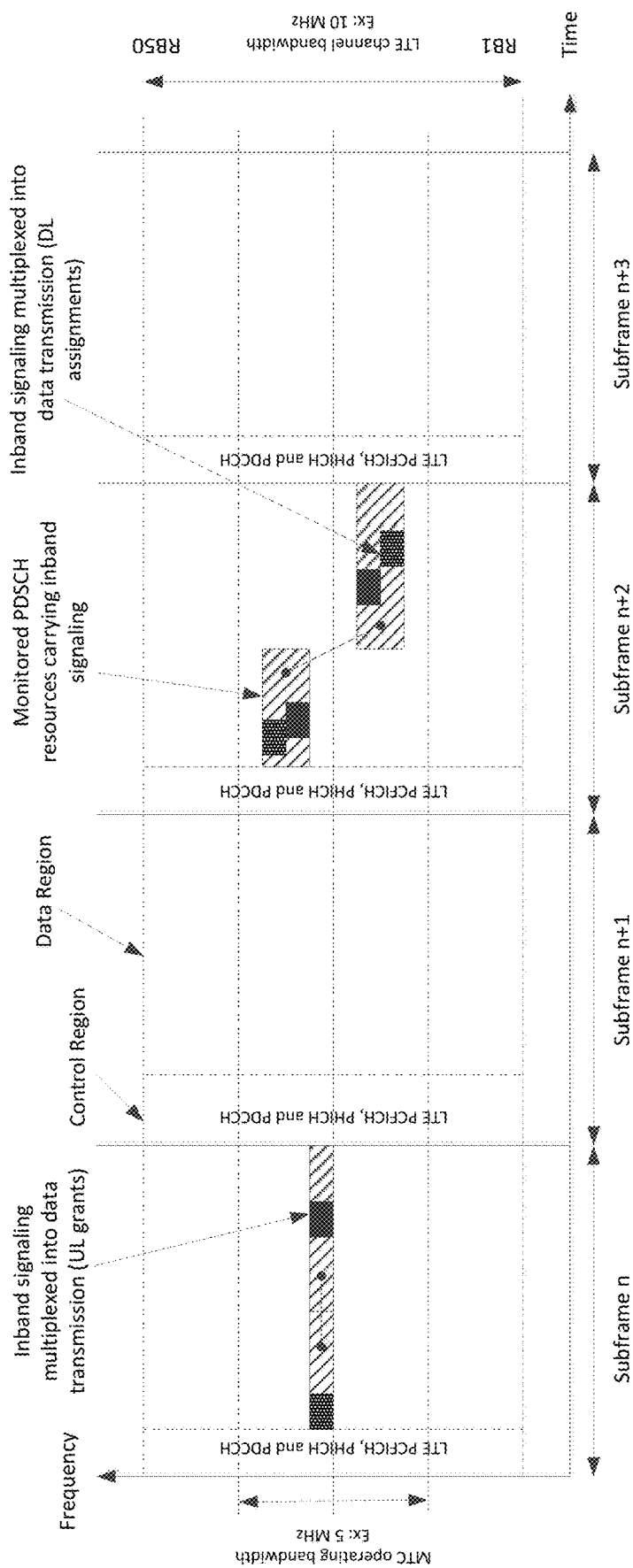
FIG. 20 illustrates example embodiments of inband signaling that may assign UL transmissions a MTC device such as a low-complexity MTC device.
Figure 21:
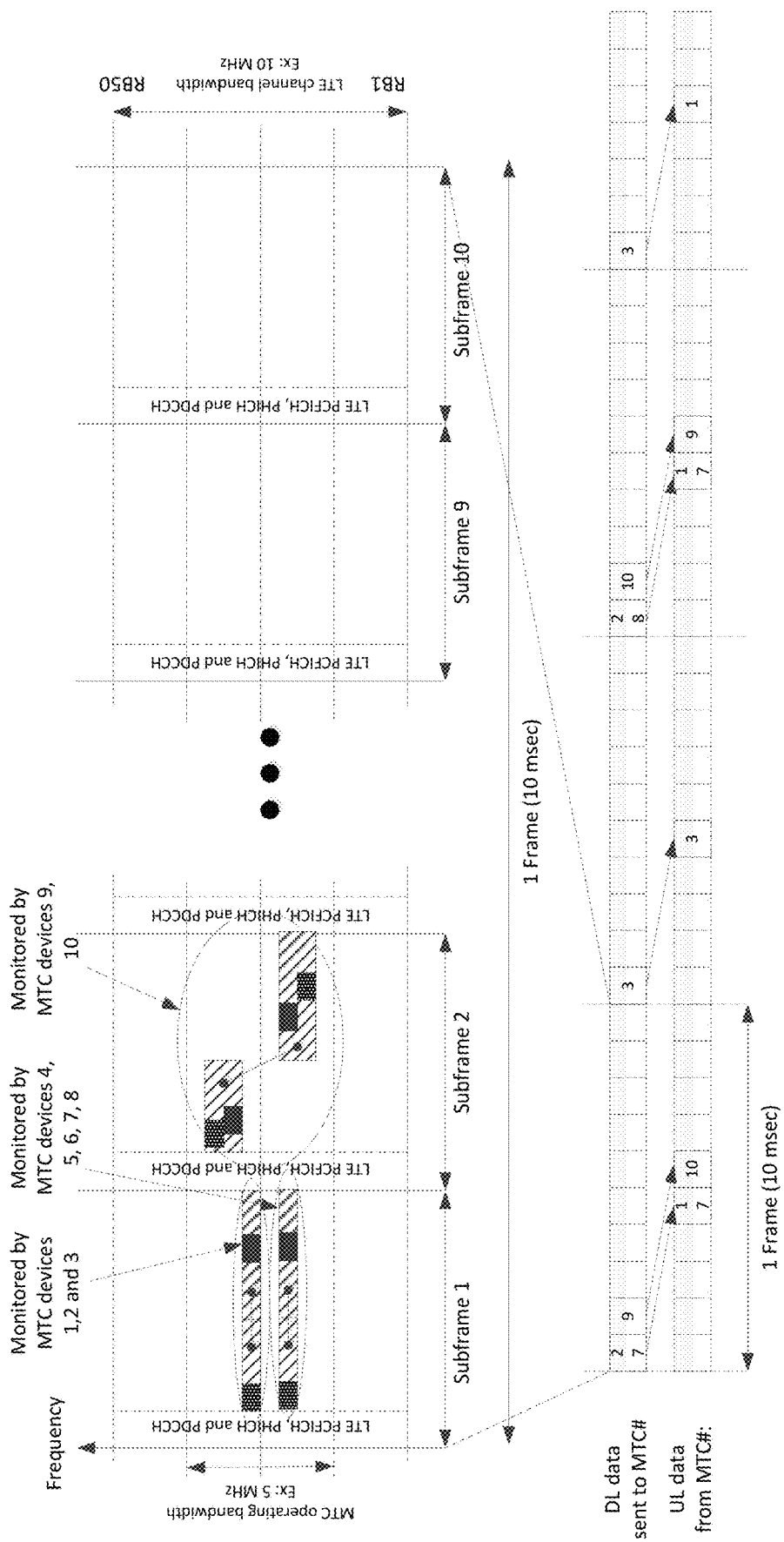
FIG. 21 illustrates an example embodiment of supporting a MTC device using inband signaling for assigning DL and UL data transmissions.

A DL signal transmission may include both inband DL assignments and UL grants, or in a specific occurrence (TT), one of these. For illustration purposes, the inband UL grants may be shown in FIG. 20 for the embodiment where both DL assignments and UL grants may be part of the DL signal transmission to devices such as UEs or MTC devices. The device such as a UE or MTC device may monitor a designated time and/or frequency resource for occurrences of its UL identifier. For example, the device such as a UE or MTC device may monitor N PRBs in each 2nd subframe such as shown in FIG. 20. When the device such as a UE or MTC device may decode its assigned UL identifier as part of the DL signal transmission, it may proceed to prepare for UL transmission of a data unit or units in the associated UL transmission resources in an associated UL subframe. If the decoded UL identifier may not correspond to its assigned UL identifier (e.g. and the UL transmission may be scheduled for another MTC device), the device such as the UE or MTC device may disregard this UL grant and may wait for the next expected occurrence of a DL transmission.

According to an embodiment, a UL identifier may be signaled as part of the DL assignment explicitly through a bit field included into the DL signal transmission. Additionally, the identifier may be implicitly encoded via, for example, masking the identifier into the computed CRC of a TB or code block part of the DL signal transmission or the identifier may be encoded through applying a scrambling sequence applied to the DL transmissions or portions thereof as a function of the identifier value. In an embodiment, the UL identifier may be known by the device such as a UE or MTC device through a pre-arranged transmission schedule or UL transmissions that may correspond to a set of configured or computed number of TTIs for the device such as a UE or MTC device. Additionally, the network may configure the MTC device to monitor for one or more UL identifiers. The data units to be transmitted as part of the scheduled UL PUSCH transmission may also carry regular data traffic such as unicast HTTP, FTP and the like, or they may control data such as system messages or parts thereof including RRC or NAS signaling messages. While a method to signal DL assignments and a method to signal UL transmission grants have been described above, such methods may further be employed to operate in conjunction, separately, or with additional methods.

According to another embodiment, a device such as a UE or MTC device may be configured by an eNB or network node such as an LTE network node to monitor specific bandwidth parts of the overall system bandwidth. Such monitored occurrences may include inband DL allocations and/or UL grants in the form of identifiers and/or transmission formats. For example, a device such as a UE or MTC device that may support a reduced BW may synchronize in the DL to a cell such as an LTE cell that may support a higher BW. For example, the device such as a UE or MTC devices may acquire the DL synchronization signals and PBCH/MIB broadcast by the cell such as the LTE cell. Such signals may be carried in the center 6 RBs of the cell such as the LTE cell and may already serve the purpose to allow configuration of system parameters including system bandwidth in the R8 system. The device such as a UE or MTC device may decode system information pertaining to random access such as given through SIB1 and/or SIB2 in the network or system such as the LTE system through monitoring pre-determined occurrences of system information sent in a center bandwidth in designated subframes and bandwidth portions, then may register to the network via a random access procedure.

As part of or following the registration with the network, the device such as a UE or MTC device may be configured with designated DL transmission resources to be monitored. Additionally, DL and/or UL identifiers when signaled inband on these monitored resources may enable or allow the device to receive DL data transmissions or when received may allow the device to transmit UL data transmissions.

A similar procedure or method may be used for a device such as a UE or MTC device when already registered with the network such as the LTE network to either change the allocated DL transmission resources to be monitored (e.g. in terms of an allocated identifier, a transmission format, a schedule, and the like).

A device such as a UE or MTC device that may monitor allocated DL transmission resources on the monitored time and/or frequency resources may determine if at least one DL identifier signaled inband as part of the DL transmission resources may be received. The device such as a UE or MTC device may determine if at least one received DL identifier may correspond to its own identifier, and if so, may proceed to decode the corresponding DL data transmission in that subframe. Otherwise, it may return to monitoring. In addition, or independent from the monitored occurrences for the DL identifiers, the device such as a UE or MTC device may attempt to decode the DL signal transmission resources for presence of at least one UL identifier. If it may receive and validates at least one UL identifier, the device such as a UE or MTC device may prepare for transmission, then may transmit the UL PUSCH in the associated and designated UL transmission resource.

According to the methods described herein, the network such as a LTE network may allocate devices such as UEs or MTC devices using a flexible reception schedule, and it may allocate both DL and UL transmission resources to MTC devices in a flexible manner even in presence of legacy or high data rate devices such as LTE devices supporting the full nominal bandwidth of the cell. In particular, the network such as a LTE network may allocate more than one device such as a UE or MTC device to monitor the same DL transmission resource for scheduled DL data transmissions. Given typically small data rates (e.g. order of 10's or 100 kbps) for such devices such as UEs or MTC devices, spectrum efficiency may be achieved by having the ability to dynamically multiplex device data such as MTC for a population of devices such as UEs or MTC devices in a dynamic network-controlled scheduling process.

The multiple access approach described by the methods herein may be shown in FIG. 20. According to an example embodiment, the rule chosen for such an embodiment may include that a UL grant in subframe n may correspond to a PUSCH transmission in subframe n+4. Additionally, a first set of devices such as UEs or MTC devices may be allocated to monitor PDSCH transmission resources in subframe 1, and once per frame. A second set of devices such as UEs or MTC devices may monitor subframe 1, but another set of designated DL transmission resources every other frame. A third set MTC devices may also monitor subframe 2 and each 2nd frame for DL signal transmissions. The eNB may further dynamically allocate DL transmissions and UL transmissions within the individual groups of monitoring devices such as UEs or MTC devices.

In some embodiments, devices such as UEs or MTC devices may implement support for processing a reduced channel bandwidth with dramatic consequences and reduction onto RF component cost and count and/or scaled down ADC/DAC and BB processing capabilities when compared to devices such as LTE devices supporting full nominal bandwidth, (e.g. up to 10 or 20 MHz).

Control information signaling in PDSCH (e.g. data) regions may also be provided and/or used with devices such as UEs or MTC devices that may be lower-cost and/or may support a reduced bandwidth. For example, in other embodiments, a device such as a UE or MTC device may receive downlink control channels in the PDSCH region with the limited bandwidth support. The device such as the UE or MTC device may receive the downlink control channels in the PDSCH region since the legacy downlink control channels may be at least partially readable.

Additionally, a Physical Control Format Indicator Channel (PCFICH) indication may be provided and/or used as described herein. For example, the PDCCH and PDSCH such as the LTE PDCCH and PDSCH may be multiplexed using TDM in a subframe and the boundary between the PDCCH and PDSCH may be indicated by PCFICH in each subframe. As such, to transmit downlink control channels in the PDSCH region, the device such as the UEs or MTC devices may be informed of the boundary.

The device such as the UEs or MTC devices may receive the boundary information of PDCCH and PDSCH region using one of the follow mechanisms. For example, to receive such information, higher-layer signaling may be provided and/or used where UE-specific RRC signaling may indicate the boundary of PDCCH and PDSCH in the subframes. The boundary information may be valid to a subset of subframes in a radio frame, a subset of radio frames, and/or a subset of subframes in multiple radio frames (e.g. four radio frames). In such embodiment, the device such as a UE or a MTC device and/or group may have different subsets of subframes and/or radio frames such that the PCFICH value may vary from a subframe to another from eNB perspective. In embodiments, this may provide higher system throughput.

Additionally, to receive such boundary information, broadcasting information may provided and/or used. For example, the PCFICH value for MTC devices is informed in broadcasting channel (e.g., SIB-2).

In another embodiment, to receive such boundary information, a new PCFICH (e.g. a M-PCFICH) may be transmitted for devices such as UEs or MTC devices in the PDSCH region. For example, a device such as a UE or MTC device may receive an M-PCFICH in a subframe n-k which may be valid in the subframe n. The value k may be a fixed positive integer value such as '1' or '2' or variable according to the higher signaling. The k may be '0' as a fixed value.

Furthermore, to receive such boundary information, a radio frame header may be provided and/or used. For example, a radio frame header that may indicate the PCFICH for subframes in a radio frame (e.g. 10 ms) may be transmitted. A radio frame may include a single PCFICH that may be valid for subframes or multiple PCFICH values for each subframe or group of subframes in a radio frame. In embodiments, the radio frame may be longer than 10 ms such as 40 ms, and the like. The radio frame header may also be transmitted in the first subframe in a radio frame.

According to another embodiment, a PCFICH may not be used by narrower BW devices such as UEs or MTC devices. For example, PDSCH intended for devices such as UEs or MTC devices may start in a specific symbol of a subframe that may be known to the devices regardless of the actual boundary between PDCCH and PDSCH indicated by PCFICH. In such an embodiment, for the narrower BW device such as UEs or MTC devices operating in a cell with a larger BW, the PDSCH may be allocated as if PDCCH region was always a fixed number of symbols (e.g. 3 symbols).

Such an embodiment may also be applicable to the use of ePDCCH by particular devices such as reduced BW UE or MTC devices. For example, the ePDCCH that may be intended for such devices may start in a specific symbol of a subframe that may be known to the particular devices regardless of the actual boundary between the PDCCH and PDSCH that may be indicated by the PCFICH. In such an embodiment, for devices operating in a cell with a larger BW, the ePDCCH may be allocated as if the PDCCH region may be a fixed number of symbols (e.g. 3 symbols).

According to example embodiments, a device such as UE or MTC device may receive the M-PCFICH in the positions of the zero-power CSI-RS or subsets of configured zero-power CSI-RS. The use of zero-power CSI-RS for a M-PCFICH transmission may enable the impact of legacy UEs (e.g. LTE Rel-10 UEs) to be avoided or limited as such legacy UE rate-match the zero-power CSI-RS while exploiting frequency diversity gain. The 10 zero-power CSI-RS configurations that may be available (e.g. in Rel-10) for FDD and may be used herein may be shown in the table of FIG. 22 and the zero-power CSI-RS patterns according to the CSI reference signal configuration number that may be used herein may be shown in FIG. 23.

Additionally, in embodiments, a single or multiple zero-power CSI-RS(s) may be configured in a subframe with a duty cycle. As such, a M-PCFICH transmission may include a duty cycle. For the duty cycle based M-PCFICH transmission, a device such as a UE or MTC device may receive the boundary information of PDCCH and PDSCH for subframes within duty cycles with one of following: M-PCFICH bundling within a duty cycle, individual M-PCICH transmission, and the like.

In M-PCFICH bundling within a duty cycle, an M-PCFICH value may be valid within duty cycle such that device such as a UE or MTC device may consider the same PCFICH value for multiple subframes within a duty cycle. For example, if a M-PCFICH duty cycle may be configured with K ms and an M-PCFICH may be received in subframe n, the M-PCFICH value may be valid until the subframe n+K−1. The M-PCFICH starting subframe may also be defined with an offset. In such an embodiment, the M-PCFICH value may valid between subframe n+Noffset and n+K−1+Noffset. An example Noffset may be "1."

In an individual M-PCFICH transmission, multiple M-PCFICH values may be transmitted in the subframe which may inform or provide a PCFICH value for each subframe or multiple groups of subframe in the duty cycle.

Various zero-power CSI-RS configurations and associated M-PCFICH transmission schemes may be provided and/or used herein. For example, in one embodiment (e.g. a first example), a single zero-power CSI-RS may be configured for M-PCFICH transmission. The single zero-power CSI-RS configuration may include a CSI-RS pattern among 4 CSI-RS ports patterns and a duty cycle with a subframe offset. Additionally, four REs may be reserved in a PRB-pair for zero-power CSI-RS.

In such an embodiment, a device such as a UE or MTC device may receive the M-PCFICH in the zero-power CSI-RS REs based on one or more of following: a CRS-based transmission scheme, a sequence based transmission, a DM-RS based transmission, and the like. According to an example embodiment, the CRS-based transmission scheme may be dependent on or based on the number of antenna ports such as Port-{0} in a single CRS port, Port-{0, 1} in two CRS ports with a time domain space time block code (STBC) in the position of zero-power CSI-RS in which a pair of STBCs may be transmitted in the time domain consecutive REs (e.g. a OCC RE pair), a Port-{0, 1, 2, 3} in four CRS ports with a STBC combined with frequency switched transmit diversity (FSTD) in which a pair of STBCs may be transmitted in an OCC RE pair through Port-{0, 2} and the other pair of STBCs may be transmitted in another OCC RE pair through Port-{1, 3}.

Additionally, the sequence based transmission may include orthogonal or quasi-orthogonal multiple sequences that may be defined and transmitted in the position of zero-power CSI-RS RE. According to the sequence number, a device such as a UE or MTC device may notice the boundary of PDCCH and PDSCH.

In a DM-RS based transmission, a new DM-RS based antenna port may be defined. The pattern of the new DM-RS port may be located in the first OFDM symbol in each OCC RE pair. Multiple orthogonal DM-RS ports may also be defined and the DM-RS port may be configured by higher layer signaling and/or tied with a physical cell ID.

In another embodiment (e.g. a second example), a pair of zero-power CSI-RS configuration may be used for M-PCFICH transmission. For example, the configuration {0, 5}, {1, 6}, {2, 7} {3, 8} and {4, 9} may be configured together. In such a configuration, a device such as a UE or MTC device may receive the M-PCFICH in the pair of zero-power CSI-RS based on one or more of following schemes: a CRS-based transmission scheme, a sequence based transmission, a DM-RS based transmission and the like as described herein. According to such embodiments, the CRS-based transmission scheme may be dependent upon or based on the number of antenna ports such as Port-{0} in a single CRS port, Port-{0, 1} in two CRS ports where a time domain space frequency block code (SFBC) may be in the position of zero-power CSI-RS and a pair of SFBC may be transmitted in the frequency domain consecutive two REs, Port-{0, 1, 2, 3} in four CRS ports with SFBC with frequency switched transmit diversity (FSTD) in which a pair of STBCs may be transmitted in the frequency domain consecutive two REs through Port-{0, 2} and the other pair of SFBCs may be transmitted in another two REs in the next OFDM symbol through Port-{1, 3}.

In the sequence based transmission, orthogonal or quasi-orthogonal multiple sequences may be defined and transmitted in the position of zero-power CSI-RS RE. According to the sequence number, a device such a UE or MTC device may notice the boundary of PDCCH and PDSCH.

Additionally, in the DM-RS based transmission, a new DM-RS based antenna port may be defined. The pattern of the new DM-RS port may be one of the two zero-power CSI-RS configuration. Multiple orthogonal DM-RS ports may also be defined and the DM-RS port may be configured by higher layer signaling and/or tied with a physical cell ID.

Figure 23:
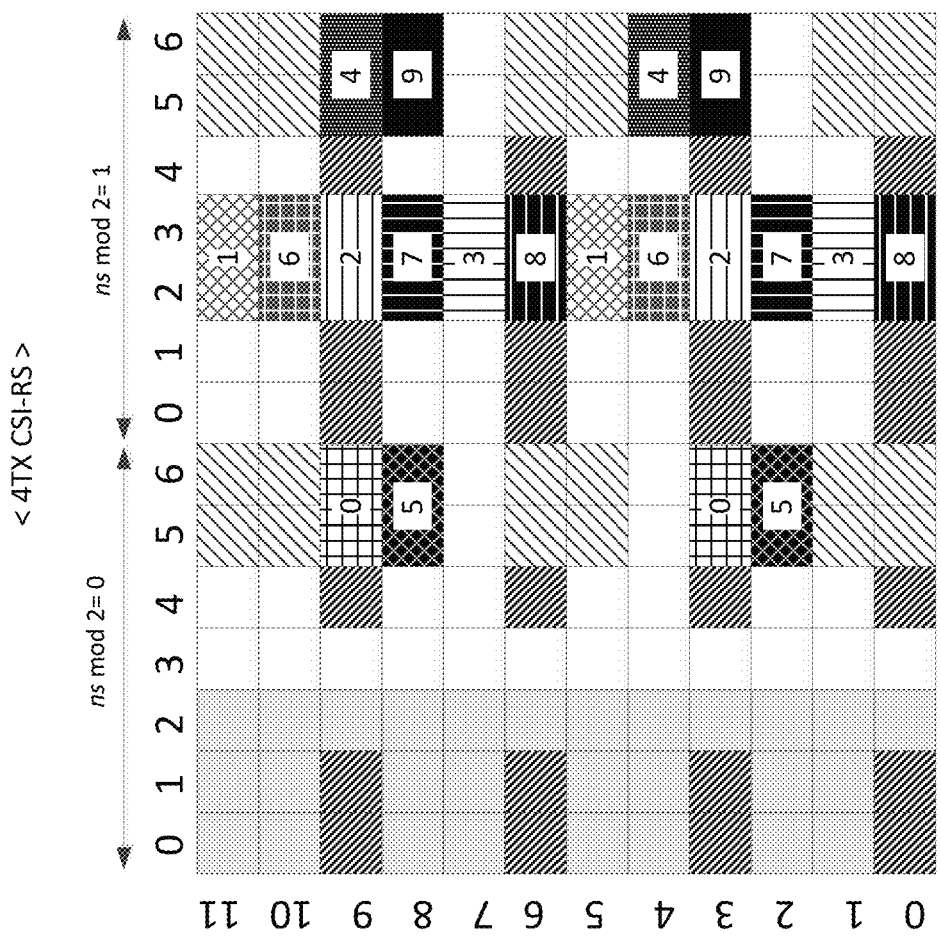
FIG. 23 illustrates an example embodiment of a zero-power CSI-RS pattern (e.g. based on 4TX or a configuration number 4).
Figure 24:
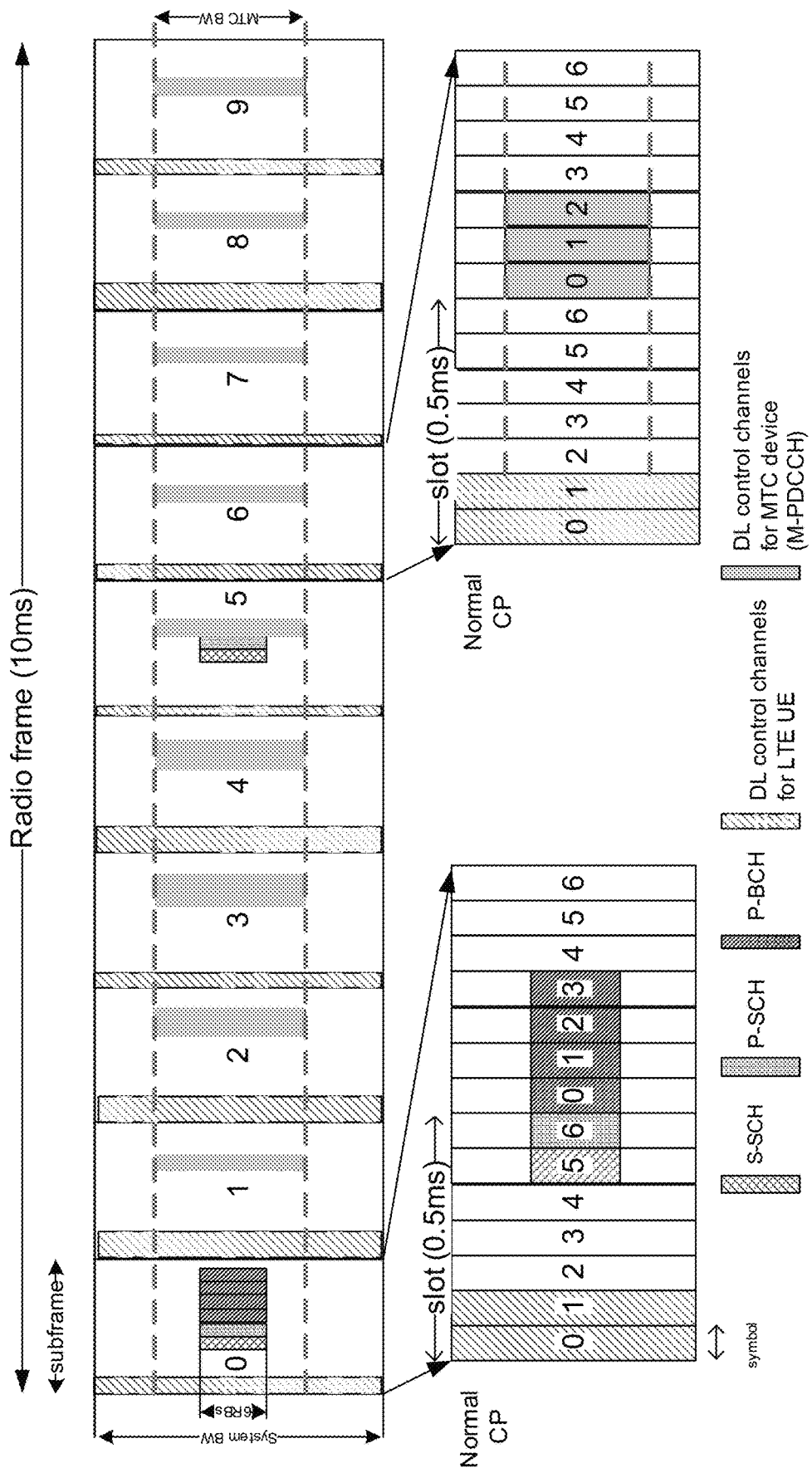
FIG. 24 illustrates an example embodiment of a frame structure of downlink control channels for a MTC device (e.g. that may include or use FDD).

An MTC device may receive the PDCCH in the PDSCH region in the second slot and the resource definition of the downlink control channels for M-PDCCH including PCFICH. PHICH, and PDCCH are the same as the LTE with the given bandwidth for MTC device. Among the downlink control channels, a subset of control channels may be available in the M-PDCCH region such as {PCFICH. PDCCH} and {PHICH, PDCCH}. FIG. 23 shows an example embodiment of such a M-PDCCH transmission within the first three OFDM symbols of a second slot in the MTC bandwidth.

The M-PDCCH region definition for the 0th OFDM symbol may be one or more of the following. In one embodiment, the M-PDCCH resource may not be defined in the 0th subframe in a radio frame due to the collision of P-BCH and M-PDCCH. A device such as a UE or MTC device may assume that no downlink control channel may be available in the 0th subframe.

Additionally, according to an embodiment, the M-PDCCH may be defined without the center 6RBs in the 0th subframe. The REG and CCE may be defined without center 6RBs with rate matching and, thus, the effective MTC bandwidth for PDCCH may be smaller in such an embodiment. For example, if the MTC bandwidth may be defined as MPRB=25 (e.g. 5 MHz) and the system bandwidth may be NPRB=50 (e.g. 10 MHz), the PDCCH resource such as the LTE PDCCH resource may be defined based on NPRB=50. Additionally, the M-PDCCH resource except for 0th OFDM symbol is defined based on MPRB=25 and the M-PDCCH resource for 0th OFDM symbol may be defined based on MPRB=19 (i.e., 25-6). Such an embodiment or method may enable or allow the scheduling flexibility using dynamic resource allocation from an uplink and/or downlink grant in each subframe. On the other hand, the M-PDCCH resource allocation in the MTC bandwidth in an available subframe may cause a legacy performance impact due to the collision between M-PDCCH and legacy PDSCH (e.g. because the legacy UE such as legacy LTE UE may not notice the existence of a M-PDCCH).

In another embodiment (e.g. a second method), a M-PDCCH resource may be flexibly allocated in the M-PDCCH region to minimize the legacy impact such as an LTE UE performance impact due to the collision between the legacy PDSCH and M-PDCCH. For such an embodiment or method, the M-PDCCH resource may be defined with one of the following.

The bandwidth of the M-PDCCH may be reduced to an amount even smaller than the device BW such as the MTC BW. For example, although the MTC bandwidth may be MPRB=25, the number of PRBs for the device BW or MTC BW may be independently defined with MPRB, PDCCH which may be equal to or smaller than MPRB. The MPRB, PDCCH may be provided, indicated, or signaled via higher layer signaling or broadcasting channels.

Additionally, the available subframe for M-PDCCH resource allocation may be restricted to a subset of the subframes in a radio frame or multiple radio frames. The subframe subset for M-PDCCH resource allocation may be predefined as {4, 5, 9} subframes or {0, 4, 5, 9} subframes. The subframe subset for M-PDCCH resource allocation may be configured in higher layer with a duty cycle such as 10 ms and 40 ms. The subframe that may include a M-PDCCH resource may be implicitly indicated by one or more of the following: if a subframe may include a CRS in the legacy PDSCH region, if M-PDCCH region is not collide with non-zero power CSI-RS, and the like.

The subframe subset which may be allowed for M-PDCCH may also be defined. For example, the subframe subset such as {0, 4, 5, 9} or {4, 5, 9} may be used and/or defined as a fixed subset. The subframe subset may be defined by higher layer signaling with 10 ms or 40 ms duty cycles. Additionally, the subframe subset may be implicitly defined as the subframe including a CRS in the legacy PDSCH region.

Figure 25:
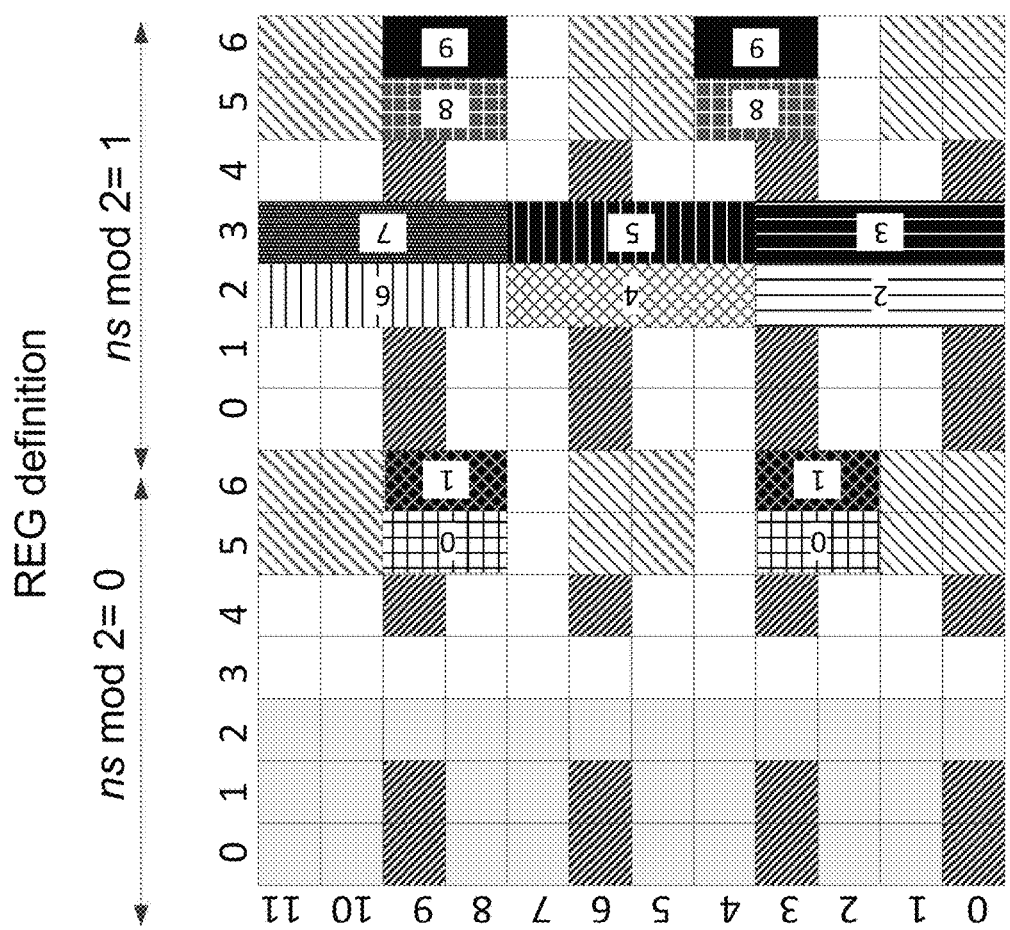
FIG. 25 illustrates an example embodiment of a REG definition in the zero-power CSI-RS region.

In another embodiment (e.g. a third method), zero-power CSI-RS resources may be used. For example, the REG definition for a M-PDCCH may be the frequency domain four consecutive zero-power CSI-RS REs. FIG. 25 depicts an example where possible CSI-RS patterns may be configured as zero-power CSI-RS in a subframe. For example, nine REGs may be defined within a PRB such that 9×MPRB may be the available REGs in the subframe if the 4Tx CSI-RS patterns may be configured for zero-power CSI-RS. In an embodiment, although the 4Tx CSI-RS patterns may be configured for the zero-power CSI-RS, the subframe of the configured zero-power CSI-RS may be used for M-PDCCH resource allocation.

In such an embodiment or method, the zero-power CSI-RS may be configured with a duty cycle such that the M-PDCCH resource allocation may be possible each Nduty [ms] where Nduty may imply the duty cycle for the zero-power CSI-RS configuration for the M-PDCCH. According to an example embodiment, such a method may be backward compatible for legacy UEs such as LTE UEs (e.g. Rel-10 UEs) since the position of the zero-power CSI-RS may be rate-matched.

In still further embodiments, methods for signaling in a PDCCH (e.g. control) region may be provided to enable or allow a device such as a UE or MTC device to receive downlink control channels in the PDCCH region with the limited bandwidth readability. To reuse the current downlink control channels such as LTE downlink control channels, the device such as the UE or MTC device may be informed of or provided the parameters related to the legacy downlink control channels including the total number of PRBs and PHICH configurations.

Additionally, a device such as the UE or MTC device may receive a PCFICH as described herein. For example, the device may receive the PCFICH in the RE position of legacy PCFICH. Since a device may detect a subset of REGs for a PCFICH. PCFICH bundling in which a device may assume that consecutive multiple subframes may indicate the same CFI value may be used. According to an example embodiment, in PCFICH bundling, similar PCFICH coverage may be achieved from time domain bundling. Such time domain bundling may use, provide, and/or exploit time diversity gain. Additionally, in such an embodiment, among the sets of 4 REGs for PCFICH, the readable REGs may be 1, 2, 3, or 4 according to the system bandwidth. If the REGs (e.g. the 4 REGs) may be within the device, UE or MTC supportable bandwidth, the PCFICH bundling may not used and the device behavior may be the same as the legacy device such as LTE UEs.

For PCFICH bundling, the number of subframe for that may be used and/or provided may be defined. For example, in one embodiment, the number of subframe for PCFICH bundling (Nsubframe) may be defined according to the number of REGs within the MTC supportable bandwidth using, for example $$N_{subframe} = \left\lceil \frac{4 - M_{REG}}{2} \right\rceil + 1$$

where MREG may denote the number of available REG for PCFICH in the supportable bandwidth such as device or UE or MTC supported bandwidth, Nsubframe=4 if one REG may be available, Nsubframe=2 if two REGs may be available, Nsubframe=2 if three REGs may be available, and the like.

Additionally, the CFI codeword for each case may be defined with a subset of codeword associated with the rest of REGs for PCFICH shown in the table of FIG. 26. For example, if two REGs may be readable in the supportable device bandwidth and the first and the last REGs may be located out of the device bandwidth, the CFI codeword that may be used may be shown as the table of FIG. 26. As another example, if the second REG may be available in the device supportable bandwidth, the CFI codeword that may be used may be shown in the table of FIG. 27. According to an example embodiment, such a method may enable or allow a backward compatible PCFICH transmission while keeping similar coverage for a device such as a UE or MTC device.

In an embodiment (e.g. for PHICH reception), a device such as a UE or MTC device may receive a PHICH in the RE position of a legacy PHICH. To receive a PHICH, 3 REGs may be received in a subframe. The number of REG readable in the device supportable bandwidth may be different according to the system bandwidth and device supportable bandwidth. For example, if 3 REGs for a PHICH may be readable, the device PHICH reception behavior may be the same as that of legacy device such as a LTE UE. However, if one or two REGs for PHICH may be available, a PHICH may be received by a device using one or more the following methods.

For PHICH group bundling, if one REG may be readable in the device supportable bandwidth, three consecutive PHICH groups may be bundled together to indicate a PHICH. As an example, a PHICH group 1, 2, and 3 (e.g. as shown in FIGS. 9 and 15) may be bundled and the 1st PHICH group, 2nd PHICH group, and 3rd PHICH group may be considered a 1st REG, 2nd REG, and 3rd REG respectively.

Figures 28, 29:
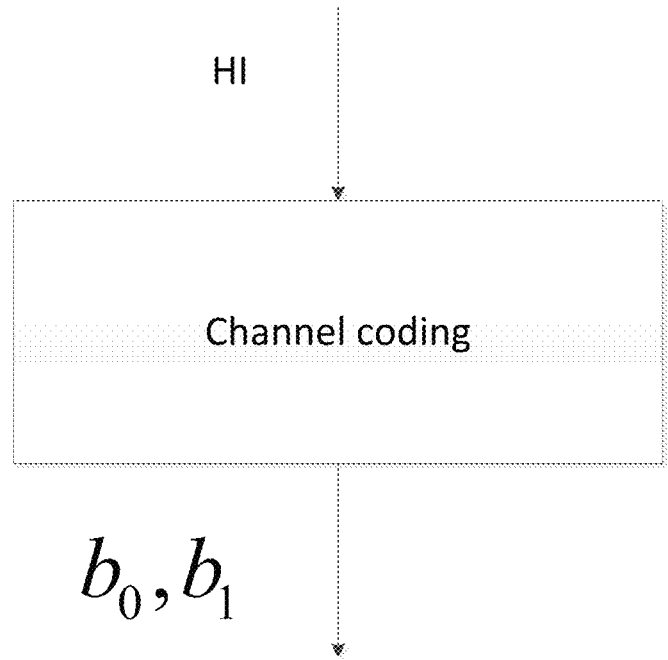
FIGS. 28 and 29 illustrate example embodiments of reduced repetition coding that may be provided and/or used.

For reduced repetition coding, if two REGs may readable in the device supportable bandwidth, the HARQ may be redefined as follows. A HARQ indicator (HI) may be a 2-bit HARQ indicator that may be defined for 2 REG-based PHICH channel for a device such as a UE or MTC device as shown in FIG. 28 and channel coding for the HI may be provided and/or defined as shown in FIG. 29.

In example embodiments, for PDCCH reception, a device such as a UE or MTC device may receive the PDCCH using the same definition of CCE for the legacy UEs performing in the wider system bandwidth. A CCE may include 9 REGs and the 9 REGs may be distributed in the system bandwidth with a subblock interleaver. A device such as a UE or MTC device may receive a PDCCH in the UE-specific search space and the starting CCE number for CCE aggregation may be defined according to one or more of following: higher-layer signaling; a RNTI based hashing function; CCE aggregation; and the like.

For blind decoding for PDCCH with CCE aggregation, if the number of REGs readable in a CCE among the CCE blind decoding candidate may be less than a threshold (e.g. 5 REGs), a device such as a UE or MTC device may avoid a blind decoding trial. The threshold (e.g. $N_{threshold}$) may be defined as a fixed value or configured in the higher layer signaling. Also, the blind decode dropping for a PDCCH may be defined with the ratio in the aggregated CCE candidates. For example, if the percentage of non-readable REGs may be higher than x-% (e.g. x=50), a device such as a UE or MTC device may drop blind decoding trials. Such an embodiment may be expressed as follows:

$$\frac{\text{Non\_readable } REGs}{\text{Total } REGs} \geq \alpha_{threshold}, \text{ where } 1 > \alpha_{threshold} > 0$$

where the $\alpha_{threshold}$ (e.g. 0.5) may be defined as a fixed vale or configured via higher layer signaling.

As described herein, data channels for use with a reduced bandwidth including devices that may support a reduced bandwidth may be provided. For example, systems and/or methods for increasing the resource utilization for the reduced bandwidth support for the PDSCH transmission in wider system bandwidth may be provided and/or used. In one embodiment (e.g. for illustrative purposes), the supportable bandwidth may be 6 resource blocks (RBs) and the system bandwidth may be 50RBs (10 MHz). Such an embodiment may be illustrative and the systems and/or methods described may be applied to other supportable reduced BWs and other system BWs.

In embodiments, the location of the supportable BW (e.g. 6RBs) for a device such as a UE or MTC device may be defined as at least one of the following: frequency locations for devices such as a UE or MTC devices that may be defined as center RBs (e.g. 6 RBs); a frequency location for each device that may be in different frequency locations, and the location for a specific device may be fixed; frequency locations for each device may be in different frequency locations and the location for a specific device may be configurable dynamically and/or semi-statically; and the like. In an embodiment (e.g. for illustrative purposes), the 6RBs may be a maximum supportable bandwidth for a device; however, the supportable BW may not be limited to the 6RBs. The 6RBs may be replaced by any number of RBs, which may or may not be fixed in number, and may still be consistent.

As described herein, a fixed band location may be provided and/or used. For example, in an example embodiment or method, devices may assume that PDSCH transmissions may be within the center 6RBs in which primary synchronization signal (PSS)/secondary synchronization signal (SSS) and physical broadcast channel (PBCH) may be transmitted in a specific downlink subframe number. In such an embodiment, to minimize blind decoding complexity, a device such as a UE or MTC device may use at least one of following assumptions.

For example, in one example assumption, the device such as a UE or MTC device may use, provide, and/or assume that a subset of downlink subframes, (e.g. only a subset) may include PDSCH for the device. The subset of downlink subframes for a specific device may be defined by at least one of following definitions. In one example definition, a valid subframe for PDSCH may be implicitly defined by C-RNTI. For example, a modulo operation may be used with a modulo number Nsub, where the Nsub may be configured by higher layer signaling, broadcasting, and/or predefined number. As the Nsub may become larger, the scheduling opportunity for a device may get reduced. In another example definition, the valid subframe for PDSCH may be explicitly signaled by higher layer signaling such as UE-specific RRC signaling.

Additionally, in another example assumption, if a subframe may include PSS/SSS and/or a PBCH, a device such as a UE or MTC device may skip blind decoding for the downlink control indicators (DCIs) related to PDSCH transmission. According to an embodiment, if ePDCCH may be used, ePDCCH resource configuration may be informed in the broadcasting channels.

In another example embodiment or method, the frequency location for a device such as a UE or MTC device may be informed by the broadcasting channel. As such, once a device finishes broadcasting channel reception such as a master information block (MIB) and/or system information block (SIB-x), the device may know which 6RBs may be used. Additionally, since the network may avoid center 6RB allocation, the scheduling restriction in a specific subframe such as subframe #0 and #5 may be relaxed. In an embodiment, the same resources may be shared with each of the devices as in the first method. As such, blind decoding complexity reduction methods may be used.

In one reduction method, a subset of downlink subframes (e.g. only a subset) may include a PDSCH for the device. The subset of downlink subframes for a specific device may be defined by at least one of following definitions. In one definition, the valid subframe for PDSCH may be implicitly defined by a cell-radio network temporary identifier (C-RNTI). For example, a modulo operation may be used with a modulo number Nsub, where the Nsub may be configured by higher layer signaling, broadcasting, and/or a predefined number. As the Nsub may become larger, the scheduling opportunity for a device may get reduced. In another example definition, the valid subframe for PDSCH may be explicitly signaled by higher layer signaling such as UE-specific RRC signaling.

In another reduction method, if a subframe may include PSS/SSS and/or PBCH, a device such as a UE or MTC may skip blind decoding for the DCIs related to PDSCH transmission. Additionally, in an additional reduction method, if a subframe may include paging or broadcast SIBs that the device may read, the device may skip looking for other requests such as UL and downlink (DL) grants.

As described herein, a flexible band location may be provided and/or used. For example, in an example flexible band location method, a frequency location for a device such as a UE or MTC device may be configured in an UE-specific manner and the location may be static or semi-static so that different frequency locations may be used for different devices which may increase downlink resource utilization and may relax downlink scheduling restriction. The UE-specific frequency location may be configured with at least one of following methods: a RACH msg2 may include a frequency location for a specific UE or device, and, thus, a UE or device may receive PDSCH after RACH procedures; and/or UE-specific radio resource control (RRC) signaling may be used to inform the frequency location. In such an embodiment, a UE or device may wait until it may receive the frequency location for PDSCH reception.

In another example flexible band location method, a frequency location for UE or devices may be dynamically allocated via physical control channel (e.g. PDCCH, ePDCCH). As such, the reduced bandwidth location may be changed from one subframe to another. For such a method, at least one of the following procedures or methods may be used for frequency location configuration. For example, a DCI transmitted via PDCCH may include frequency locations for devices and may be monitored in a common search space. The cyclic redundancy check (CRC) may be masked with a MTC specific group RNTI. The frequency location, which may be indicated in the PDCCH may be valid in the same subframe. Additionally, a DCI transmitted via ePDCCH may include frequency locations for devices and may be monitored in predefined time frequency locations in a subframe. The CRC may be masked with a device specific group RNTI and the frequency location which may be indicated in the ePDCCH may be valid for one or more subframe(s).

In another example flexible band location method, the frequency location for a MTC device may be dynamically allocated via PDCCH. Therefore, the resource allocation in the PDCCH may inform the frequency location. A DCI transmitted via PDCCH may include the frequency location with the resource allocation information within the supportable bandwidth (e.g. 6RBs). For example, if Nalloc bits may be used for resource allocation with full system bandwidth, a subset of Nalloc bits may be used for resource allocation of reduced bandwidth and the rest may be used to indicate the frequency location. As another example, two resource allocation bit fields may be defined for frequency location and PDSCH resource allocation where the resource allocation method for frequency location may be a resource allocation type 2 (e.g. contiguous resource allocation) and the PDSCH resource allocation may be resource allocation type 0 and/or 1.

In another example flexible band location method, the frequency location for a device such as a UE or MTC device may be dynamically changed according to a hopping pattern such that downlink control signaling overhead may be minimized and inter-cell interference may be randomized at the same time. The hopping pattern may be defined using at least one of following: multiple hopping patterns may be predefined and one of them may be selected per UE as a function of C-RNTI; hopping patterns per subframe may be defined as a hashing function with parameters including, for example, C-RNTI, Cell-ID, Physical Cell Identifier (PCI), subframe number or system frame number (SFN), and the like; and/or any other suitable mechanisms to define the hopping pattern. In embodiments, frequency location may be replaced by frequency locations, for example, in the case that the locations of the PDSCH RBs that may be intended for a certain or particular UE or device may not be consecutive.

As described herein, band location, ePDCCH, and PDSCH may be provided and/or used. For example, a device such as a UE or MTC device may monitor and/or attempt to decode both an ePDCCH and a PDSCH in the same subframe. The ePDCCH may include a UE-specific search space and/or common search space. When describing ePDCCH herein, embodiments or examples involving ePDCCH, ePDCCH common search space and ePDCCH UE-specific search space may be treated the same or differently. For example, when referring to ePDCCH, it may mean ePDCCH common search space or ePDCCH UE-specific search space, or both. Additionally, a PDSCH that may be indicated by an ePDCCH may include a PDSCH carrying at least one of downlink shared channel (DL-SCH), broadcast channel (BCH), paging channel (PCH), random access (RA) response, or any other type of data that a PDSCH may carry. Furthermore when describing examples or embodiments related to ePDCCH and PDSCH reception, the BW or the number of RBs that may be supported by the device such as the UE or MTC device may mean the BW or the number of RBs that may be supported by the device for the purpose of reception in the PDSCH region of the cell which may be different from the RF BW it may support and/or the BW or the number of RBs it may support for reception of the PDCCH region.

The following examples or embodiments may include ways in which ePDCCH may be defined or configured and methods or procedures in which a device such as a reduced BW UE or MTC device may be configured with, or understand, which ePDCCH resources to monitor and/or attempt to decode For example, the examples or embodiments disclosed herein may include methods or procedures in which ePDCCH may be used by or intended for at least one reduced BW device.

For example, in one embodiment, an eNB or cell may transmit ePDCCH such as ePDCCH intended for or intended for use by at least one reduced BW device such as a reduced BW UE or MTC device in accordance with at least one of the ways described herein in which an ePDCCH may be defined or configured, one of the methods or procedures in which a device may be configured to monitor ePDCCH, or one of the methods or procedures a device may use to understand which ePDCCH resources to monitor. For the case of the configuration, for example, for a cell, or a device or a group of devices, the eNB or cell may provide the configuration to one or more devices via broadcast or dedicated signaling such as RRC signaling.

Additionally, a device such as a reduced BW UE or MTC device may monitor and/or attempt to decode an ePDCCH (e.g. an ePDCCH intended for or intended for use by at least one reduced BW device) in accordance with at least one of the methods or procedures described herein in which ePDCCH may be defined or configured, one of the methods or procedures in which a device may be configured to monitor ePDCCH, or one of the methods or procedures a device may use to understand which ePDCCH resources to monitor. For the case of configuration, a device may receive the configuration from an eNB or cell via broadcast or dedicated signaling, for example RRC signaling.

In example embodiments, one or more of the following methods or procedures may be provided, used, and/or applied (e.g. for ePDCCH). For example, an ePDCCH may be defined or configured for a cell, for example, for devices such as devices capable of ePDCCH reception or each of the devices capable of ePDCCH reception in the cell, where such a configuration may be included in signaling such as by RRC signaling and may be provided via broadcast signaling or dedicated signaling to one or a group of devices. There may be a separate ePDCCH definition or configuration for reduced BW devices and for devices supporting the full cell BW. The ePDCCH resources (e.g. RBs), which may be used by or which may be intended for use by certain or particular devices such as reduced BW devices that may be UEs or MTC devices, may be a subset of the ePDCCH resources defined or configured in the cell. The subset may be explicitly identified by the cell, for example, via broadcast or dedicated signaling. The subset may be derived by the devices themselves in an embodiment. For example, the subset may be device specific and/or may be derived by a device based on, for example, at least one of the following: the device IMSI or C-RNTI; a system frame number (SFN); a subframe or timeslot number overall or within a frame; a number of ePDCCH RB groups defined; an ePDCCH hopping pattern; a physical cell ID; a BW supported by the device; a specific set of RBs supported by the device (e.g. center X RBs, where X may be for example 6, 12, or 15); the RBs supported by the device as a result of configuration; and the like.

For example, in an embodiment, the ePDCCH may be defined for a cell as N groups of RBs in various locations of the full BW. Each of the RB groups may include fewer than M RBs (e.g. 5 RBs max). A device such as a UE or MTC device may be configured to monitor one or more of those groups or may use criteria such as those described above among others to determine which group or groups to monitor. A device may also be or may instead be configured to monitor a subset of the RBs in a group or may use criteria such as those described above or other criteria to determine which RBs, or which RBs in a group or groups to monitor.

If ePDCCH may be defined or configured to include one or more groups of RBs and for a certain group or groups that the number of RBs may exceed a certain number, the device may exclude certain group or groups from the groups it may consider for monitoring. The certain number may be a fixed number known to the device, the number of RBs in its supported BW, or certain a value (e.g. one) less than the number of RBs in its supported BW.

When monitoring ePDCCH in a given subframe, a device such as a reduced BW UE or device (e.g. a MTC device) may assume that the PDSCH intended for it may be located in frequency such that the BW the device supports may not be exceeded. For example, the RB(s) for PDSCH that may be indicated by the ePDCCH may be located sufficiently close in frequency to the ePDCCH RBs the device may monitor in a given subframe such that the device may receive both, for example, in a window of RBs such as a consecutive window of RBs without exceeding its supported bandwidth.

The possible location (e.g., in frequency) of the PDSCH indicated by the ePDCCH may be based on a certain a priori known or a configured relationship such as a relationship described hereinbetween the location of the ePDCCH RB(s) which the device may monitor and/or attempt to decode and the location of PDSCH RB(s) indicated by that or those ePDCCH RB(s). According to an example embodiment, an eNB may transmit ePDCCH and PDSCH intended for at least a certain or particular device such as a reduced BW UE or device in accordance with such a relationship. The device may further monitor and/or attempt to decode ePDCCH and/or attempt to decode PDSCH in accordance with such a relationship.

For example, the frequency span from the lowest (e.g. lowest in in frequency) ePDCCH RB to be monitored by the device to the highest (e.g. in frequency in frequency) PDSCH RB to be read by the device may not exceed the BW supported by the device and the frequency span from the highest (e.g. highest in frequency) ePDCCH RB to be monitored by the device to the lowest (e.g. lowest in frequency) PDSCH RB to be read by the device may not exceed the BW supported by the device.

In an embodiment when the BW supported by the device may be in a window or group of consecutive RBs, the UE may be provided with and/or may know in advance whether the PDSCH RBs that may be intended for it may be above (e.g. in frequency) or below (e.g. in frequency) the ePDCCH RBs it may monitor.

In such an embodiment, among others, one or more of the following methods may be provided, used, and/or applied. For example, according to one embodiment, the PDSCH RBs may be on one side of the ePDCCH RBs such that the device may assume that the PDSCH RBs may be (e.g. or may typically be or may always be) higher or lower in frequency than the ePDCCH RBs it may monitor.

In another embodiment, the PDSCH RBs may be divided, for example equally, such that a certain or particular number such as half of the PDSCH RBs may be above (e.g. directly above) the ePDCCH RBs and the rest may be below (e.g. directly below) the ePDCCH RBs. For example, the device may assume that the PDSCH RBs may be distributed on either side of the ePDCCH RBs it monitors. In such an embodiment, if the device may monitor N consecutive ePDCCH RBs or certain RBs in a group of N consecutive ePDCCH RBs and the device may support a BW of M RBs, the PDSCH that may be indicated by the ePDCCH may be located in one or more RBs where these RBs may be located in a set of RBs that includes no more than (M−N)/2 PDSCH RBs above (e.g. directly above) the N ePDCCH RBs and no more than (M−N)/2 PDSCH RBs below (e.g. directly below) the N ePDCCH RBs. If M−N may be an odd number, the PDSCH that may be indicated by the ePDCCH may be located in one or more RBs where these RBs may be located in a set of RBs that includes no more than FLOOR[(M−N)/2] PDSCH RBs on one side of the ePDCCH RBs and no more than FLOOR[(M−N)/2]+1 PDSCH RBs on the other side of the ePDCCH RBs. Which side may have more PDSCH RBs may be understood or configured. As an alternative (e.g. where M-N may be odd), the PDSCH RBs that may be intended for the device may be in a set of RBs that may be no more than FLOOR[(M−N)/2] RBs on each side of the ePDCCH RBs. As a numerical example, if the device may monitor 4 ePDCCH RBs or one or more RBs in a group of 4 ePDCCH RBs and it may support a BW of 6RBs, the device may understand that there may be up to one PDSCH RB for it to read on each side of the 4 ePDCCH RBs. As another numerical example, if the device may monitor 4 ePDCCH RBs or one or more RBs in a group of 4 ePDCCH RBs, and it may support a BW of 15RBs, the device may understand that there may be one or more RBs in a set of 5 PDSCH RBs for it to read on one side of the 4 ePDCCH RBs and/or one or more RBs in a set of 6 PDSCH RBs for it to read on the other side of the 4 ePDCCH RBs. Such an embodiment may enable a device supporting M RBs to know which M RBs to receive before decoding the ePDCCH.

In another example embodiment, the PDSCH and ePDCCH RBs may be in a specific window of X RBs which may be defined or configured where X may be less than or equal to M where M may be the BW supported by the device in RBs. For example, in a window of X RBs, the device may monitor ePDCCH RBs that may include ePDCCH RBs that may be configured in the cell and/or certain ePDCCH RBs such as ePDCCH RBs that may be designated for the device or for specific devices such as reduced BW devices that may be within that window and may assume that RBs in that window that may not include ePDCCH RBs may include PDSCH RBs that may be intended for the device.

In another example embodiment, the device may be provided with configuration information, for example, by the eNB, which may be via signaling such as broadcast or dedicated signaling to one or a group of devices such as reduced BW UEs or devices regarding the relationship between the location of the ePDCCH RBs and the PDSCH RBs they may indicate. Such information may include one or more of the following: whether the PDSCH RB(s) may be higher or lower in frequency (e.g. typically higher or lower in frequency) than the ePDCCH RBs to be monitored by the device; if and/or how the PDSCH RB(s) may be located on either side of the ePDCCH RBs; a window of less than or equal to M RBs in which the device may find both ePDCCH and PDSCH that may be intended for it where M may be the BW supported by the device in RBs; and the like.

If a device may support a fixed location BW or set of RBs, for example, M RBs, or may be configured with a fixed location BW or set of RBs, for example, M RBs, which may be changed semi-statically, the device may monitor (e.g. only monitor) the ePDCCH RBs inside of that BW or those (e.g. M) RBs and may assume that ePDCCH and PDSCH that may be intended for it may be in the BW or RBs (e.g. M RBs) it may support or be configured with. The device may ignore ePDCCH (e.g., any ePDCCH RBs), which may be outside the BW or set of RBs it may support or be configured with. The RBs which may be supported by the device or for which the device may be configured with may be, for example, the center or another M RBs such as the center or another 6, 12, or 15 RBs.

In another embodiment, a device such as a reduced BW UE or device may monitor ePDCCH in certain subframes and may decode PDSCH in certain (e.g., certain other) subframes and the ePDCCH subframes and PDSCH subframes for a given device or group of devices may be mutually exclusive. The ePDCCH that may be received by a device such as a reduced BW UE or device in subframe n may correspond to PDSCH to be received in subframe n+x such as subframe n+1 or the next subframe in which PDSCH may be received or another known relationship.

It may be contemplated that the M-PDCCH may be replaced by an ePDCCH in any of the embodiments described herein such as the embodiments described for M-PDCCH and M-PDSCH in different subframes. The M-PDSCH in the embodiments described herein may also be replaced by PDSCH which may be intended for reception by certain devices such as reduced BW UEs or devices.

In another embodiment, the BW that a reduced BW device may support may correspond to a limited number of RBs, for example, 6, 12, or 15, where those RBs may not be consecutive. For example, if a device supports M RBs, in a given subframe, the device may and/or may be able to monitor and/or attempt to decode a certain number (e.g. X) of ePDCCH RBs which may indicate the location of a certain number (e.g. Y) of PDSCH RBs (e.g. where X+Y<=M).

According to an example embodiment, the X ePDCCH RBs and the Y PDSCH RBs may not be or may not need to be located in a consecutive window (or group) of less than or equal to M RBs. In such an embodiment, the device may know in advance (e.g. by at least one of a definition, configuration, relationship, rule, function of a device or cell ID, other parameters, and the like that may be in accordance with one or more of the solutions described herein), one or more of the location of a window of consecutive RBs in which the X ePDCCH RBs may be located and the location of a window of consecutive RBs in which the Y PDSCH RBs may be located. The sum of the number of RBs in those windows may be less than or equal to M. Such an embodiment may enable the device to buffer the PDSCH RBs while attempting to decode the ePDCCH RBs. This may also be extended to include multiple ePDCCH windows and/or multiple PDSCH windows, for example, provided one or more of the following may apply: the sum of the RBs in those windows may be less than or equal to M and/or the device may know, for example, in advance, where those windows may be (e.g. by at least one of a definition, configuration, relationship, rule, function of a device or cell ID, other parameters, and the like that may be in accordance with one or more of the solutions described herein).

Channel priority may also be provided and/or used as described herein. For example, a PDSCH may carry ordinary DL SCH data or it may carry special data such as broadcast, paging, or a random access response. The PDCCH or ePDCCH associated with these types of data may be scrambled with a Cell Radio Network Temporary ID (C-RNTI), system information-RNTI (SI-RNTI), paging-RNTI (P-RNTI), random access-RNTI (RA-RNTI), and the like respectively. A device such as a reduced BW UE or device may assume it may have a certain number of (e.g., one) types of DL data to process in a given subframe. For example, paging may have highest priority such that if in a given subframe, the device may decode a PDCCH or ePDCCH scrambled with P-RNTI (or another RNTI designated for paging), the device may assume there may be no ordinary DL data or system information blocks (SIBs) for it to process in that subframe, or it may assume that it may not be required to process such data if it may be present.

In another example, broadcast SIBs may have the highest priority and/or ordinary DL data may have the lowest priority. In this example, broadcast data or special data types may have higher priority than ordinary DL data. If in a given subframe, the device may decode a ePDCCH or PDCCH scrambled with the SI-RNTI (or another RNTI designated for broadcast data) or the RNTI for another special data type, the device may assume there may be no ordinary DL data for it to process in that subframe or it may assume that it may not be required to process such data if it may be present.

As described herein, in embodiments, DCI formats may be provided and/or used (e.g. with a device such as a reduced BW UE or MTC device). For example, a compact DCI may be defined for devices such as UEs or MTC devices such that downlink control channel coverage may be increased while supporting the functionalities for such devices. Additionally, a DCI associated with PDSCH may include at least one of following: two-step or two-type resource allocation (RA) information; a modulation and coding scheme (MCS); a hybrid automatic repeat request (HARQ) process number; a new data indicator (NDI); a redundancy version (RV); and the like.

In the two-step resource allocation (RA) information, two types of RA information may be included in a DCI such as MTC band indication and resource block indication for the device. As part of a first type of RA information, a device band index such as a UE or MTC device band index may indicate which subband may be used for the device. In this embodiment, the subband size may be the same as a RBG (Resource Block Group) size P for the system bandwidth ($N_{RB}^{DL}$). If $N_{RB}^{DL}$=25, and the RBG size may be 2 as shown in the table of FIG. 30. If one RBg may be used for a group of devices, the band index may use $\lceil \log_2 N_{RGB} \rceil$ bits where $N_{RBG}=\lceil N_{RB}^{DL}/P \rceil$.

As part of a second type of RA information, a RB index for PDSCH transmission may be indicated. The RB index may be indicated by bitmap where the RBG size P' may be related to the reduced bandwidth. As such, 6 bits may be used if 6RBs may be defined as reduced bandwidth for the device, which may be shown in the table of FIG. 30B.

In example embodiments, the first and second type of RA information may not be transmitted in the same DCI. Additionally, the two types of RA information may be informed to a device in at least one of following manners.

In one example embodiment, the first type of RA information may be informed to a device via a common DCI which may be shared with multiple devices while the second type of RA information may be informed via a DCI associated with a PDSCH. In another example embodiment, the first type of RA information may be informed to a device via a broadcasting channel (e.g. SIB-x) and the second type of RA information may be informed via a DCI associated with a PDSCH. According to another example, the first type of RA information may be configured via higher layer signaling and the second type of RA information may be informed via a DCI associated with a PDSCH. Additionally, the first type of RA information may be implicitly detected from a scrambling sequence for the reference signal in the PRB candidates and the second type of RA information may be informed via a DCI associated with a PDSCH.

According to an embodiment, a modulation coding scheme (MCS) may also be provided and/or used. For example, a MCS set may be reduced from 5 bits to 4 or 3 bits. If a single DCI may be applicable for a device for PDSCH transmission, the reduced MCS set may be used and a new DCI format may be defined such as DCI format 2D. The reduced MCS set may be used for fall-back transmission mode. For example, if DCI format IA and DCI format 2D may be used for a device, the DCI format 1A may have 3 or 4 bit MCS set and the DCI format 2D may have 5 bit MCS set. A new modulation order may be introduced such as a Binary Phase Shift Keying (BPSK) modulation order. BPSK may be introduced such that that the MCS table for the device may support {BPSK, quadrature PSK (QPSK), 16 quadrature amplitude modulation (QAM), and 64QAM}. In an embodiment. BPSK may replace the 64QAM modulation order and the TBS size may be reduced accordingly.

A HARQ process number and/or channel state information feedback may further be provided and/or used as described herein. For example, in an embodiment, the number of bits for HARQ process number may be changed according to the subframe configuration in multi-type subframe configuration.

Additionally, for CSI feedback, various alternatives as described below for reduced bandwidth configuration for low cost device may be considered according to the bandwidth reductions in RF, baseband, control region, and/or data region.

For example, the CSI reporting modes for reduced BW MTC may be it categorized as set forth below. In a first category, if there may be reduced bandwidth for both RF and baseband and the device may be limited to receive certain sub-bandwidths of the entire system bandwidth then one or more of the following may be provided, used, and/or applied. If a reduced BW for a device may be equal to the minimum BW in a network or system such as a LTE systems (e.g. the reduced BW=6 RBs), there may be no subband CSI reporting such as CSI reporting mode 1 and mode 1a may be used for the device, which may be shown in the table of FIG. 31. The reduced BW device may use partial or truncated cell-specific reference signals (CRS) and/or CSI-RS for a rank indicator (RI), channel quality indicator (CQI) and precoding matrix indicator (PMI) measurement. Additionally (e.g. for release 8/9/10,) a subband location index L for periodic CQI reporting may be defined as $$L = \left\lceil \log_2 \left\lceil \frac{N_{RB}^{DL}}{kJ} \right\rceil \right\rceil,$$

where k may be the number of RBs per subband and J may be the bandwidth parts (BP).

For example, if $N_{RB}^{DL}$=110 (RBs), k=8, and J=4, L=2 bits (e.g. 4 subband locations) for signaling the subband location for subband reporting may be provided and/or used. In the device, the $N_{RB}^{DL}$ may be replaced for the reduced BW as follows $$L = \left\lceil \log_2 \left\lceil \frac{N_{RB}^{DL\_MTC}}{kJ} \right\rceil \right\rceil,$$

where $N_{RB}^{DL\_MTC}$ may be the BW of MTC that may be supported.

In a second category, if a reduced bandwidth may be for baseband for both data channel and control channels and there may be no BW reduction for RF, one or more of the following may be provided, used, and/or applied. If a reduced BW for MTC may be equal to the minimum BW in a network or system such as LTE systems, there may be no subband CSI reporting used for the device. The starting RB location or index for wideband and subband CSI reporting may be signaled by the base station where the signaling may be via a RRC or DL control channel. A reduced BW device may use partial or truncated CRS and/or CSI-RS for a RI, CQI and PMI measurement. The subband location index L, the $N_{RB}^{DL}$ may be changed to the reduced BW of the device as follows $$L = \left\lceil \log_2 \left\lceil \frac{N_{RB}^{DL\_MTC}}{kJ} \right\rceil \right\rceil,$$

where $N_{RB}^{DL\_MTC}$ may be the BW of devices that may be supported for data and control channels.

In a third category, if a reduced bandwidth may be for data channel in baseband, while the DL control channels may still be allowed to use the carrier bandwidth and there may be no BW reduction for RF, the following may be used, provided, and/or applied. If a reduced BW for a device may be equal to the minimum BW in a network or system such as LTE systems, there may be no subband CSI reporting used for the devices. The CSI measurement method may be reused from rules such as LTE Release 10 rules or to reduce CSI complexity for the device. Additionally, the starting RB location or index and the number RBs for wideband and subband CSI reporting may be signaled by the base station. The subband location index L for periodic CQI reporting may be reused (e.g. from LTE Release 10) and defined as follows $$L = \left\lceil \log_2 \left\lceil \frac{N_{RB}^{DL}}{kJ} \right\rceil \right\rceil$$

or the $N_{RB}^{DL}$ may be changed to the reduced BW of the device as follows $$L = \left\lceil \log_2 \left\lceil \frac{N_{RB}^{DL\_MTC}}{kJ} \right\rceil \right\rceil,$$

where $N_{RB}^{DL\_MTC}$ may be the BW of the device that may be supported for data channel.

A device such as a UE or MTC device may be configured to report CSI with at least one of following behaviors. In a first behavior, a CSI reporting type may include and/or use at least one of following: a subband and/or wideband CQI; a subband and/or wideband PMI; a wideband RI; a best subband index (BSI); and the like. In the later embodiment, more than one subband may be defined within a system bandwidth $N_{RB}^{DL}$ and a subband index (e.g. a preferred subband index) may be selected at a device receiver such as a UE or MTC receiver. In addition, the subbands may be defined within a reduced bandwidth that may be used as a candidate for device resource allocation such as MTC resource allocation.

In a second behavior, a device may report CSI for a system bandwidth ($N_{RB}^{DL}$) and a reduced device bandwidth ($N_{RB}^{DL\_MTC}$). If $N_{RB}^{DL} \geq N_{RB}^{DL\_MTC}$ a BSI may be reported for $N_{RB}^{DL}$ and CQI/PMI and/or RI may be reported for $N_{RB}^{DL\_MTC}$. If $N_{RB}^{DL}=N_{RB}^{DL\_MTC}$, the BSI may not be reported and CQI/PMI and/or RI may be reported for $N_{RB}^{DL}$.

In a third behavior, a device such as a UE or MTC device may support one of PUCCH and PUSCH reporting. For example, PUCCH reporting modes may be supportable for such a device in an embodiment.

According to an example embodiment, a device such as a UE or MTC device may be defined as a new UE category that may supports low data rate and/or a reduced bandwidth. In such an embodiment, a UE category specific CSI reporting mode may be defined. For example, a UE category 0 may be defined and the supportable soft buffer size, multi-layer transmission, and CA capability may be defined lower than other UE categories. Additionally, multi-layer and carrier aggregation may not be supported for the UE category 0 and the soft buffer size may be smaller than UE category 1 as shown in the table of FIG. 32.

In another embodiment, the maximum number of DL-SCH transport block bits and the maximum number of bits of a DL-SCH transport block in the table of FIG. 32 may be defined with n-transmission time interval (TTI) for a new UE category where the n may be equal to or larger than 2 and may be defined at least one of following: n may be a predefined number; n may be defined according to at least one of system parameters such as system bandwidth, duplex mode (e.g., FDD or TDD), and/or physical cell ID; n may be configured via broadcasting, multicasting, or dedicated signaling; and the like.

Data channels with a reduced peak rate may be provided and/or used as described herein. For example, multi-frame or multi-subframe TDMA to multiplex data and control transmission may be used. To provide such multi-frame or multi-subframe TDMA, systems and/or methods that may define a multi-type subframe and/or radio frame to enable or allow a device such as a UE or MTC device to work in the smaller bandwidth within a wider bandwidth supporting a legacy device such as a LTE UE with a similar coverage.

Additionally, a multi-type subframe definition may be provided and/or used. For example, a device may receive downlink control channels and data channels in a different subset of subframes and/or radio frames. The downlink control channel region (e.g. the M-PDCCH region) for the device and the downlink data channel region (e.g. the M-PDSCH region) may be defined using one or more of following techniques. In one embodiment, a fixed structure in a radio frame may be used where the M-PDCCH region and M-PDSCH region may be interlaced in a radio frame and the M-PDCCH region and M-PDSCH region may be defined with consecutive subframes as shown in FIG. 3.

Figures 33, 34:
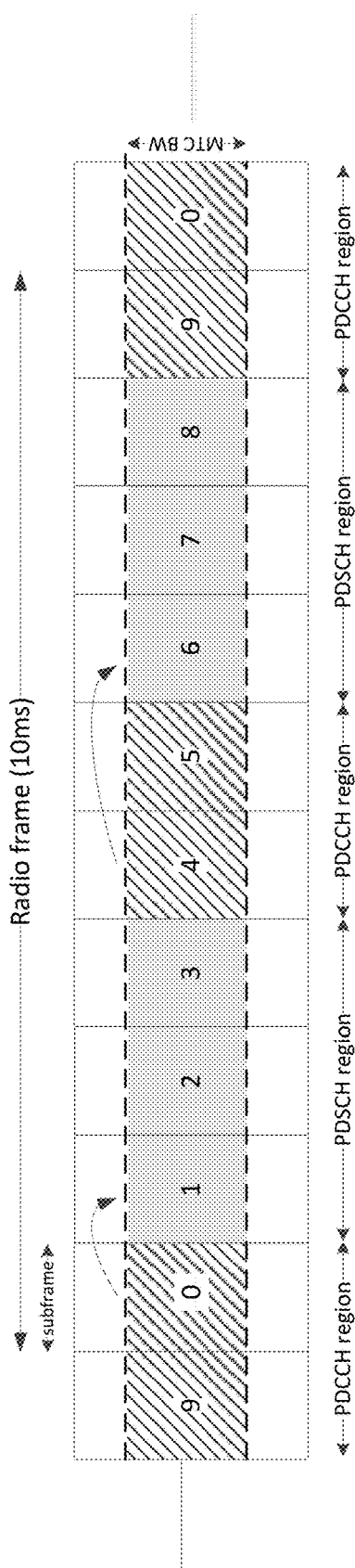
FIG. 33 illustrates an example embodiment of a multi-type frame structure.
FIG. 34 illustrates a table of an example embodiment of a configuration of a M-PDCCH region and/or a M-PDSCH region.

In another embodiment, a configurable structure or configurations with a predefined set may be used where multiple configurations of a M-PDCCH region and M-PDSCH region may be defined such that the ratio between control channel overhead and downlink resource utilization may be handled by an eNB according to the cell environment. The table of FIG. 34 shows an example embodiment for the predefined set based M-PDCCH region that may be defined as 'C' in the table and the M-PDSCH region configuration that may be defined as 'D' in the table.

Additionally, a flexible configuration such as a full flexible configuration with a bitmap via higher layer signaling may be used where a bitmap may be transmitted from higher-layer signaling that may indicate the M-PDCCH region and M-PDSCH region configuration. If the configuration may be defined with a radio frame, the bitmap size may be 10-bits.

In an example embodiment, from a device perspective such as a UE or MTC device perspective, the configuration of M-PDCCH region and M-PDSCH region may be further restricted to a subset of M-PDCCH and M-PDSCH subframes in a device-specific manner. For such a method, a device such as a UE or MTC device may receive configuration information from one or more of the following: a preconfigured set, a fully configurable set, and the like. In a predefined configuration set, the multiple of configurations may be pre-defined and the configuration number may be provided or informed to devices in a device-specific manner as shown in the table of FIG. 35 where 'N' may denote a null subframe in which a device may fall into micro-sleep mode, in which a UE may not receive any signal or perform measurement only. Additionally, in a fully configurable set, a bitmap is transmitted for each region and the subframe not used for either M-PDCCH region or M-PDSCH region may be considered as a null subframe.

A multi-type subframe operation may also be provided and/or used as described herein. For example, in an embodiment, for M-PDCCH reception and its associated M-PDSCH reception, behaviors of a device such as a UE or MTC device may be defined according to or using one or more of following methods or procedures.

For example, in one embodiment, a device may assume that the PDCCH transmission for downlink grant may be within a subframe subset in a radio frame. The subframe numbers in the subset in a radio frame for a PDCCH transmission may be {0, 4, 5, 9}. The device may assume that one subframe out of a subframes subset may include a PDCCH for the device. The PDCCH transmission for a downlink grant may be confined to {4, 9}. The PDCCH transmission for an uplink grant may be confined to {0, 5}. The search space may be further confined to a UE- or device-specific manner such that a device A may be restricted to see the subframe {4} for a downlink grant reception w % bile a device B may be restricted to search the subframe {9} for a downlink grant reception.

Additionally, according to an embodiment, a device such as a UE or MTC device may assume that a downlink control channel may be located across the two consecutive subframes {9, 0} and {4, 5}. A PCFICH may be transmitted with the same CFI value in the consecutive subframes {9 (e.g. in previous subframe), 0} and {4, 5} to support a bundled M-PCFICH as described above. A PDCCH may be transmitted in one subframe of {9, 0} and {4, 5}

In another embodiment, a device such as a UE or MTC device may receive the PDSCH in the subframe n if a corresponding PDCCH may be received in the subframe n-j where j may be defined according to one or more of following: j may be pre-defined number such as j=2; j may be indicated in the corresponding PDCCH in each DL grant; j may be configured by UE-specific RRC signaling; and the like.

A device such as a UE or MTC device may transmit the PUSCH in the subframe n if corresponding PDCCH may be received in the subframe n-k, where k may be defined according to one or more of following: k may be a pre-defined number such as k=2; k may be indicated in the corresponding PDCCH in each DL grant; k may be configured by UE-specific RRC signaling; and the like.

Additionally, TTI bundling for a PDCCH and PDSCH transmission may be provided, used, and/or assumed. For example, a device such as a UE or MTC device may receive a PDCCH across subframes {4, 5} and the corresponding PDSCH across the subframe {6, 7, 8}. The HARQ process may also be bundled within {6, 7, 8}. The same behavior may be defined for the sets of subframe {9 (e.g. in the previous subframe), 0} and {1, 2, 3}.

In an embodiment, a device such as a UE or MTC device may provide, use, and/or assume that a subset of a radio frame may not include information for the device such that a radio frame based sleep mode may be used to reduce to computational power at the MTC device receiver.

A transport block size (TBS) may also be used and/or provided as described herein. In an embodiment (e.g. a first method), a TBS table may be defined for devices such as a UE category 0 device as shown in the table of FIG. 36. In such an embodiment, the subset of TBS table for UE category 1 may be used as the UE category 0 may supports up to 6 PRBs. However, the maximum supportable number of PRBs may not be restricted to 6 PRBs and an additional number of PRBs may be also used. The table of FIG. 36 also shows the TBS available for a UE category 0 and its associated MCS index and modulation order.

According to another embodiment (e.g. a second method), the TBS table for UE category 0 may be defined with smaller TBS size according to the number of PRBs to increase the downlink coverage and the TBS table may have at least one of the following properties. For a first property, in a given MCS index, a single TBS size may be used irrespective of the number of PRBs that may be assigned for the device if an eNB may configure the fixed TBS size. In this embodiment, the TBS size may be the same as that of $N_{PRB}=1$. The TBS size may be configured by higher layer signaling. For a second property, at least a portion of the MCS index for the highest modulation order may be reused with a lowest modulation order and its associated TBS size to support a smaller TBS size in a given number of PRBs. For a third property, an eNB may override the maximum TBS size with $N_{TBS}^{restrict}$ and a TBS larger than $N_{TBS}^{restrict}$ may be replaced with a predefined number. For example, a TBS size for $N_{PRB}=c$ may be used where c may be a predefined number. For a fourth property, a subset of the MCS may have a fixed TBS regardless of the number of PRBs. The table of FIG. 37 shows an example of a TBS table using the properties in the above embodiment (e.g. the second method).

According to example embodiments, broadcast and/or multicast channels may be provided and/or used. For example, network techniques may be used (e.g. to schedule DL system information and paging messages, and the like) for low-cost devices such as UEs or MTC devices that may support a reduced bandwidth.

To provide such techniques and/or broadcast or multicast channels, an indication such as a MIB indication of narrower bandwidth device support may be provided and/or used. For example, a E-UTRAN or the eNB may indicate cell support to the narrower bandwidth devices including UEs and low cost MTC devices in the master information block (MIB) broadcast since the MIB may be transmitted in the center frequency of the cell. The indication may take some of the current sparing bits. Additionally, the indication may include one or more of the following: general support for narrower bandwidth reception and/or transmission, a narrowest bandwidth UE support category (e.g. 1.4 MHz or 3 MHz or 5 MHz); a narrower bandwidth receive signaling support category (e.g. new M-PCFICH, M-PDCCH, M-PHICH in the legacy "control region" or in the legacy "data region") and possible physical resource used (e.g. the number of symbols and number of PRBs and frequency location); a new common control region space support (e.g. in a current "control" region or in "data" region) for narrower bandwidth receiver; and the like.

In such techniques and/or broadcast or multicast channels, a common search space for a narrower bandwidth device may be provided and/or used. For example, in some embodiments, a special common search space where the narrower bandwidth device such as a UE or MTC device may find the SI-RNTI, P-RNTI and RA-RNTI may be defined for the narrower bandwidth device to receive the vital system signals. In one embodiment, this may be defined in the data region. The new common search space for narrower bandwidth device reception may be located in the symbol-k (e.g. where k=CFI, 0 based), symbol k+1, to symbol k+n, where n may be configured or predefined with the frequency range f. The new common search space that may be spread over the frequency range f (e.g. where f=frequency bandwidth that may be supported for the device which may be smaller than system bandwidth for legacy devices such as LTE UEs).

Alternatively, this may be defined in the control region. In the existing control region center frequency portion where the narrower bandwidth device may receive data or information, the device may claim a UE specific search space as the "new common search space for narrower bandwidth UE device" by not allocating C-RNTIs or temporary-C-RNTIs that may result a UE specific search space located into those claimed space to the devices or UEs in this serving cell.

Additionally, in such techniques and/or broadcast or multicast channels, a narrower bandwidth device indication may be provided to the network. For example, a device such as a UE or MTC device may indicate itself as a "special" device such that that the base station, E-UTRAN, eNB, and the like associated with the network may be able to transmit control signals and data in the channels such as a random access response (e.g. with RA-RNTI) that may be suitable for the reception by the narrower bandwidth devices or UEs.

As such, in an example embodiment, an indication may be provided to the eNB. The device may provide such an indication during a random access procedure such as during an initial connection procedure. For example, in a PRACH transmission (e.g. as shown in FIG. 12), a contention-based procedure may be performed where the device may choose a preamble sequence and a time (subframe)-frequency resource.

The following embodiments or methods may be proposed to enable an eNB to distinguish a regular UE from a narrower bandwidth device based on the random access (PRACH) resources the device may use. For example, in one embodiment, a device may use (e.g. choose from) certain random access resources such as preamble sequences and/or time and/or frequency resources that may be designated for use or otherwise known to be usable by at least narrower bandwidth devices, MTC device, or a specific UE category. Such resources may be reserved for such devices, may be usable by other devices, and/or may be a new set of resources or a subset of existing resources.

In another embodiment or method, the device may transmit an additional bit with the preamble transmission (e.g. for RACH message 1 via PRACH, to indicate its device type such as a narrower BW device, the current RACH message 1 may carry 6 bits information with 5 bits for a preamble ID, 1 bit for RACH message, and 3 length indications). This extra bit may be used by the eNB to distinguish PRACH preamble reception from either a regular device or narrower bandwidth device.

Figure 38:
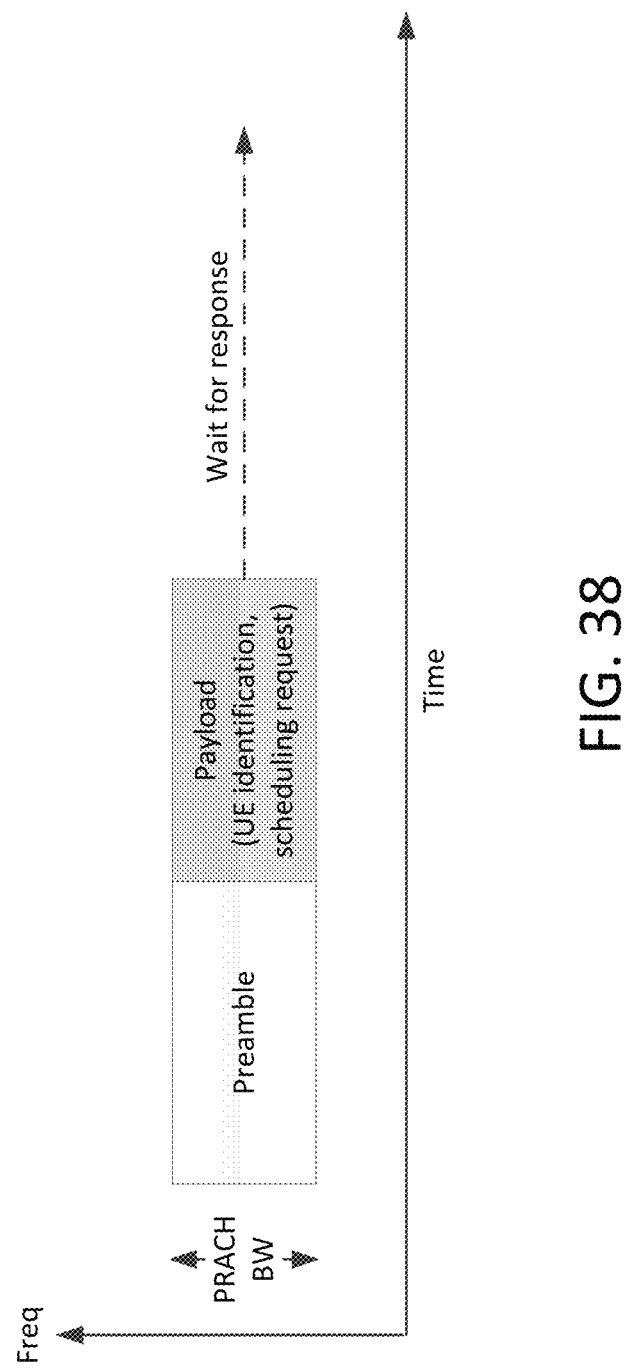
FIG. 38 illustrates an example embodiment of a PRACH transmission structure for a preamble that may be followed by a RACH payload.

According to yet another example embodiment or method, the device may transmit a small payload following (e.g. immediately following), the preamble to convey additional information such as a device type, a UE identity, a scheduling request, other small amounts of data, and the like. This may be a single transmission composed of RACH preamble and RACH message where the RACH message may convey additional information as described above. The preamble may be used as reference for the demodulation of the RACH message (e.g. payload) part, and, thus, the UL demodulation reference signals may be saved (e.g. may not be needed). Once the eNB may successfully detect the PRACH preamble, it may further proceed to decode the RACH message part. FIG. 38 illustrates an example embodiment of the transmission of a PRACH with a payload.

In another example, the UE may transmit a small payload (e.g. a RACH payload) in resources associated with the preamble resources such that based on the preamble and/or time and/or frequency of the preamble the resources including time and/or frequency resources to use for the payload may be known to the device and the eNB. Once the eNB may successfully detect the PRACH preamble, it may further proceed to decode the RACH message part.

When the eNB or network component may detect the special preamble (e.g. a modified preamble or preamble plus payload) and/or a particular or certain random access resource such as a certain preamble/subframe/frequency combination that may be selected from a certain set of random access resources from the device, the eNB or network component may be able to determine that the incoming message or request may be from a narrower bandwidth device. If the eNB or network component may determine that the incoming random access message or request may be from a narrower bandwidth device, the eNB or network component may following a special set of rules, for example, for signaling and/or data transmission to and/or from this device (e.g. an eNB or network component may keep certain signaling and/or data transmission for this UE within the narrower device receive range and/or into specially defined channels and spaces).

Figure 39:
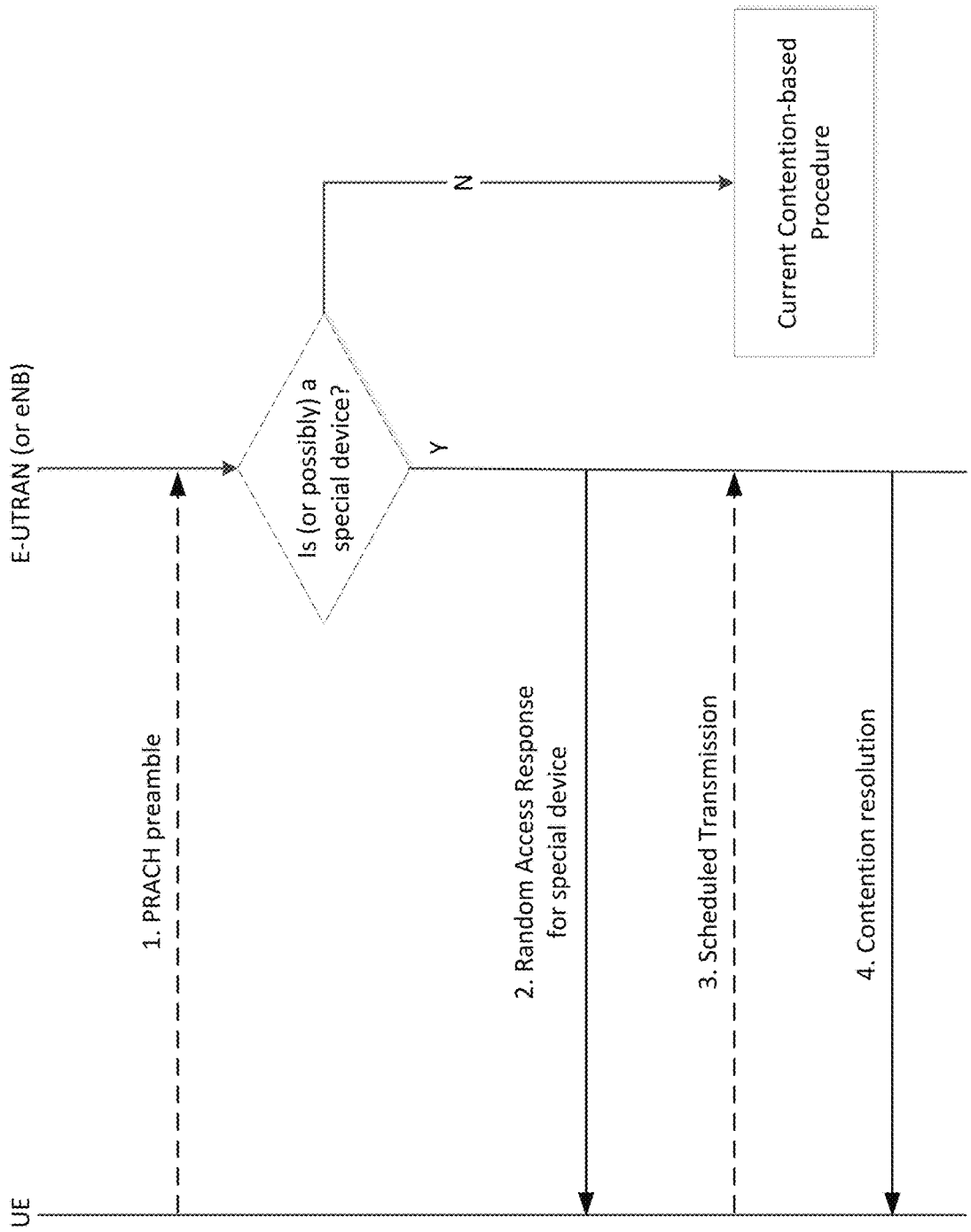
FIG. 39 illustrates an example embodiment of a contention-based RACH procedure that may be used with a narrower bandwidth device indication.

FIG. 39 provides an example of a modified contention-based RA procedure to handle narrower bandwidth device indication. As shown in FIG. 1, the device such as the UE may provide a PRACH preamble to the eNB, E-UTRAN, and/or network component at 1. As described above, the eNB or network component may determine whether the device may be a narrower bandwidth device at 1A. If the eNB or network component may determine that the device may not be a narrower bandwidth device, a regular contention-based procedure or method such as the procedure shown in FIG. 12 may be performed at 1B. If the eNB or network component may determine that the device may be a narrower bandwidth device, a contention-based procedure or method for a narrower bandwidth device (e.g. a special procedure or method) may be performed. In such a procedure, at 3, a random access response for a special device or a narrower bandwidth device may be provided from the eNB or network component. Then, at 4, a scheduled transmission for a special device or a narrower bandwidth device may be provided from the device or UE to the eNB or network component and, at 5, a contention resolution for a special device or a narrower bandwidth device may be provided from the eNB to the device or UE. The details of aforementioned methods may be described in more detail below.

For example, certain or particular random access resources may be used by narrower bandwidth devices. For example, in one embodiment, the network may reserve a special set of RACH preambles (e.g. random-access-preamble-group-c) for the use of the narrower bandwidth devices and the narrower bandwidth device may select one of them for random access (e.g. an initial random access). For preamble partitioning, existing RACH preambles may be partitioned and a subset of RACH preambles may be used for a device such as a UE or a MTC device such that an eNB or network component may differentiate a narrower bandwidth device before transmitting RA response. Alternatively, a combination of preamble partitioning and additional PRACH resources may be used. Additional RACH preambles may further be provided and partitioned such that some of such preambles may be used for a narrower bandwidth device.

In another example embodiment, the network may provide a set of preambles and/or subframes and/or frequencies that may be used by a narrower band device random access. This set of random access resources may be a subset of the cell's or eNB's existing random access resources (e.g. those usable by R8/9/10 UEs) or may be a separate set of random access resources. A subset or unique identification may be provided via RRC signaling such as broadcast or handover (e.g. mobility) signaling or may be a fixed identification (e.g. by specification). Additional random access (PRACH) resources may be allocated in a different time and/or frequency location. As similar with TDD, an additional PRACH resource or multiple PRACH resources may be defined in FDD. The additional or multiple random access (e.g. PRACH) resources or a subset thereof may be used by either a device such as a UE or MTC device that may support a narrower bandwidth or by other UEs (e.g. a MTC/Rel-11 regular UE). Whether a device may use these resources may depend on whether the device may recognize that these resources exist (e.g. whether the device may read the related broadcast information) or whether the device may decode ePDCCH. For a subset of the random access resources, there may be no limitation on which devices may use these resources. In an example embodiment, such a set of random access resources may be or may include the random access resources configured in the cell or eNB.

Based on the random access (PRACH) resources including the set of resources, the subframe or frequency of the resources, or the preamble that may be used by the device, the eNB may respond differently such as by providing the random access response (e.g., msg2 and/or others), DL control information in a PDCCH or ePDCCH, or both. For example, if two sets of PRACH resources may be defined (e.g. a RACH group 1. RACH group 2) and a device may transmit a RACH preamble in RACH group 1, the device may expect to receive a RA response (e.g., msg2) via a legacy PDCCH. Otherwise, if the device may transmit a RACH preamble in group 2, the device may expect to receive a RA response via ePDCCH. In this embodiment, a RACH group 1 may be backward compatible (e.g. usable by R8/9/10 UEs).

As another example, if two sets of PRACH resources may be defined (e.g. RACH group 1, RACH group 2) and a device may transmit a RACH preamble in RACH group 1, a device may expect to receive a RA response (e.g. msg2) via a legacy PDCCH. Otherwise, if the device may transmit a RACH preamble in group 2, a RA response may be provided via PDCCH and ePDCCH and a device may use either (e.g. based on its capabilities) to obtain the RA response. In this example, both RACH groups may be backward compatible (e.g. usable by R8/9/10 UEs).

As another example, the eNB may respond differently based on the frequency of the random access resources that may be used by the device such as by responding via ePDCCH or both PDCCH and ePDCCH when the frequency may be within the BW of reduced BW devices.

When the device may receive certain random access response messages (e.g. msg2 for a contention based procedure) via ePDCCH, the device may expect that the corresponding PDSCH may be located in the narrower bandwidth, for example, to ensure the narrower BW devices may access the response.

According to example embodiments, based on the random access (PRACH) resources including the set of resources, the subframe or frequency of the resources, or the preamble that may be used by the device, the eNB may respond differently such as by providing the DL control information for the random access response (e.g. msg2 and/or others) and/or the PDSCH random access response (e.g. msg2 and/or others) in a manner in which such a response or responses may be received and decoded by at least certain devices such as reduced BW UEs or devices (e.g. MTC devices).

For example, based on the random access (PRACH) resources that may be used by the device, the eNB may provide the DL control information for the random access response in ePDCCH RBs that may be within the BW or a set of RBs within the BW that the device such as the reduced BW UEs or devices may decode. This may, for example, include the center M RBs, where M may be the BW that may be supported by reduced BW UEs/devices. It may include the center X RBs, X<=M, where M may be the BW that may be supported by reduced BW UEs/devices and where X may be known or the UE may be informed of the value of X via signaling such as RRC signaling which may be broadcast or dedicated signaling. It may include a defined or configured set of X RBs. X<=M where M may be the BW that may be supported by reduced BW UEs or devices.

In embodiments, the device may be informed of the configuration by the eNB via signaling such as RRC or dedicated signaling which may be broadcast. The configuration may also be specific to at least one of the random access response according to one embodiment. For example, based on the random access (PRACH) resources that used by the device, the eNB may provide the random access response in RBs such as PDSCH RBs.

Additionally, a reduced BW device such as a UE or MTC device may decode at least one of the following: the center M RBs where M may be the BW that may be supported by reduced BW devices; the center X RBs, X<=M where M may be the BW that may be supported by reduced BW UEs/devices; and/or X, which may be known by the device or may be provided to the value of X via signaling such as RRC or dedicated signaling that may be broadcast.

As such, a defined or configured set of X RBs, X<=M, where M may be the BW that may be supported by reduced BW device may be used. The device may be informed of the configuration by the eNB via signaling such as RRC signaling which may be broadcast or dedicated signaling. The configuration may be specific to at least one random access response.

In another example, the above examples may be combined such that the eNB may respond by providing both the ePDCCH RBs and the PDSCH RBs for the random access response within the BW or may provide a set of RBs that the devices such as reduced BW UEs or devices may decode. For example, if the device may be expected, defined, and/or configured to decode a set of up to X RBs, both the ePDCCH RBs and the PDSCH RBs may be located by the eNB within that set of X RBs, which may be a set of X consecutive RBs.

Based on the random access (PRACH) resources including the set of resources, the subframe or frequency of the resources, or the preamble that may be used by the device, the eNB may respond differently when allocating UL resources to the device such as for the device response or data transmission. For example, if the device may use certain random access resources (e.g. a RACH preamble of group 2 when there are 2 groups of resources), the device may expect that a UL grant it may receive may be for resources in the narrower bandwidth. Otherwise, the device may expect that a UL grant may allocate resources in the full BW of the cell.

Additionally, in an embodiment, a flexible duplexer may be used by a device such as a narrower BW device or UE. In such an embodiment, the device may be able to support uplink transmission outside the narrower BW centered at the center of the BW of the cell as long as the allocation may not exceed the total BW supported by the device. For example, if the device may support a 5 MHz BW, it may shift its transmission band to a different 5 MHz of a larger, for example, 20 MHz band as long as there may be enough time for the switch.

A device such as a reduced BW UE or device may choose a random access (PRACH) resource that may be defined by a preamble, one or more frequencies and subframes, and the like from the defined or configured set or subset of such resources that may indicate to the eNB that it may be a reduced BW device. The device may also exclude other PRACH resources from its selection procedure.

Additionally, a reduced device may monitor and/or attempt to decode PDCCH and/or ePDCCH known or configured to be intended for one or more DL random access messages, (e.g. the random access response message and/or contention resolution message) for at least a reduced BW UE/device.

In an embodiment, the device may also inform the eNB or, for example, other network components of reduced BW support during a random access procedure. For example, a device may perform one or more of the following. The device may inform the eNB in one of the random access messages such as in the device or UE response following the random access response or after contention resolution whether it may support flexible UL transmission or not (e.g. via a capability message).

The device may also inform the eNB in one of the random access messages such as in the device or UE response following the random access response or after contention resolution whether it may be a device as described herein such as a MTC device or narrow BW device. For example, if device or UE resources may be used by narrower BW device, but may not have been reserved for a narrower BW device, the eNB may respond in the narrower BW (e.g. by using ePDCCH or by using ePDCCH and/or PDSCH RBs in a BW or a set of RBs the narrower BW the device may support or decode) and may be informed as to whether the device may really be a narrower BW device. If the device may not inform the eNB, the eNB may assume the UE may not be a narrower BW device and may use a wider BW for subsequent UL and/or DL transmission for the device.

According to an example embodiment, the device may use a new cause in the RRC Connection Request message that may identify the device as a reduced BW device. This cause may indicate a mobile originated (MO) call from a reduced BW device and/or a mobile originated (MO) call from a device that may be both reduced BW and delay tolerant. In such embodiments, a new cause may be added in the RRC Connection Request message for a mobile terminated (MT) call response from a reduced BW device which may be used by a device to indicate itself as an MT call answer from a device that may be reduced BW or both reduced BW and delay tolerant. In embodiments, this may not be used for a mobile terminated (MT) call, since for a MT call, the network may already know that the device may be a reduced BW device using the methods or procedures described herein. According to an example embodiment, the device may use this cause if the BW supported by the device may be less than the cell BW (e.g. the cell DL BW) that may be provided in the cell broadcast information.

In another example embodiment, the device may include additional information in the RRC connection request such as identification of the device as a reduced BW device and/or an indication of the BW it may support.

Another scheme (e.g. which could be used independently or in conjunction with the above cause or indication embodiments) for confirming the identity such as a reduced BW of a reduced BW device in the stages of a msg3 (e.g. RRC Connection Request) and/or a msg4 (e.g. Contention Resolution) may be to define a special format or value range that may, for example, be used by a reduced BW device, for the "randomValue" IE in the InitialUE-Identity part of the RRC Connection Request message (e.g. that may be over CCCH). For example, a certain bit pattern for a portion of the randomValue such as "1" for the 3 most significant bits or a certain value range (e.g. 0~100000 where randomValue may be a 40-bit quantity) may be used for the reduced BW devices.

When the eNB or other network component may receive the device msg3 with the "randomValue" in the defined pattern or in the defined value range, the reduced BW supporting eNB may consider the device a reduced BW device and may then in the Contention Resolution message (e.g. msg4) for a reduced BW UE/device add a certain value offset (e.g. 7) to the device's randomValue sent in msg3 as the "UE Contention Resolution Identity." After adding the offset, the eNB may transmit the UE Contention Resolution Identity back to the device in msg4. For reduced BW devices that may know the offset rule), if the "randomValue" +offset=the "Contention Resolution Identity," the device may consider the contention resolution successful. Additionally, for the legacy devices, if they may accidentally put a "randomValue" in msg3 as a reduced BW device and may then receive the Contention Resolution Id (msg4), since legacy UEs may not know the new rule, such devices may consider the resolution a failure, because the received "Contention Resolution Id" may not match the initial randomValue sent in msg3 as a result of the offset. In this embodiment, the legacy UEs may carry on another round of RRC connection request.

Regardless of the random access resources available, the narrower BW device may use resources in the BW it may support. For example, w % ben performing the random selection of a PRACH resource from the available PRACH resources, the UE may include in the selection process the available PRACH resources that are within the BW the UE supports (e.g. and may use such resources and not resources outside the BW it may support).

According to an example embodiment, an extra 1-information bit that may be carried in PRACH preamble to indicate narrower bandwidth devices may be used. For example, it may be useful for the eNB or other network components to have a way to distinguish which RA preamble may come from a narrow BW device or a regular device such that the eNB may allocate a corresponding RA response for the narrower BW devices.

Adding one information bit to the current PRACH preamble (e.g. by using BPSK) may be used to differentiate a narrow BW device from a regular device (e.g. LTE UEs). In such an embodiment, PRACH preamble sequences may not be reserved or portioned to distinguish a regular device or narrower bandwidth devices. As such, the SIB information may be simpler, because there may be no need to broadcast a special set of reserved preamble sequences for narrower bandwidth devices. Also, E-UTRAN or network components (e.g. the eNB) may perform PRACH preamble detection without knowing the type of device.

For example, the time-continuous random access signal s(t) defined by for a regular device may be modified to support a MTC device or other narrower BW UE or device as follows:

$$s(t) = \beta_{PRACH} \sum_{k=0}^{N_{ZC}-1} \sum_{n=0}^{N_{ZC}-1} x_{u,v}(n) \cdot e^{-j\frac{2\pi nk}{N_{ZC}}} \cdot e^{j2\pi(k+\varphi+K(k_0+\frac{1}{2}))\Delta f_{RA}(t-T_{CP})} \cdot e^{j\theta}$$

$$\theta = \begin{cases} 0, & \text{regular } UE \\ \pi, & \text{narrower } BW\ UE/MTC \text{ type} \end{cases}$$

where $0 \leq t < T_{SEQ} + T_{CP}$, $\beta_{PRACH}$ may be an amplitude scaling factor to conform to the transmit power $P_{PRACH}$, and $k_0 = n_{PRB}^{RA} N_{sc}^{RB} - N_{RB}^{UL} N_{sc}^{RB}/2$ The location in the frequency domain may be controlled by the parameter $n_{PRB}^{RA}$. Additionally, the factor $K = \Delta f/\Delta f_{RA}$ may account for the difference in subcarrier spacing between the random access preamble and uplink data transmission. $\Delta f = 15$ KHz may also be subcarrier spacing for uplink SC-FDMA. In example embodiments, the variable $\Delta f_{RA} = 1250$ Hz may the subcarrier spacing for the random access preamble and the variable $\varphi = 7$ in FDD case. $P_{PRACH}$ may be the PRACH preamble sequences length in FDD case and $x_{u,v}(n)$ may be the $u^{th}$ root Zadoff-Chu sequence.

According to an example embodiment, a device such as a reduced BW UE or device may add such a bit to its PRACH preamble transmission. Additionally, when an eNB or cell may receive this bit from a device, the eNB or cell may understand the device to be a reduced BW device and may act in accordance with that knowledge, for example, by acting in accordance with one or more of the embodiments described herein.

In an embodiment, a small payload with a PRACH preamble may be provided and/or used as described herein. For example, a narrower BW device may transmit a small payload with the PRACH preamble. The payload may follow the preamble or may be in resources associated with the preamble and/or a PRACH time and/or frequency resource carrying the preamble. For example, the narrower bandwidth device may transmit the narrower bandwidth device identity and scheduling request information (current RACH message type 3) together with the PRACH preamble.

Figure 40:
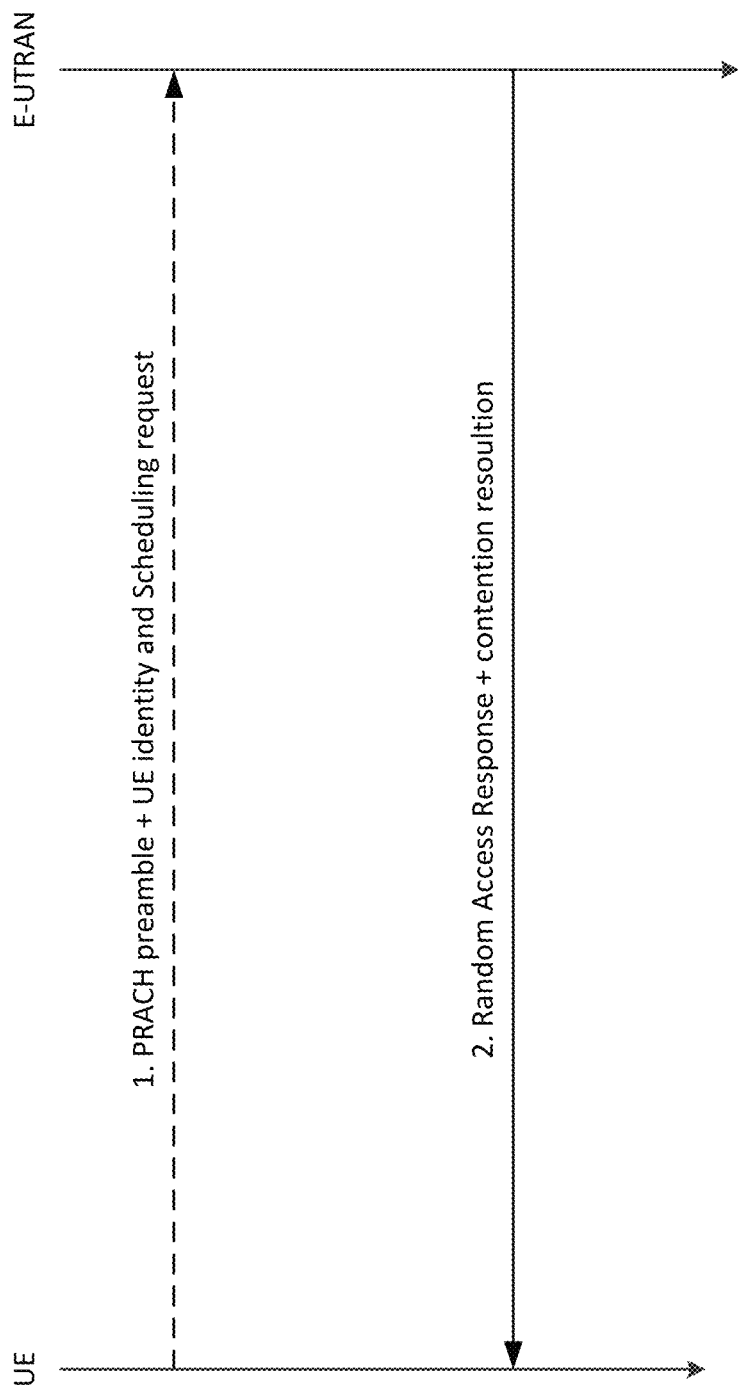
FIG. 40 illustrates an example embodiment of a contention-based RACH procedure that may be used with a narrower bandwidth device indication based on a transmitting preamble that may have a narrower bandwidth device identity such as a UE and/or MTC device identity.

A modified contention-based RACH procedure for narrower bandwidth device indication based on transmitting a preamble with narrower bandwidth device identity may be shown in FIG. 40. As shown in FIG. 40, a device such as a UE may transmit a PRACH preamble that may include the device or UE identity (e.g. in a bit or other indication) as well as a scheduling request (SR). In response thereto, the E-UTRAN or other network component (e.g. a eNB) may provide a random access response and contention resolution at 2 as described herein. Such an embodiment may apply in various scenarios such as when the device may have a network assigned device or UE identity (e.g. C-RNTI). Additionally, for a contention based RA procedure for an initial access, the device may receive its C-RNTI in the RA response (e.g. msg2), and, as such, this embodiment may not be applicable to such an initial access.

A device such as a reduced BW UE or device may also add a payload to the PRACH preamble transmission (e.g. transmitted at 1 in FIGS. 39 and 40). In such an embodiment, when a eNB or cell may receive this payload from a device, the eNB or cell may understand the device to be a reduced BW device and may act in accordance with that knowledge, for example, by acting in accordance with one or more of the solutions described herein.

Additionally, an indication to and/or from a mobile management entity (MME) may be provided and/or used as described herein. Although a reduced BW operation of a device may seem to be relevant (or only relevant) between a device and a eNB or cell as the eNB or cell mayor should ensure communication with the device in the desired BW, it may be useful for a MME or another network entity to have information regarding such operation as well. This may enable the network to be (or continue to be) aware that a device may be a reduced BW device or may have a limitation in its BW support, when such UE/device may be in Idle mode or when it may not be connected (e.g. RRC connected) in the network.

The BW support of a given device may include or consider at least one of the following items (e.g. that may be useful for a MME or another network entity to have, store, have knowledge of, or otherwise provide or use as described herein). For example, BW support of a device may include or consider whether or not the device may be a reduced BW device. It may include or consider whether or not the device may support a full system or cell BW, which may be or may be up to 20 MHz, in the UL and/or DL. It may include or consider whether or not the device supports full system or cell BW, which may be or may be up to 20 MHz, in the DL, which may include the DL control region and the DL data region, or in the DL data region. It may include or consider what maximum BW the device may support in the DL, which may include the DL control region and the DL data region, or in the DL data region. The BW which may be included or considered may be indicated by a number of RBs or a value or other indication from which the supported number of RBs may be determined. The supported BW or RBs may be different for the control and data region and may be provided separately. BW support of a device may include or consider the starting frequency of the supported BW, for example, if the supported BW may not be at the center of the full system or cell BW. It may consider whether or not the BW or maximum set of RBs that the device may support may be (or may need to be) in a window of consecutive RBs within the full system BW or whether the RBs may be located, for example, non-consecutively or in non-consecutive groups, as long as the total number of RBs may not exceed the maximum number that may be supported by the device. In one embodiment, the BW support of a given device may be included as part of its subscription information, for example, in its subscription record which may, for example, be in a subscriber database. The MME or another network entity may then obtain the BW support of a device, for example, from the home subscriber service (HSS) during the registration and/or authentication procedure (e.g. via such subscription information). The information may be provided and/or retrieved based on the device ID (e.g. an IMSI) of the device.

In another embodiment, the MME or another network entity may obtain such device BW support information from other network nodes, for example, from at least one of the following: a MTC-Inter Working Function (IWF) which upon MTC device triggering from a MTC-server (e.g. a MTC-Service Capability Server (SCS)) may retrieve the UE/device subscription information from the home subscriber service (HSS) and may pass the device specific information to the serving MME of the device which may be the MME for MTC device triggering for the device; another MME due to UE/device mobility or due to MME overload reduction; and the like.

According to yet another embodiment, a reduced BW device may provide a network entity (e.g. a network controlling entity) such as a MME with an indication that it may be a reduced BW device or with its BW support during at least one of the network registration actions such as an attach (e.g. in the "ATTACH REQUEST" message) or during device or UE mobility management actions such as tracking area update (TAU) (e.g. in the "TRACKING AREA UPDATE REQUEST" message). For example, the device may include such BW support information in at least one of the aforementioned messages itself, or in at least one of its UE or device capability or network support feature attribute IEs such as "UE network capabilities," "MS network capabilities," "MS Classmark 2," MS Classmark 3," "MS network feature support," and the like.

The MME or other network entity may provide this information to an eNB, for example, in support of certain procedures in which the eNB may not have this information. For example, the MME or other network entity may provide this BW support information (e.g. which may include one or more items of information which may be provided separately or in certain combinations such as in one or more IE), to an eNB in association with paging (e.g. with an S1 PAGING message) for a given UE or device which may be attached but not connected, (or detached/unattached but known to be located in the paging area), so the eNB may know to page this device in a certain or reduced BW.

As described herein, a device may provide its BW support to an eNB or cell and/or the eNB, or cell may save the BW support of the device.

As described herein, system information may be provided and/or used such that reduced BW devices, also referred to herein as narrower BW devices, may obtain system information. In such embodiments, ePDCCH may be an example and may be replaced by M-PDCCH, other inband signaling (e.g. in the PDSCH region) or other means to convey DL control information to a narrower BW device. Such embodiments described may be used individually or in combination.

For example, existing broadcast SIBs may be used such as one or more of the existing SIBs may be used by the narrower BW device. In this embodiment, these SIBs may be allocated resources in the BW that the narrower BW devices may access.

To, for example, enable a narrower BW device to determine the resources used for system information and/or read system information, one or more of the following may apply, for example in a cell that may support narrower BW devices.

For example, in one embodiment, certain existing SIBs may be (e.g. or may typically be or may always be) in the narrower BW in a cell that may support a narrower BW device. The certain existing SIBs may be each SIB (or all SIBs) or may be a limited set of SIBs that may be applicable to narrower BW devices or low-cost devices. The narrower BW may be in a fixed location such as the center RBs of the system BW or may be semi-statically or dynamically changed (e.g. via PHY signaling such as a DCI format). A device may be told, for example, by higher layer signaling that may be broadcast or dedicated signaling which (e.g., which of the) existing SIBs may be found in the supported bandwidth.

For subframes carrying certain or each of the SIBs, the number of OFDM symbols for PDCCH may be fixed (e.g. so the device or UE may not or may not need to read PCFICH), for example, to 3 symbols. For subframes carrying SIB1, the number of OFDM symbols for PDCCH may be fixed (e.g., so the device or UE may not or may not need to read PCFICH), for example, to 3 symbols.

In an embodiment, an ePDCCH in one subframe (e.g., subframe n) may be used to inform the location of a SIB in an upcoming subframe (e.g. subframe n+x; x>=0). The ePDCCH DCI format may include the necessary resource information. A PDSCH (e.g. in subframe n) that may be indicated by the ePDCCH may provide additional information regarding the upcoming SIB (e.g. the scheduling and/or resource information). The relationship between n and n+x may be known or the relationship (e.g. the value of x) may be provided by the DCI format or a PDSCH in subframe n. For example, the ePDCCH may be 1 subframe, or 1 DL subframe before the subframe in which the upcoming SIB will occur. In another example, the ePDCCH may be in the same subframe, but a number (e.g. 1) frame before the frame in which the upcoming SIB may occur. n and n+x may be specific subframes. For example, for SIB 1 which may be in subframe 5, the ePDCCH may be in subframe 0. The location may include the RBs. x may be 0 such that ePDCCH in one subframe (e.g., subframe n) may be used to inform the location of a SIB in the same subframe (i.e., subframe n), ePDCCH in one subframe (e.g. subframe n) may be used to inform the location of SIB 1 in an upcoming subframe (e.g., subframe n+x). According to an example embodiment, the ePDCCH used to inform (e.g. directly or via PDSCH) the location of an upcoming SIB may have a known schedule and/or resources.

In another embodiment, ePDCCH may be used to inform the location of a SIB (e.g. a new SIB) or other PDSCH that may provide scheduling and/or location information for multiple (e.g., one or more additional) SIBs. This ePDCCH may have a known schedule and/or resources.

Additionally, the location of a SIB or PDSCH may be informed or indicated (e.g., provided) by a grant (e.g. a DL grant) for the SIB or PDSCH where such grant may be included in, decoded from, or otherwise determined from an ePDCCH. The grant may include resource information as well as parameters which may be used to read and/or decode the SIB and/or PDSCH such as MCS. For ePDCCH to indicate the location of SIBs, SI-RNTI may be used. ePDCCH for one or more of these SIBs may have a known schedule and/or resources.

Broadcast information may also be provided and/or used as described herein. For example, in a cell with large BW (e.g. larger than that supported by a narrower BW UE or device such as anMTC device), separate SIBs or other PDSCH may be provided to support a narrower BW device. In such embodiments, one or more of the following may apply. The new SIBs may be in the supported narrower BW where the narrower BW may be in a fixed location such as the center RBs of the system BW or may be semi-statically or dynamically changed (e.g. via PHY signaling such as a DCI format). The device may read one or more of the new SIBs instead of one or more existing SIBs. The device may read one or more new SIBs in addition to certain existing SIBs which may be transmitted in the narrower BW that the device may support. The device may look for a new SIB based on an existing SIB not being supported in the narrower BW. The device may determine that an existing SIB may not be supported in the narrower bandwidth from the resource allocation of that SIB, for example, provided in a PDCCH or ePDCCH scrambled with an SI-RNTI. Additionally, a new RNTI may be used for the new SIB(s). The ePDCCH or PDCCH may be used to inform the devices the location, for example, PDSCH locations, of the SIBs. For subframes carrying these SIBs, the number of OFDM symbols for PDCCH may be fixed (e.g. so the devices or UEs may not or may not need to read PCFICH), for example, to 3 symbols. ePDCCH for one or more of these SIBs may have a known schedule and/or resources. Certain SIBs (e.g. one or more SIBs) may have a known schedule in time (e.g. which subframes) and/or RBs. There may be a SIB similar to SIB 1 that may have a known schedule and/or which may provide the schedule for other SIBs. These SIBs may carry the same information as the existing SIBs or may carry a subset and/or different information. ePDCCH may be provided for each SIB or one ePDCCH may provide information for locating and reading multiple SIBs.

The location of a SIB or PDSCH may be informed or indicated (e.g. provided) by a grant (e.g., DL grant) for the SIB or PDSCH where such grant may be included in, decoded from, or otherwise determined from an ePDCCH. The grant may include resource information as well as parameters which may be used to read and/or decode the SIB/and/or PDSCH such as MCS. For ePDCCH indicating the location of SIBs, SI-RNTI or another specific RNTI may be used.

Additionally, in embodiments, predefined and/or known scheduling for DL Control may be used and/or provided. For example, certain ePDCCHs may have a known schedule and/or resources defined, for example, to enable the narrower BW devices to obtain system information without reading the associated PDCCH which may span a larger BW than the device may be able to decode. These ePDCCHs may be referred to as pre-defined ePDCCHs and they may have a predefined set of corresponding configuration parameters. As described herein, ePDCCH (e.g. predefined or not) may be an example and may be replaced by M-PDCCH, other inband signaling (e.g. in the PDSCH region) or other means to convey DL control information to narrower BW device.

According to an example embodiment, the predefined ePDCCH may carry grants for UL and/or DL data transmissions; grants for SIBs; grants for data including the configuration parameters of the regular ePDCCH; and the like. In this embodiment, once the device may receive the configuration for the regular ePDCCH, it may monitor their corresponding search spaces.

Additionally, the frequency-domain and/or time-domain locations of the predefined ePDCCH may be configured according to one or more of the following. For example, the frequency-domain position of the predefined ePDCCH may be fixed to the minimum bandwidth of 6 RBs, or the BW known to be supported by the narrower BW devices (e.g. which may be 5 MHz), or any other suitable reduced bandwidth. In another example, the frequency-domain position of the predefined ePDCCH may be located at the center of the actual system bandwidth or alternatively, at a frequency location shifted with respect to the system center frequency. In another example, the time-domain position of the predefined ePDCCH may be fixed to a certain subframe, subframes, or a set of subframes, and/or subframes within a subframe. In another example, the device may expect the predefined ePDCCH grants with a certain pre-defined frame and/or subframe periodicity. For example, the predefined ePDCCH may exist in the $5^{th}$ subframe of each $4^{th}$ frame with a periodicity of 40 ms. In such an embodiment, the device may not expect a predefined ePDCCH outside of those configured subframes. In another example, the device may receive the predefined ePDCCH within the configured frequency-domain position in a subframe. In this embodiment, the device may use blind decoding to detect the existence of the predefined ePDCCH in each subframe. In another example, the physical resources allocated to the predefined ePDCCH may be used to transmit other information such as DL data. In another example, for the subframes carrying predefined ePDCCH, the number of OFDM symbols for PDCCH may be fixed (e.g. to avoid the need for UE to read PCFICH) to 3 symbols.

A predefined ePDCCH may grant a transmission according to the processing of a network or system such as an LTE system with the same reduced bandwidth of the predefined ePDCCH. For example, a system with an original bandwidth of 100 RBs may also support devices in a reduced-bandwidth of 25 RBs. The ePDCCH designated for those devices in the reduced-bandwidth may be processed (e.g. encoded, interleaved, and the like) and allocated to virtual RBs according to the rules and specifications of a system such as an LTE system with 25 RBs. Then, in an embodiment, those 25 virtual RBs may be mapped to the actual 25 RBs in the reduced-bandwidth region. Such an approach may enable the reception of the ePDCCH by devices without accessing the whole system bandwidth of 100 RBs.

A predefined ePDCCH may grant a transmission according to one or more of the following. In one example, a subframe with a static or dynamic subframe offset may be compared to the subframe location of the same grant in a system such as an LTE system with the same reduced bandwidth. Such a subframe offset may be predefined for the devices or may be linked implicitly or explicitly to other parameters of the system. An example of the latter may be the case where the subframe offset may be linked to the frame and/or subframe location of the received grant.

In another example, a subframe with a static or dynamic RB offset may be compared to the RB location of the same grant in a system such as an LTE system with the same reduced bandwidth. Such a RB offset may be predefined for the devices or may be linked implicitly or explicitly to other parameters of the system. An example of the latter may be the case where the RB offset may be linked to the RB location of the received grant within the predefined set of the RBs for the predefined ePDCCH.

Paging, for example, for narrower BW devices, may be provided and/or used as described herein. In paging, one or more of the following may apply. For example, ePDCCH may be used to inform the location of the paging channel PDSCH when the device or UE to be paged may be known to be a narrower BW device. In such an embodiment, ePDCCH may be sent in the paging occasion associated with the UE or device (e.g. MTC device) based on its UE or device ID or in each paging occasion of the cell. In another example, ePDCCH may continue to be used to inform of the page in the paging occasion(s) until the page may be terminated (e.g. based on the page being answered or time out with no answer). In another example, the location of the ePDCCH RBs for paging may be provided in signaling such as RRC signaling where such signaling may be broadcast or dedicated signaling.

In another example, a new paging schedule may be provided for a narrower BW device which may not be a function of the UE or device ID. For example a new PF and/or PO schedule may be identified for a narrower BW device for which ePDCCH may be used to inform the location and/or other configurations (e.g., configuration parameters) of the paging information or paging channel. The schedule may be provided by system information (e.g. via broadcast). In another example, to page a group of UEs together, a group paging function may be introduced. The paging schedule, e.g., for the group paging, may be independent of UE or device ID and/or a group of UEs or devices may be told to read the same paging channel. In another example, a ePDCCH may be used in addition to PDCCH in the paging occasions.

According to an example embodiment, RBs that the device or UE may decode or attempt to decode in the data region which may include PDSCH RBs and/or ePDCCH RBs, for example, to receive a page or paging data or to obtain paging or paging related information, may be located in a set of RBs that may be within the BW or RBs of the reduced BW UE or device. The location of those RBs and the device's or UE's understanding of that location may be in accordance with one or more of the embodiments described herein.

According to an embodiment, a new P'-RNTI may be provided for paging reduced BW devices. In such an embodiment, the reduced BW devices may monitor PDCCH or ePDCCH and may blind decode using the new P'-RNTI to determine if there may be paging data (e.g. PDSCH or PDSCH which may be carrying PCH) for the device. If such paging data may exist, it may be located in the BW or RBs the device may support.

According to an embodiment, a single DCI may be used to indicate multiple (e.g. 2) PDSCH blocks where certain blocks (e.g. 1) may be suitable for reception and decoding by reduced BW devices and the others (e.g. 1 other) may not.

For devices (e.g. UEs or MTC devices) in a Connected Mode, an eNB may have knowledge of which devices may be narrower BW devices and may use ePDCCH for paging for Connected Mode devices that may be known to be narrower BW UE/MTC devices. Alternatively, dedicated signaling may be used instead of the paging channel for devices that are known to be narrower BW devices. The eNB may transmit PDSCH carrying paging data which may include paging data (e.g. PCH) for at least one Connected Mode device that it may know to be a narrower BW device in the BW and/or RBs the narrower BW device may support. The eNB may transmit a PDSCH carrying paging data (e.g. PCH) for at least one Connected Mode device that it may know to be a narrower BW device and for at least one other device, such as one that is not a narrower BW device, in the BW and/or RBs the narrower BW device may support.

For devices (e.g. UEs or MTC devices) in an Idle Mode, an eNB may not retain knowledge of which devices may be narrower BW devices. The network entity that may request the page, for example the MME, may provide that information to the eNB, for example, with the paging request. In an embodiment, the ePDCCH may be used for paging for Idle Mode devices that may be known to be narrower BW devices. The eNB may transmit PDSCH carrying paging data which may include paging data (e.g. PCH) for at least one Idle Mode device that it may know to be a narrower BW device in the BW and/or RBs the narrower BW device may support. The eNB may transmit a PDSCH carrying paging data (e.g. PCH) for at least one Idle Mode device that it may know to be a narrower BW device and for at least one other device, such as one that may not be a narrower BW device, in the BW and/or RBs the narrower BW device may support.

As described above, the ePDCCH may be an example and may be replaced by M-PDCCH, other inband signaling (e.g., in the PDSCH region) or other means to convey DL control information to a narrower BW device.

Cell selection and/or reselection, for example for a narrower bandwidth device, may be provided and/or used as described herein. For example, a typical cell selection procedure may involve a device (e.g. a UE) finding a best cell based on measurements, and then determining if the cell may be suitable for camping. This may include determining if the cell belongs to a Public Land Mobile Network (PLMN) the device may connect to and whether the cell may or may not be barred among other criteria.

In embodiments, a device may use additional criteria for determining whether or not the cell is suitable for camping on. One such criterion may be whether the cell may support narrower bandwidth devices. If a narrower BW device may determine that a cell may not support narrower BW devices or may not support its narrower BW, the device may consider the cell unsuitable, for example, for cell selection and/or reselection.

Additionally, support for narrower BW devices may indicate that the cell may assign resources, for example, PDSCH resources, to a narrower BW device in the BW it may support. For example, if a device may support reception of 12 RBs, the cell may assign this device PDSCH resources of 12 RBs or fewer, for example, in a given subframe.

The device may determine whether a cell may support narrower BW devices, and possibly whether it may support the BW of the device or of narrower BW devices, based on one or more of the following: an indication in a MIB as described herein; an indication in SIB1 or another SIB (e.g. one or more of a bit, flag, one or more BWs, or another indication); an indication in SIB1 that new and/or special SIB(s) for narrower BW devices are being broadcast; a new and/or special SIB(s) for narrower BW devices that may be found by the device to be present; and the like.

The device (e.g., UE or MTC device) may determine that a cell does not support narrower BW devices (or narrower BW devices with the BW of this device) based on at least resources for SIB1 (or another SIB) being allocated in a BW, (e.g., number or RBs and/or location), that the device does not support and/or new and/or special SIB(s) for narrower BW devices are not found by the device.

If the device may be able to read PDCCH, the normal mechanism for obtaining the resource assignment for SIBs in PDSCH may be used (e.g. via PDCCH scrambled with SI-RNTI). If not, an alternate method such as one described herein may be used. For example, a device may do one or more of the following. The device (e.g., UE or MTC device) may choose a cell, for example, based on measurements. The device may read the MIB and the MIB may provide information to enable the device to read PDCCH to obtain the location of SIB1. The device may look for the PDCCH which may give it the location (e.g. resource allocation) of SIB1. If the SIB1 resource allocation may exceed the BW that may be supported by device, the device may consider this cell unsuitable and may then try to find another cell that may be suitable. If the SIB1 resource allocation may be within the BW that may be supported by the device, the device may read SIB1, which may include information on whether the cell may support narrower BW devices. The device may consider a cell unsuitable and may then try to find another cell that may be suitable if one or more of the following may be true: if SIB1 may not include an indication that the cell may support narrower BW devices; if SIB1 may include an indication that the cell may not support narrower BW devices; if SIB1 may include an indication of the narrower BW supported and that BW may be larger than the BW the device supports; and the like.

As another example, if after reading SIB1 as described above, the device (e.g., UE or MTC device) may determine that the narrower BW SIB(s) may not be broadcast in this cell (e.g. SIB1 may not indicate that they may be broadcast), the device may consider the cell unsuitable and may then try to find another cell that may be suitable.

As another example, if the device may determine that the narrower BW SIB(s) may not be broadcast in a cell, the device may consider the cell unsuitable and may then try to find another cell that may be suitable. A way to determine that the SIB(s) may not be broadcast in the cell may be to keep looking for them, for example, over their expected broadcast period and repetition rate (e.g. for some time and/or based on a timer), until it may be reasonably certain that they are not being broadcast.

As another example, the device may look for a SIB or other transmission instead of, or in addition to, SIB 1. This SIB or other transmission may have a known schedule and/or other parameters to enable the device to know when to look for it or know when to monitor a control channel such as PDCCH or ePDCCH to find it. The device may monitor a control channel such as PDCCH or ePDCCH to determine whether a SIB or other transmission relevant to reduced BW operation may be present in a subframe and what resources may be assigned to it. An RNTI which may be different from SI-RNTI may be used. The device may learn from this SIB or other transmissions at least one of whether the cell may support reduced BW devices, parameters relating to the reduced BW operation of the cell, or ePDCCH configuration for the cell, among others.

For cell reselection, if the highest ranked cell or best cell according to absolute priority reselection rules may not support narrower BW devices or the narrower BW of the device, the device may not consider the cell for reselection.

Additionally, in embodiments, an indication as to whether neighbor cells may support narrower BW devices may be included in the neighbor list information. This may include support or non-support and/or the BW (or BWs) supported.

In embodiments, a device may measure (or only measure) cells it may know support narrower BW devices or its narrower bandwidth; a device may consider (or only consider) for reselection cells it may know support narrower BW devices or its narrower bandwidth; a device may be asked (or may only be asked) to measure cells that may support narrower BW devices or its narrower bandwidth; and the like.

According to an example embodiment, a device, e.g., a reduced BW device which may be a UE or MTC device, may be provided with a list of cells that may support narrower BW devices and/or its narrower BW. The list may be preprogrammed, for example, in the universal subscriber identity module (USIM)), may be provided to the device via operations, administration and maintenance (e.g. OA&M), or may be provided to the device by higher layer signaling. The list may include, for example for each cell or group of cells which may be in the list, one or more of a cell ID, frequency, PLMN, system BW, narrower BW supported, and the like.

A device (e.g., UE or MTC device) may read the MIB, SIB1, or another SIB or SIBs of a neighbor cell to determine if it may support narrower BW devices or its narrower bandwidth, for example, when such information may not be available to it otherwise such as in preprogrammed or signaled cell information such as neighbor cell information. Since a narrower BW device may be expected to be a low rate device, it may have time to obtain and read such information.

Additionally, a device may store information it may learn about support for reduced BW devices by certain cells such as cells it may have previously visited or cell. e.g., neighbor cell, information it may have received. The device may store this information along with cell identification which may include one or more of PLMN ID, physical cell ID, tracking area ID, among others. The device may use this information to exclude certain cells such as cells it may have learned may not support reduced BW devices from its cell selection and/or reselection candidates and/or neighbor cell measurements. In an embodiment, there may be a time limit on how long this exclusion may be permitted.

As described herein, a narrower bandwidth device connection procedure may be provided and/or used. For example, a cell that may support narrower BW devices may provide Random Access Responses (RAR), e.g., all RAR, in the narrower BW that it may support. If it may support multiple narrower BWs, it may provide RAR, e.g., all RAR, in the narrowest BW it may support. If the RAR from a cell may be received by a device in a BW or RBs it may not support, or if the RAR from a cell may be indicated to a device to be located in a BW or RBs it may not support, the device may understand that the cell may not support narrower BW devices or its narrower BW and may or may need to reselect to a new cell.

The device may provide an indication in its RRC connection request that it may be a narrower BW device and may include an indication of the BW (e.g. the largest BW) it may support. Prior to receiving the message that may identify whether a device may be a narrower BW device, a cell that may support narrower BW devices may provide DL assignments to that device in the narrow BW or the narrowest BW it may support.

If a device may be assigned resources (e.g. DL resources), in a BW it may not support, the device may consider this to be an error. The device may wait to see if this may persist before declaring a failure (e.g. possibly radio link failure) and may (e.g. possibly) look for a new cell to connect to. If such an assignment may be received prior to indicating that it may be a narrower bandwidth device, the device may understand that the cell may not support narrower BW devices or its narrower BW and may or may need to reselect to a new cell.

A handover procedure involving reduced bandwidth devices may be provided and/or used. For example, one or more of the following items or actions may be used and/or may apply. An eNB may handover (or may limit handover of) a reduced BW device to a cell that may support reduced BW operation. In the X2 handover request from a source eNB to a target eNB, the source eNB may include an indication as to whether the device to be handed over may be a reduced BW device and/or the BW support of the device (e.g. as described herein above). In the X2 reply from the target eNB, the target eNB may reject the request if it may not support reduced BW devices or at least one aspect of the BW support indicated for the device for which the request may have been made. The rejection may include indication of this cause. A first eNB, (e.g. a source eNB which may want to handover a reduced BW device to a target eNB) may expect a certain response in an X2 reply (e.g. a X2 reply to an X2 handover request from the source eNB) from a second eNB, (e.g. the target eNB for a handover), which would mean that it may support reduced BW operation. If the first eNB may not receive the expected response from the second eNB, it may understand that the second eNB may not support reduced BW operation. An eNB may obtain information regarding reduced BW support of a cell belonging to another eNB via X2 signaling to and/or from that eNB, (e.g. via an X2 SETUP REQUEST or an ENB CONFIGURATION UPDATE message). An eNB may obtain information regarding reduced BW support of a cell belonging to another eNB via the network (e.g. via OA&M). An eNB may include in its neighbor relation table information regarding the full and/or reduced BW support of its neighboring cells.

When a handover may be performed for a reduced BW device, if a contention free random access procedure may be performed, for example, to gain synchronization in the new cell, the cell may provide the random access response in the supported BW of the device since it may know that the device may be a reduced BW device based on the handover request over the X2. If a contention based random access procedure may be performed (e.g. along with or in conjunction with a handover), one or more of the related embodiments described herein may be applied.

Receiver complexity may also be reduced as described herein. For example, systems and/or methods may be provided that may reduce or minimize the implementation complexity of a device receiver such as a UE or MTC receiver. Given the low throughput that may be required in a device, a compact set of functions may be defined for devices and the functions may be configured to coexist with legacy devices or UEs (e.g. Rel-8/9/10). The system may use a device configured with a single transmission antenna with two receive RF chains as described herein.

A time shared RNTI may be used and/or provided to help reduce such receiver complexity. For example, in some embodiments, a new RNTI for a device may defined as a device RNTI such as a MTC-RNTI which may use for downlink and uplink data transmission. In such an embodiment, an eNB may support more than 20000 MTC devices in a cell at the same time. In networks such as LTE networks, an RNTI may given to a specific device or UE as an ID as a result of the random access process in a cell, and it may be masked on a 16-bit CRC in the PDCCH such that the device or UE may blindly detect its control channels by checking the RNTI after decoding a PDCCH. However, to support narrow BW devices such as MTC devices and legacy UEs simultaneously in a cell, the number of RNTI may not be enough considering that multiple RNTIs may be used for a single legacy device or UE support. Therefore, in one embodiment, the same RNTI may be shared with multiple devices. According to an example embedment, the throughput requirement for a device such as a MTC device may be relatively low such that the DL and/or UL grant may be transmitted within the restricted number of subframes. Although device RNTI or an MTC-RNTI may be shared with multiple devices, the false alarm probability may be kept as it is in the previous networks because the device or MTC-RNTI may be used in a non-overlapped manner and a device may be forced to monitor the subset of the subframe.

Figure 41:
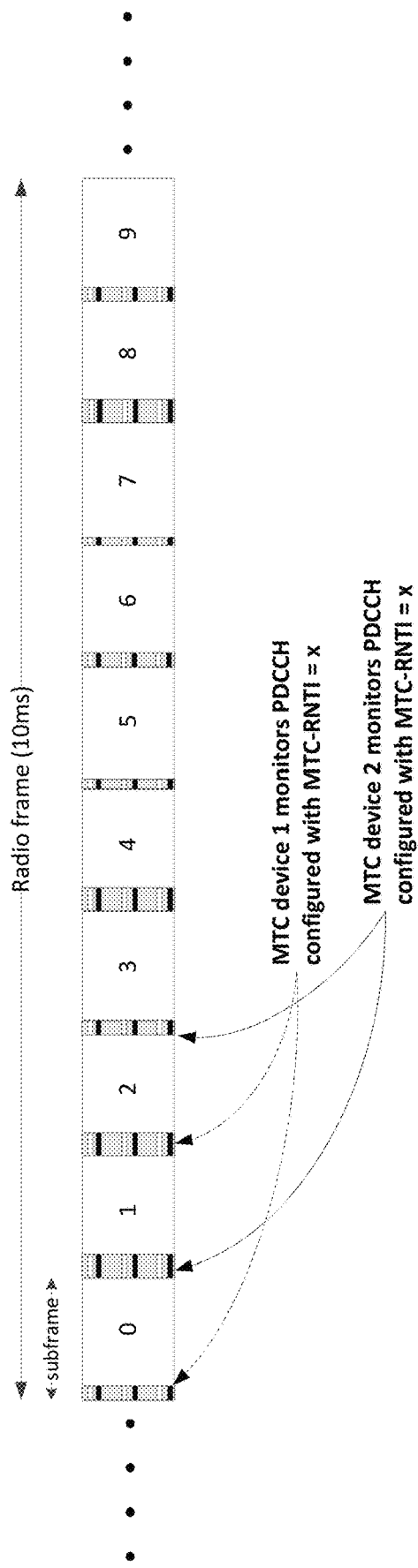
FIG. 41 illustrates an example embodiment of a time-shared device-RNTI such as a MTC-RNTI that may be used herein.

In an embodiment, from a device perspective (e.g. MTC perspective), a device or MTC-RNTI and valid subframe information may be provided together such that the device may monitor PDCCHs configured by the device or MTC-RNTI for a subset of subframe. The subframe may be defined as follows. The valid subframe for a device or MTC-RNTI may be configured with 40 ms duty cycle. As such, a 40 bits bitmap may be used to indicate which subframe may be monitored for the PDCCHs configured by the device or MTC-RNTI. The valid subframe index may be provided in the first subframe of a radio frame. As such, the radio frame header may be defined to provide the subframe. The valid subframe may be defined as a predetermined starting point within the duty cycle. As one example, the starting subframe index N with duty cycle M may be provided to a device such as a UE or MTC device. Then, the device may monitor if the subframe index n may satisfy the condition (n−N)modM=0 and/or the duty cycle may be defined with multiples of 8. One such example of a time shared device or MTC-RNTI may be shown in FIG. 41.

Additionally, a device such as an MTC device may support transmission mode and/or a single transmission scheme that may rely on common reference signal (CRS) regardless of the number of eNB antenna ports. The CRS may be defined (e.g. in Rel-8) according to the number of antenna ports at an eNB transmitted and supportable up to 4 antenna ports. Because the CRS may be used for downlink control channel transmission including PCFICH, PDCCH, and PHICH, a device such as an MTC device may read CRS for coherent demodulation of downlink control channels. Therefore, in one embodiment, a single transmission scheme such as transmit diversity scheme may be used for PDSCH transmission for device such as an MTC device. In an embodiment, the transmit diversity scheme (e.g. SFBC) may provide diversity gain and robustness of data transmission when channel state information may not be available at the eNB transmitter. In the case of the single antenna port being used at an eNB transmitter, a single-antenna port such as port-0 may be used for the PDSCH transmission. The PDCCH and PDSCH configured by MTC-RNTI (CRS-based) may be shown in the table of FIG. 42.

An alternative method may be based on a DM-RS based transmission scheme. For example, a single device or UE-specific antenna port may be defined to achieve beamforming gain. In addition, the receiver design may be simpler than the CRS based transmission scheme, because the same single device or UE-specific antenna port maybe used regardless of the number of antenna port at the eNB transmitter. As such, a device such as an MTC device may not implement multiple receivers which fit to transmission schemes. Such an embodiment may be configured according to the table in FIG. 43 where PDCCH and PDSCH may be configured by device or MTC-RNTI (e.g. DMRS-based).

According to an example embodiment, the DM-RS port for DM-RS based transmission may be not restricted to port-7. As such, other DM-RS ports may also used such as port-5, port-{8, 9, 10, . . . , 14}. Additionally, to support multi-user MIMO, the DM-RS port may be indicated by PDCCH and/or higher layers.

In a further embodiment, both CRS-based and DMRS-based transmission modes may be used for a device such as an MTC device and configured by a DCI format. Also, the transmission scheme may be configured by a higher layer such that if a CRS-based transmission scheme may be configured, a device such as an MTC device may monitors DCI format 1A, otherwise DCI format 1 may be monitored to reduce the blind detection trials. Such an embodiment may be configured according to the table in FIG. 44 where PDCCH and PDSCH may be configured by device or MTC-RNTI (e.g. CRS/DMRS-based).

PDCCH and/or PDSCH reception may also be provided and/or used. For example, a device such as an MTC device may receive a specific CCE aggregation level for its PDCCH blind detection. According to an embodiment (e.g. in Rel-8), the CCE aggregation level may be {1, 2, 4, 8} and a device may attempts CCE aggregation levels for the PDCCH detection thereby increasing the blind decoding complexity. To minimize the PDCCH decoding complexity, in one embodiment, an eNB may configure a specific CCE aggregation level and/or a subset of CCE aggregation level for the device or MTC device. Hence, a device such as an MTC device may monitor the designated CCE aggregation level resulting in reduced decoding complexity. Furthermore, the CCE aggregation level may be tied to the subframe index. This alternative method may support various coverage without blind detection by defining subframe specific CCE aggregation level. For example, a device such as an MTC device may monitor CCE aggregation level 1 in the subframe n and CCE aggregation level 2 in the subframe n+1 and so forth. As such, the PDCCH coverage may be defined according to the subframe index. The subframe transmitting larger CCE aggregation level such as 4 and 8 may provide better PDCCH coverage.

In example embodiments, the CCE aggregation level may be tied with the subframe index using one or more of the following techniques. The CCE aggregation level for the PDCCH configured with MTC-RNTI may be defined according the subframe index in cell-specific manner. In this method, broadcasting channel may be used for the CCE aggregation level information or the CCE aggregation level may be predefined. Additionally, the CCE aggregation level for the PDCCH configured with MTC-RNTI may be defined in a device or UE-specific manner via higher layer signaling.

Figure 45:
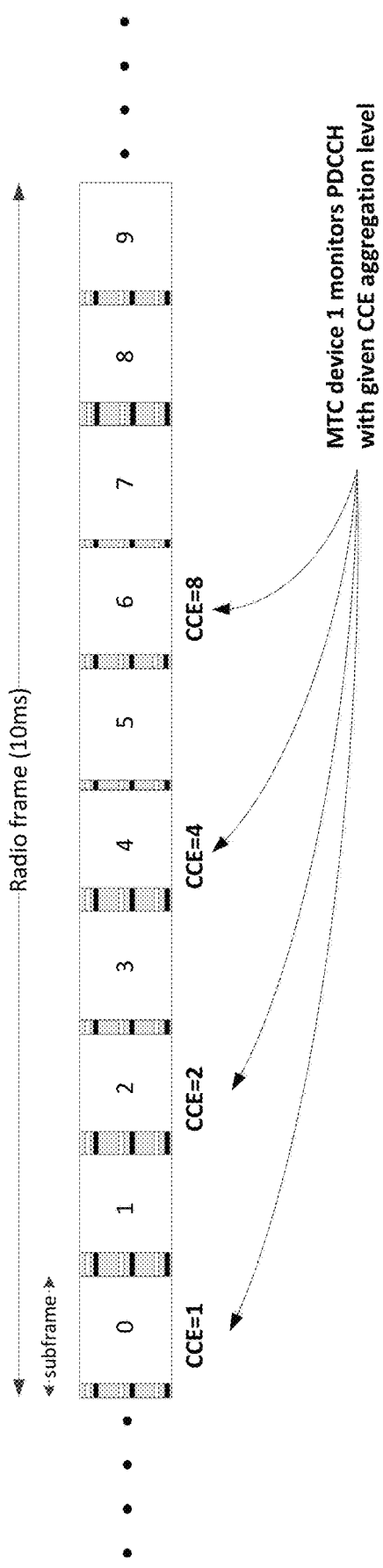
FIG. 45 illustrates an example embodiment of a sub-frame-specific CCE aggregation level.

The CCE aggregation level for the PDCCH configured with MTC-RNTI may be implicitly indicated by the device or MTC-RNTI. According to an example embodiment, the device or MTC-RNTI value being within a specific range may imply the CCE aggregation level. An example embodiment of the subframe specific CCE aggregation level may be depicted in FIG. 45.

A device such as an MTC device may receive the corresponding PDSCH in the subframe n+k upon which the device or MTC may receive PDCCH in the subframe n. The k can be defined as a positive integer number including 1, 2, 3, and 4. In this embodiment, the device or MTC device may assume that there may be no PDCCH for the device or MTC device in the subframe n+1. This may relax the receiver processing time for PDCSCH reception. In addition, a device such as an MTC device may assume that the PDSCH may span multiple subframes in the same resource blocks.

Additionally, in embodiments, burst based semi-persistent scheduling may be used and/or provided as described herein. For example, a device such as an MTC device may have burst traffic in which the device may wake up for a short time period and may report the information within the given time. The physical resource in time frequency domain may be defined via higher layer signaling and the PDCCH configured by a device or MTC-RNTI may trigger the burst traffic transmitting and/or receiving until another PDCCH configured by a device or MTC-RNTI may release the resources. Because the time/frequency resources for each device may allocated from a higher layer, the triggering PDCCH may be shared with multiple devices.

As described herein, a new DCI format for the trigger and/or release of physical resources may be defined in one embodiment. For example, DCI format 3B may be defined for a device or MTC command in which the state '0' may imply triggering and '1' may imply release the resources, or vice-versa. In the DCI format 3B, multiple device or MTC command bits may be included such that an independent bit for each device may be allocated, thus, allowing a flexible device specific trigger and/or release.

As an alternative method, two or three bits for a device or MTC command in the DCI format 3B may be be used to indicate multiple status as follows:
  2 bit MTC command
    "00": trigger the burst transmission
    "01": retransmission of PUSCH
    "10": retransmission of PDSCH
    "11": release the burst transmission
  3 bit MTC command
    "000": trigger the burst transmission
    "001": retransmission of PUSCH
    "010": retransmission of PDSCH
    "011": bundling TTI for PUSCH (2 ms)
    "100": bundling TTI for PUSCH (3 ms)
    "101": bundling TTI for PUSCH (4 ms)
    "110": release the burst transmission
    "111": reserved As shown in the examples, the device or MTC command may include trigger and/or release physical resources, retransmission of PUSCH and/or PDSCH, and a TTI bundling command. The multiple device or MTC commands in DCI format 3B may transmitted as follows: device or MTC command 1, device or MTC command 2, device or MTC command 3, . . . , device orMTC command N. The position of the device or MTC command in the DCI format 3B may be provided to a device from higher layer signaling.

A single RF chain device may also be provided and/or used in an embodiment. For example, to reduce the cost of a device such as a UE or MTC device, a device such as an LTE device with single receive antenna may be used and/or introduced. By restricting the number of receive antennas, the cost-saving in a device such as an MTC device may be achieved by removing the second antenna, one of the RF chains and lower baseband processing associated with the second receive path.

One implication on the device such as a UE or MTC device by removing one of the RF chains may be a reduced coverage due to the lower receiver sensitivity. Given that the device may aim to provide the same coverage as the legacy device (e.g. LTE UE), to enhance the coverage of downlink signaling and control channels, one or more the following solutions may be employed: power boosting, enhanced control channel designs may be employed, UL HARQ mechanisms may be eliminated, ACK/NACK repetition may be provided, autonomous PDSCH retransmissions may be performed, the MCS scheme may be restricted, and the like. For example, in an embodiment (e.g. power boosting), increasing the power may be used as a tool to improve the coverage of downlink control channels such as PCFICH, PHICH and PDCCH.

Additionally, in another embodiment, enhanced control channel designs may be employed. Such an embodiment may be beneficial in HetNet scenarios wherein increasing the transmit power may result in higher interference (e.g. low SINR) for the devices. For example, PCFICH may be semi-statically configured for devices which may imply no specific physical layer mechanism to indicate the size of the control region in terms of the number of OFDM symbols. As for PHICH and PDCCH, the device may receive those control channels in the PDSCH region rather than the legacy control region. By transmitting PHICH and PDCCH in the PDSCH region, Inter-Cell Interference Coordination (ICIC) may be used to lower the impact of inter-cell interference (ICI) on the devices and to enhance the coverage of the control channels.

According to an embodiment, an UL HARQ mechanism may be eliminated. For example, a network such as LTE may transmit PHICH in the downlink to indicate the hybrid-ARQ acknowledgements in response to UL data packet transmission. However, a device such as a UE or MTC device may be designed without an UL HARQ mechanism to reduce the signaling overhead. In this embodiment, the device may autonomously retransmit the data in consecutive or predefined subframes without waiting for ACK/NACK feedback on PHICH.

Additionally, ACK/NACK repetition may be provided and/or used. For example, to enhance the PHICH coverage in situations where power boosting may not be applicable (e.g. interference limited environments), the HARQ ACK/NACK in response to UL data packet transmission may be retransmitted in the downlink. According to such an embodiment, PHICH may be retransmitted in consecutive or predefined subframes. The repetition factor for ACK/NACK retransmission may be configured through higher layer signaling (e.g. RRC) depending on the required coverage.

Autonomous PDSCH retransmissions may also be provided and/or used. For example, to enhance the coverage of the downlink shared channel, the PDSCH may be retransmitted in consecutive or predefined subframes without waiting for HARQ feedback on PUCCH from the device or UE side. The number of retransmissions may be configured through the higher layer. In this embodiment, the device or UE may or may not transmit an acknowledgment on the UL. If the device or UE may be expected to transmit feedback, the HARQ acknowledgment may be generated after receiving the last retransmitted PDSCH.

According to another example embodiment, the Modulation and Coding Scheme (MCS) may be restricted. For example, based on such a scheme, the device or UE may receive and/or decode a subset of the modulation and coding combinations from the set defined for the legacy network such as LTE. For example, the device such as the UE or MTC device may receive and decode the QPSK modulated signal to meet its recover sensitivity requirement. This may be to compensate for the 3 dB loss due to the absence of receive diversity gain as a result of eliminating the second antenna.

UL enhancements may also be provided and/or used. For example, to reduce the cost of a device, the battery power consumption may be lowered. Given that the major source of inefficiency in transmit power may be the power back off due to high signal peakiness of the transmit signal, a number of solutions may be proposed to reduce the signal peakiness for the uplink of a device. According to an embodiment, by reducing the signal peakiness, the same coverage as in a network such as LTE may be achieved with the smaller power amplifier. This, in turn, may lower the cost of a device.

For example, partial PUSCH transmissions may be provided and/or used. According to this embodiment, PUSCH may be transmitted on the partial granted resources in the uplink. This may help increase the power per subcarrier by using a narrower resource allocation in the frequency domain. For example, PUSCH may be transmitted on the even or odd subcarriers within the assigned RB(s) while the power per resource block may be unchanged. In this embodiment, to support the same transport block size as in current systems or networks (e.g. LTE Rel-8), each transport block may be transmitted in two or multiple subframes.

Also, to maintain the total system throughput, PUSCH transmissions from multiple devices may be frequency multiplexed (e.g. interlaced). For example, one device may use odd subcarriers for PUSCH transmission and another device may use even subcarriers for its PUSCH transmissions. The frequency shift and/or allocations may be indicated to the device as a part of its uplink grant transmitted in the DL.

To enhance the PUCCH coverage when lower power may be used for uplink transmissions, the HARQ ACK/NACK in response to DL data packet transmission may be retransmitted (e.g. ACK/NACK repetition may be provided) in the uplink. According to this scheme, PUCCH may be retransmitted in consecutive or predefined subframes. The repetition factor for ACK/NACK retransmission may be configured through higher layer signaling (e.g. RRC) depending on the coverage.

As described herein, the DL HARQ mechanism may be eliminated. For example, the network such as LTE may transmit PUCCH in the uplink to indicate the hybrid-ARQ acknowledgements in response to DL data packet transmission. However, a device may be designed without a DL HARQ mechanism to reduce the signaling overhead. In this embodiment, the eNB may autonomously retransmit PDSCH in consecutive or predefined subframes without waiting for ACK/NACK feedback on PUCCH.

Additionally, the Modulation and Coding Scheme (MCS) may be restricted. For example, based on this scheme, the device may restricted to use a subset of the modulation and coding combinations and/or transport block size from the set defined for the uplink of a legacy network such as LTE. For example, the device may use QPSK modulation for its uplink transmissions to lower the required power de-rating at its power amplifier. According to an example embodiment, higher order modulations such as QAM16 and QAM64 may have higher cubic metric (and also higher peak to average power ratio) which may use higher power back-off at the transmitter. As a by-product of restricted MCS, a more compact DCI format may also be introduced for the devices. The latter may imply that the MCS field of the compact DCI format may be smaller than 5 bits (e.g. 3 bits). A more compact DCI format may also increase the achievable coverage of PDCCH in DL.

Additionally, introducing a new modulation scheme for devices such as IM-shifted MPSK modulation schemes including π/2-shifted BPSK may enable the coverage to be maintained due to a lower signal peakiness (e.g. as compared to that of QPSK even when the maximum transmission power may be reduced). By introducing of a new modulation scheme, the transport block size and MCS signaled on the downlink may be modified for the devices compared to the legacy network such as LTE. This may be accomplished through remapping of the MCS index received in the DCI to include the newly introduced modulation scheme.

A spectrum shaping mechanism in the UL may also be introduced. For example, spectrum shaping may be used to further reduce signal peakiness. In such an embodiment, the use of Root Raised-Cosine (RRC) or Kaiser window spectrum shaping may be introduced as a feature for the devices such as UEs or MTC devices. According to an embodiment, the introduction of spectrum shaping in the UL may slightly increase the complexity at the device, may lower battery power consumption, and/or may lower cost.

Additionally, uplink control channels may be provided and/or used. For example, the following examples may be considered for a device to transmit PUCCH without interfering with a SRS transmission from a legacy device (e.g. a LTE UE). In one example, different subframes may be configured for the device or MTC PUCCH transmission and legacy device or UE SRS transmission, respectively. A device may be configured with subframe(s) for its PUCCH transmission where the subframe may not be a cell-specific SRS subframe (e.g. a Rel-10 cell-specific SRS subframe). For example, the device may be configured to transmit a periodic CSI report on PUCCH in a subframe which may not be a cell-specific SRS subframe (e.g. a Rel-10 cell-specific SRS subframe).

In another example, a piggy-back approach for UCI transmission may be used. A device may transmit UCI (e.g., periodic CSI and/or ACK/NACK) on PUSCH in a cell-specific SRS subframe (e.g. Rel-10 cell-specific SRS subframe). In this embodiment, a PUSCH resource may be allocated in either a dynamic manner (e.g. UL grant in PDCCH), or semi-statically, (e.g. RRC signaling). If there may be a PUSCH transmission (e.g. for UL-SCH) allocated for the device in a cell-specific SRS subframe (e.g. Rel-10 cell-specific SRS subframe), the device may piggy back the UCI transmission on the PUSCH.

In another example, a shortened PUCCH format may be used in each cell-specific SRS subframe (e.g. Rel-10 cell-specific SRS subframe). If a device may be scheduled to transmit UCI such as ACK/NACK and/or periodic CSI in a cell-specific SRS subframe (e.g. Rel-10 cell-specific SRS subframe), the device may use a shortened PUCCH format in the given SRS subframe. According to an example embodiment, (e.g. in Rel-10), shortened formats for PUCCH format 1a/b and PUCCH format 3, respectively, may be used. However, there may be no shortened PUCCH format 2 currently provided that may be used. As such, a shortened PUCCH format-2 may be defined as described herein. Such a format may be defined as puncturing the last 2 bits after (20, O) RM coding, for example, after the periodic CSI sequence with N bits being encoded using (20, N) RM coding, the last 2 bits of the resulting coded bits being punctured, yielding to 18 coded bits. Using a different (M, O) RM coding scheme or a block coding, a different (M, N) RM coding may be used for a shortened PUCCH format 2 where M may not be equal to 20. In this embodiment, the RM coded output bits may be rate-matched to 18 bits. Alternatively, a block coding may be used to produce 18 bit long code output. Such a format may also be defined as using a different set of basis sequence for (20, O) RM code to enhance the hamming distance of the punctured 18 bit long RM codes.

In another example, periodic CSI transmission may be dropped in a cell-specific SRS subframe (e.g. Rel-10 cell-specific SRS subframe). For example, the device may drop periodic CSI transmission in a cell-specific SRS subframe (e.g. Rel-10 cell-specific SRS subframe). Additionally, the device may be configured with aperiodic CSI transmission such that the device may be configured to not report periodic CSI, but report aperiodic CSI.

The examples and embodiments described herein may use the terms narrower BW and reduced BW interchangeably. In addition, MTC device may be replaced by UE or device or reduced BW UE or device and be consistent with the description herein. BW may be replaced by a number or set of RBs. This number or set of RBs which may constitute the supported BW of a UE/device such a reduced BW UE/device may be, or may not be, or may be required to be, or may not be required to be, consecutive in frequency.

Additionally, in the embodiments described herein, ePDCCH may be provided by an example and may be replaced by M-PDCCH, other inband signaling (e.g. in the PDSCH region) or other means to convey DL control information to a narrower BW device.

Furthermore, although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A wireless transmit/receive unit (WTRU) comprising:
   a processor configured at least to:
   determine a first set of resources to be used for sending a physical random access channel (PRACH) preamble to a base station;
   determine a second set of resources to be used for sending a random access channel (RACH) payload to the base station, wherein the second set of resources to be used for sending the RACH payload is associated with the PRACH preamble;

send the PRACH preamble and the RACH payload to the base station, wherein the PRACH preamble is sent using the first set of resources and the RACH payload is sent using the second set of resources, wherein the second set of resources occur in time after the first set of resources;

monitor, based on the PRACH preamble and the RACH payload being sent, a physical downlink control channel (PDCCH) for a random access response (RAR); and receive the RAR based on downlink control information associated with the RAR, wherein the downlink control information is received via the PDCCH, wherein the RAR comprises an identity associated with the WTRU, and wherein the processor is configured to receive the RAR in response to the PRACH preamble and the RACH payload being sent.

2. The WTRU of claim 1, wherein the first set of resources are indicated via a broadcast message or a dedicated signaling message.

3. The WTRU of claim 1, wherein the first set of resources comprises a first set of time and frequency resources and the second set of resources comprises a second set of time and frequency resources, and wherein the second set of time and frequency resources is determined based on the first set of time and frequency resources.

4. The WTRU of claim 1, wherein the RACH payload comprises one or more of a scheduling request (SR) or a radio resource control (RRC) request message.

5. The WTRU of claim 1, wherein the RACH payload is sent over a common control channel (CCCH).

6. The WTRU of claim 1, wherein the RACH payload comprises the identity associated with the WTRU.

7. The WTRU of claim 1, wherein the RAR comprises at least one of a cell radio network temporary ID (C-RNTI) or a contention resolution identity.

8. The WTRU of claim 1, wherein the PRACH preamble and the RACH payload are sent in a single transmission.

9. The WTRU of claim 1, wherein the RAR comprises one or more of a preamble ID, a timing alignment, or an uplink (UL) grant.

10. A random access method implemented by a wireless transmit/receive unit (WTRU), the method comprising:

determining a first set of resources to be used for sending a physical random access channel (PRACH) preamble to a base station;

determining a second set of resources to be used for sending a random access channel (RACH) payload to the base station, wherein the second set of resources to be used for sending the RACH payload is associated with the PRACH preamble;

sending the PRACH preamble and the RACH payload to the base station, wherein the PRACH preamble is sent using the first set of resources and the RACH payload is sent using the second set of resources, wherein the second set of resources occur in time after the first set of resources;

monitoring, based on the PRACH preamble and the RACH payload being sent, a physical downlink control channel (PDCCH) for a random access response (RAR); and receiving the RAR based on downlink control information associated with the RAR, wherein the downlink control information is received via the PDCCH, wherein the RAR comprises an identity associated with the WTRU, and wherein the RAR is received in response to sending the PRACH preamble and the RACH payload.

11. The method of claim 10, wherein the first set of resources are indicated via a broadcast message or a dedicated signaling message.

12. The method of claim 10, wherein the first set of resources comprises a first set of time and frequency resources and the second set of resources comprises a second set of time and frequency resources, and wherein the second set of time and frequency resources is determined based on the first set of time and frequency resources.

13. The method of claim 10, wherein the RACH payload comprises one or more of a scheduling request (SR) or a radio resource control (RRC) request message.

14. The method of claim 10, wherein the RACH payload is sent over a common control channel (CCCH).

15. The method of claim 10, wherein the RACH payload comprises the identity associated with the WTRU.

16. The method of claim 10, wherein the RAR comprises at least one of a cell radio network temporary ID (C-RNTI) or a contention resolution identity.

17. The method of claim 10, wherein the PRACH preamble and the RACH payload are sent in a single transmission.

18. The method of claim 10, wherein the RAR comprises one or more of a preamble ID, a timing alignment, or an uplink (UL) grant.

* * * * *